US011643982B1

(12) United States Patent
Quirynen et al.

(10) Patent No.: US 11,643,982 B1
(45) Date of Patent: May 9, 2023

(54) SEQUENTIAL CONVEXIFICATION METHOD FOR MODEL PREDICTIVE CONTROL OF NONLINEAR SYSTEMS WITH CONTINUOUS AND DISCRETE ELEMENTS OF OPERATIONS

(71) Applicant: Mitsubishi Electric Research Laboratories, Inc., Cambridge, MA (US)

(72) Inventors: Rien Quirynen, Somerville, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/455,472

(22) Filed: Nov. 18, 2021

(51) Int. Cl.
*F02D 13/02* (2006.01)
*B60W 50/00* (2006.01)
*F02D 28/00* (2006.01)

(52) U.S. Cl.
CPC ..... *F02D 13/0203* (2013.01); *B60W 50/0097* (2013.01); *F02D 28/00* (2013.01); *B60W 2050/0008* (2013.01)

(58) Field of Classification Search
CPC ............... F02D 13/0203; F02D 28/00; B60W 50/0097; B60W 2050/0008
USPC ............... 701/102–105; 123/480; 290/40 R; 180/65.21
See application file for complete search history.

(56) References Cited

U.S. PATENT DOCUMENTS

2012/0045013 A1* 2/2012 Chen ................. G05B 5/01
375/295

* cited by examiner

*Primary Examiner* — Hai H Huynh
(74) *Attorney, Agent, or Firm* — Gennadiy Vinokur; Hironori Tsukamoto

(57) ABSTRACT

To control a hybrid dynamical system, a predictive feedback controller formulates a mixed-integer nonlinear programming (MINLP) problem including nonlinear functions of continuous optimization variables representing the continuous elements of the operation of the hybrid dynamical system and/or one or multiple linear functions of integer optimization variables representing the discrete elements of the operation of the hybrid dynamical system. The MINLP problem is formulated into a separable format ensuring that the discrete elements of the operation are present only in the linear functions of the MINLP problem. The MINLP problem is solved over multiple iterations using a partial convexification of a portion of a space of the solution including a current solution guess. The partial convexification produces a convex approximation of the nonlinear functions of the MINLP without approximating the linear functions of the MINLP to produce a partially convexified MINLP.

27 Claims, 41 Drawing Sheets

Solve mixed-integer nonlinear program (MINLP) in separable format $$\min_{X,U,W} \sum_{k=0}^{N-1} l_k(x_k, u_k) + m(x_N) + \sum_{k=0}^{N} c_k^T w_k \quad \sim 281$$

s.t. $x_0 = \hat{x}_{t_i}, \quad \sim 282$ $x_{k+1} = \psi_k(x_k, u_k) + D_k w_k, \quad \forall k \in \mathbb{Z}_0^{N-1}, \quad \sim 283$ $0 \geq h_k(x_k, u_k) + E_k w_k, \quad \forall k \in \mathbb{Z}_0^{N-1}, \quad \sim 284$ $0 \geq h_N(x_N) + E_N w_N, \quad \sim 285$ $w_{k,j} \in \mathbb{Z}^{n_{x_j}}, \forall j \in \mathbb{Z}_1^{n_x}, k \in \mathbb{Z}_0^{N}, \quad \sim 286$

280

$\equiv \sim 625$

Compact formulation of the optimal control structured MINLP for the MINMPC controller $\min_{y,z}$ $f(y) + c^T z \quad \sim 631$ s.t. $g(y) + Dz = 0, \quad \sim 632$ $h(y) + Ez \leq 0, \quad \sim 633$ $z_j \in \mathbb{Z}, \quad \forall j \in \mathbb{Z}_1^{n_z}, \quad \sim 634$ $y = [x_0^T, u_0^T, \ldots, u_{N-1}^T, x_N^T]^T \quad \sim 636$ $z = [w_0^T, \ldots, w_N^T]^T \quad \sim 637$

Algorithm 1 Line Search MISQP Method for MINLP (2). ~ 740

1: Input: Initial guess $(y^0, z^0)$, $\eta, \beta \in (0, 1)$ and $\epsilon_{tol} > 0$. ~ 741
2: $k \leftarrow 0$.
3: while $\|r(y^k, z^k)\| > \epsilon_{tol}$ do ~ 742
4:     if $k \geq N_{miqp}$ then ~ 743
5:         Solve QP (4) for fixed $\Delta z = 0$ to compute $\Delta y^k$. ~ 675
6:     else
7:         Solve MIQP in (4) to compute $(\Delta y^k, \Delta z^k)$. ~ 680
8:     end if
9:     Update integer variables $z^{k+1} \leftarrow z^k + \Delta z^k$. ~ 325
10:    Compute $\rho$ to ensure (7) and $\alpha^k \leftarrow 1$. ~ 747
11:    while (12) not satisfied do ~ 748
12:        $\alpha^k \leftarrow \tilde{\beta}\alpha^k$ for $\tilde{\beta} \in (0, \beta]$. ~ 749
13:    end while
14:    $y^{k+1} \leftarrow y^k + \alpha^k \Delta y^k$ and $k \leftarrow k + 1$. ~ 335
15: end while

Fig. 7C

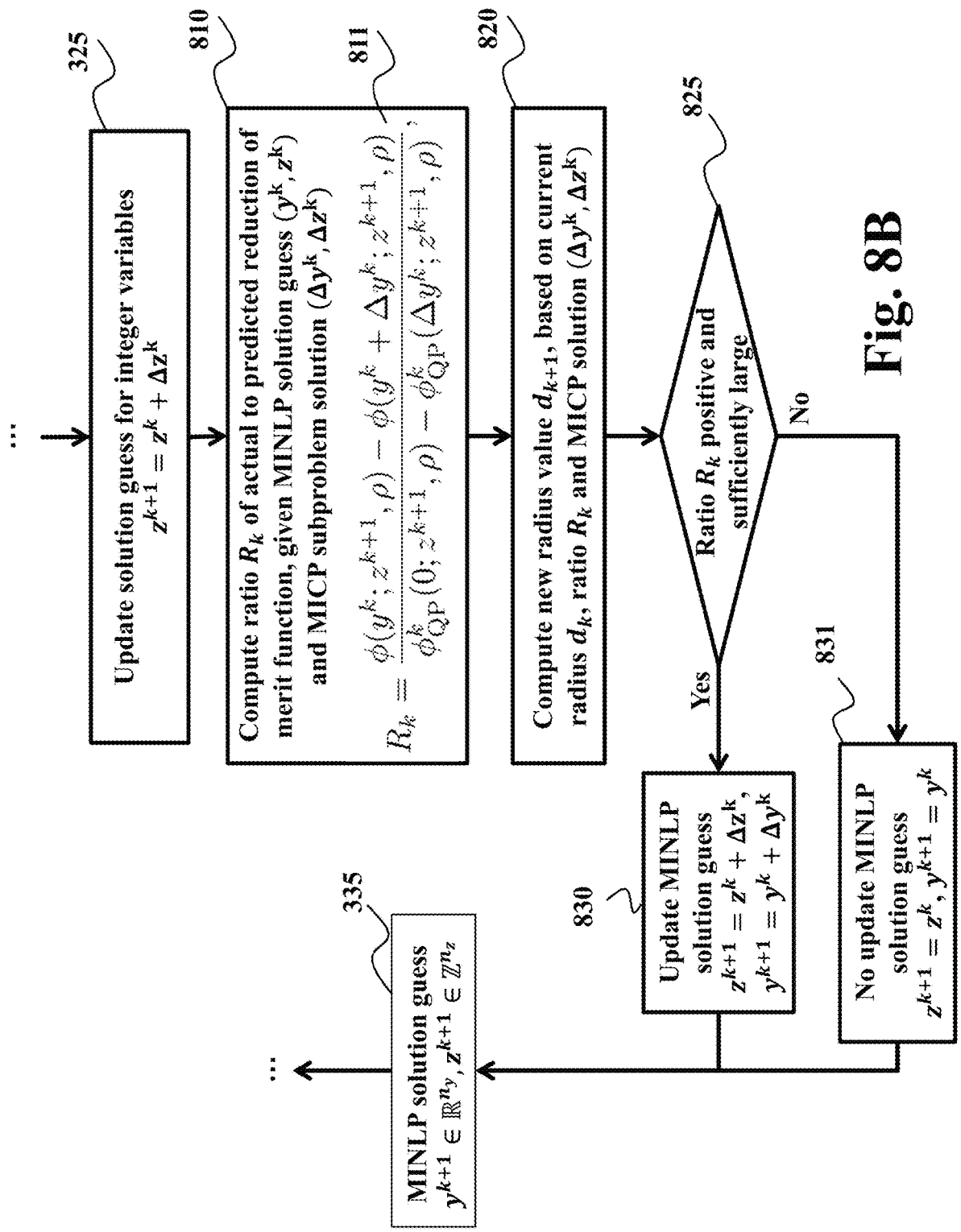

Algorithm 2 Trust-Region MISQP Method for MINLP (2). ~ 850

1: Input: Initial guess $(y^0, z^0)$, values $0 < \eta_1 \leq \eta_2 \leq \eta_p < 1$, $0 < \gamma_1 \leq \gamma_2 < 1 \leq \gamma_3$, $0 < \underline{d} < \overline{d}$ and $d_0 \in [\underline{d}, \overline{d}]$. ~ 851
2: $k \leftarrow 0$.
3: while $\|r(y^k, z^k)\| > \epsilon_{tol}$ do ~ 742
4:   if $k \geq N_{miqp}$ then ~ 743
5:     Solve QP (3) for fixed $\Delta z = 0$ to compute $\Delta y^k$. ~ 854
6:   else
7:     Solve MIQP in (13) to compute $(\Delta y^k, \Delta z^k)$. ~ 855
8:   end if
9:   Compute ratio $R_k$ in (14). ~ 810
10:   if $R_k \geq \eta_1$ then   ▷ Accept step ~ 825
11:     $y^{k+1} \leftarrow y^k + \Delta y^k$ and $z^{k+1} \leftarrow z^k + \Delta z^k$. ~ 830
12:   else   ▷ Reject step
13:     $y^{k+1} \leftarrow y^k$ and $z^{k+1} \leftarrow z^k$. ~ 831
14:   end if
    Trust-region radius update: ~ 820
15:   $d_{k+1} \leftarrow d_k$.
16:   if $R_k < \eta_1$ then ~ 861
17:     $d_{k+1} \leftarrow \max(\gamma_1 \|M \Delta y^k\|_p, \underline{d})$. ~ 862   ▷ Shrink
18:   else if $\|M \Delta y^k\|_p < \gamma_1 d_k$ then ~ 863
19:     $d_{k+1} \leftarrow \max(\gamma_2 d_k, \underline{d})$. ~ 864   ▷ Shrink
20:   else if $R_k > \eta_2$ and $\|M \Delta y^k\|_p = d_k$ then ~ 865
21:     $d_{k+1} \leftarrow \min(\gamma_3 d_k, \overline{d})$. ~ 866   ▷ Grow
22:   end if
23: end while

Fig. 8D

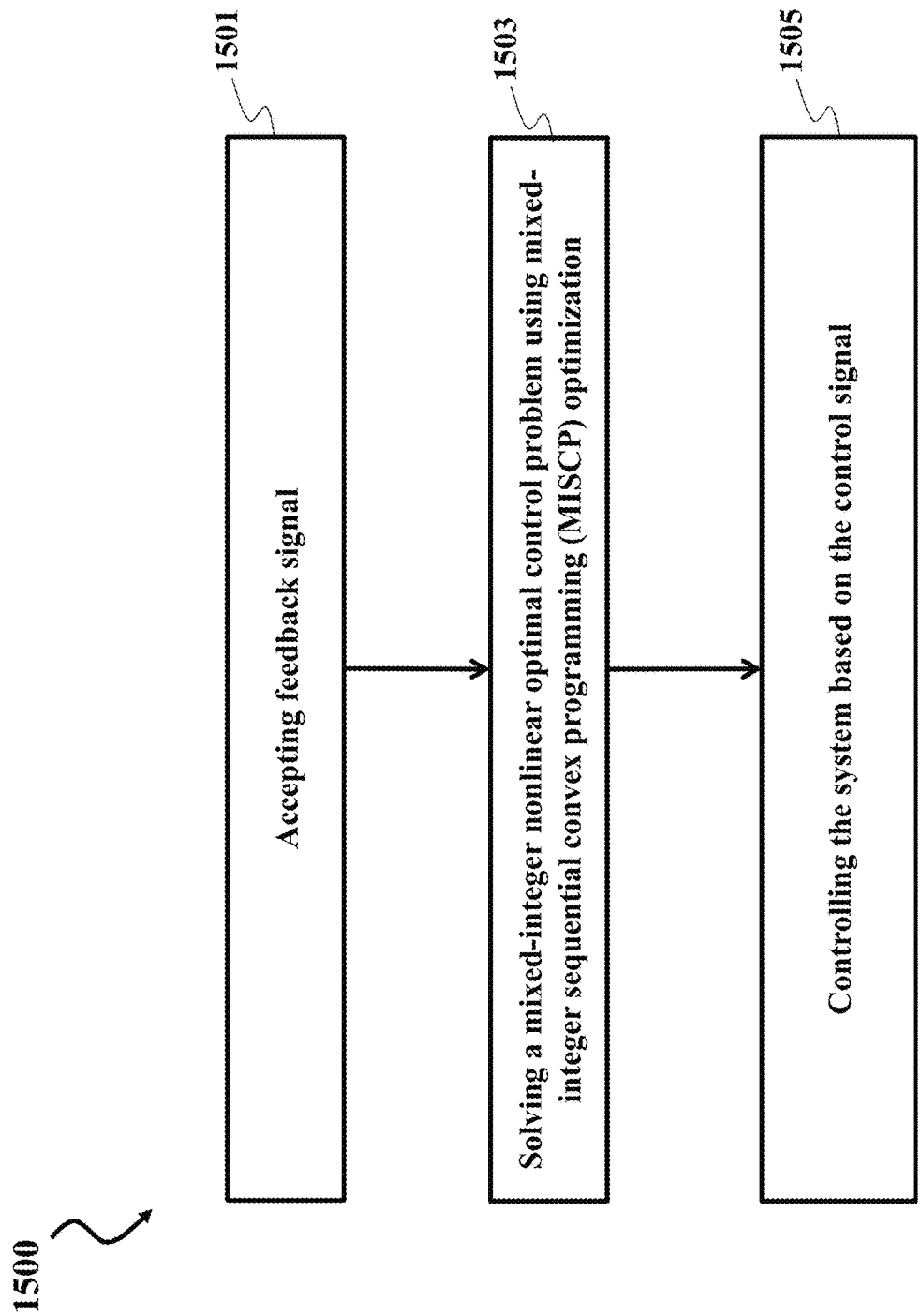

SEQUENTIAL CONVEXIFICATION METHOD FOR MODEL PREDICTIVE CONTROL OF NONLINEAR SYSTEMS WITH CONTINUOUS AND DISCRETE ELEMENTS OF OPERATIONS

TECHNICAL FIELD

The present disclosure relates generally to mixed-integer nonlinear optimization-based control, and more particularly to a sequential convexification method and apparatus for model predictive control of systems that are described by nonlinear dynamics with continuous and discrete elements of operations.

BACKGROUND

Optimization based decision making, planning and control techniques, such as model predictive control (MPC), allow a model-based design framework in which the system dynamics, the system requirements and constraints can directly be taken into account. This framework has been extended to hybrid dynamical systems, including both continuous and discrete decision variables, which provides a powerful technique to model a large range of problems, e.g., including dynamical systems with mode switchings or systems with quantized actuation, problems with logic rules, temporal logic specifications or obstacle avoidance constraints. However, the resulting optimization problems are highly non-convex, and therefore difficult to solve in practice, because they contain variables which only take discrete values (e.g., binary or integer values). When using nonlinear system dynamics, one or multiple nonlinear constraint functions and/or a nonlinear objective function, the resulting optimal control problem (OCP) can be formulated as a mixed-integer nonlinear programming (MINLP) problem, which is NP-hard and therefore computationally difficult to solve.

In general, mixed-integer nonlinear model predictive control (MINMPC) requires the solution of a non-convex MINLP, i.e., the optimization problem is non-convex even after relaxing the integrality constraints, e.g., due to the nonlinear system dynamics, nonlinear constraint functions and/or objective functions. Most successful global optimization algorithms for MINLPs require convexity of the objective and constraint functions, which can therefore not be used to solve MINMPC problems to global optimality. Even though global optimization algorithms exist for non-convex MINLPs, e.g., using relaxations of factorable problems, they are usually computationally very expensive and hence generally not yet practical for real-time implementations of MINMPC.

Decision making, planning or control for hybrid systems aims to solve an MINLP at every sampling time instant to enable real-time MINMPC applications. Hence, some methods therefore focus on approximate or heuristic techniques to find feasible but (possibly) suboptimal solutions to MINLPs within strict timing requirements. Some existing techniques are based on global algorithms for convex MINLPs, which can be used to find approximate solutions to non-convex MINLPs, e.g., using outer approximation or hybrid branch-and-bound (hB&B) methods. Specifically for non-convex MINMPC, a variant of the real-time iterations (RTI) algorithm has been proposed based on outer convexification in combination with rounding schemes. However, when inequality constraints depend directly on the discrete decision variables, the latter approach requires solving mathematical programs with vanishing constraints, which are particularly challenging.

Sequential convexification techniques, e.g., using sequential convex programming (SCP) or sequential quadratic programming (SQP) methods form a popular technique to solve general nonlinear programming (NLP) problems. In particular, sequential convexification techniques have been used successfully for the real-time implementation of nonlinear model predictive control (NMPC) with smooth nonlinear dynamics, nonlinear constraint functions and/or inequality constraints. However, there is a need for the extension of these methods to NMPC for systems with both continuous and discrete elements of operation, i.e., including continuous as well as integer and/or binary decision variables in MINMPC.

In recent prior work, a mixed-integer sequential quadratic programming (MISQP) method was proposed that is based on the use of a trust region radius for both continuous and integer optimization variables. The method requires the solution of a mixed-integer quadratic programming (MIQP) subproblem at each iteration, which can be solved efficiently, e.g., using state of the art branch-and-bound (B&B) optimization methods. The standard MISQP method however relies on the assumption that integer variables have a smooth influence on the MINLP, i.e., incrementing an integer variable by one leads to a small change of function values. However, the latter assumption is generally not true for MINMPC because, for example, the constrained optimization problem may include binary variables that have a large influence on the optimal control trajectories.

Therefore, there is a need for a sequential convexification method that is more generally applicable to MINMPC problems, which is the aim of the system and method described in the present invention.

SUMMARY

Embodiments of the invention are based on the solution of a sequence of one or multiple mixed-integer convex programming (MICP) subproblems, in which the preparation of each subproblem is performed based on a partial convexification technique in order to compute a feasible but possibly suboptimal solution of the mixed-integer nonlinear optimal control problem at each sampling time instant of the proposed MINMPC controller. The solution of each MICP subproblem can be used to compute an update to the optimal solution guess for all integer and/or binary decision variables, as well as a new search direction for the continuous decision variables. In addition, based on the updated values for integer and/or binary decision variables, and based on the new search direction for continuous decision variables, the current solution guess for the continuous decision variables can be updated in each iteration of the mixed-integer sequential convex programming (MISCP) optimization algorithm.

Some embodiments of the invention are based on the realization that any MINLP can be reformulated as a different but mathematically equivalent MINLP in separable format, in which all integer and/or binary decision variables enter linearly in all constraint and objective functions. The latter reformulation can be achieved, for example, by defining one or multiple auxiliary continuous optimization variables to ensure that all integer and/or binary optimization variables enter linearly in constraint and objective functions. Specifically, all nonlinear functions that may be present in the constraint and objective functions of the MINMPC formulation in separable format therefore depend only on continuous optimization variables. Some embodiments of the invention are based on the realization that the latter linear dependency of the constraint and objective functions in the MINMPC formulation on all integer and/or binary decision variables can be used to avoid the smoothness requirement, i.e., incrementing an integer variable by one leads to a small change of function values, which limits the applicability of standard MISQP algorithms for MINMPC.

A partial convexification technique is used to prepare the MICP subproblem in each iteration of the proposed MISCP optimization algorithm. Some embodiments of the invention are based on the realization that the partial convexification technique needs to be applied only to smooth nonlinear functions, due to the linear dependency of the constraint and objective functions in the MINMPC formulation on all integer and/or binary decision variables. In some embodiments of the invention, the partial convexification technique is based on a local linearization of all smooth nonlinear functions that may be present in the constraint and objective functions of the MINMPC formulation, based on a solution guess for the continuous optimization variables in the current iteration of the MISCP algorithm. Alternatively, in other embodiments of the invention, a partial convexification technique can be used to compute more general convex approximations of nonlinear functions in one or multiple inequality constraints of the MINMPC problem formulation, resulting in convex quadratic inequality constraints in a mixed-integer quadratically constrained quadratic programming (MIQCQP) subproblem, or convex second order cone constraints in a mixed-integer second order cone programming (MISOCP) subproblem.

Embodiments of the invention are based on the realization that the solution of an MICP subproblem in each iteration of the proposed MISCP algorithm can be computed relatively fast, thanks to progress that has been made over past decades in the development of state of the art solvers for MICPs. For example, branch-and-bound methods can be used to efficiently solve a mixed-integer quadratic programming (MIQP) or a mixed-integer linear programming (MILP) subproblem. State of the art branch-and-bound methods for MIQPs and/or MILPs may include advanced primal heuristics, branching strategies, presolve operations, cut generation techniques, and convex solvers with early termination and infeasibility detection to effectively reduce the size of the branch-and-bound search tree and therefore reduce the amount of convex relaxations that need to be solved in order to compute the globally optimal solution to each MIQP/MILP.

Some embodiments of the invention are based on the realization that the update of the continuous decision variables in each MISCP iteration can be performed in a particular way to ensure some amount of progress is made in computing a feasible but possibly suboptimal solution to the MINLP problem. Some embodiments of the invention use a globalization strategy based on a merit function that quantifies a combination of optimality and constraint satisfaction for a solution guess of values for continuous and discrete decision variables. One example of a merit function is based on an $l_1$ penalty function, applied to each of the equality constraints and to the violation of each of the inequality constraints in the MINMPC problem formulation, excluding the integrality constraints which are automatically satisfied by design for each of the integer and/or binary decision variables at each iteration of the proposed MISCP optimization algorithm.

In some embodiments of the invention, the globalization strategy is based on a line search method that computes a step size $\alpha^k \in (0,1]$ in order to update the continuous optimization variables $y^{k+1} = y^k + \alpha^k \Delta y^k$, based on the search direction $\Delta y^k$ for the continuous optimization variables y that is computed in the $k^{th}$ iteration of the MISCP optimization algorithm. The step size selection aims to satisfy a condition for the sufficient decrease of the value for the merit function, evaluated at the new solution guess $y^{k+1}$, compared to the original value of the merit function for the solution guess $y^k$ and given a directional derivative of the merit function at each iteration of the MISCP algorithm.

In some embodiments of the invention, the globalization strategy is based on a trust-region method that computes a subregion in the space of continuous decision variables, in which the local convex approximation of the nonlinear constraint and/or objective functions is sufficiently accurate. The accuracy of the partial convexification can be approximately evaluated based on the ratio of the actual versus the predicted reduction in the value of the merit function from one solution guess to the next in each iteration of the MISCP optimization algorithm. Some embodiments of the invention are based on a trust-region radius, whose value can be either increased, decreased or kept the same in each iteration of the algorithm.

Some embodiments of the invention are based on the realization that a relatively small trust-region radius may be used when the MISCP optimization algorithm is sufficiently close to a feasible but possibly suboptimal solution to the MINMPC problem, resulting in a considerable reduction of the computational cost to solve the MICP subproblem due to the relatively small trust-region radius.

Some embodiments of the invention are based on a warm starting strategy that computes a guess for the optimal values of the continuous and of the integer and/or binary decision variables, based on the feasible but possibly suboptimal solution to the MINMPC problem at the previous sampling time instant. For example, in some embodiments of the invention, a time shifting procedure by one sampling time period can be used to warm start the solution guess for the MISCP optimization algorithm, given the optimal or approximately optimal solution to the MINLP at the previous sampling time instant of the proposed MINMPC controller.

Some embodiments of the invention are based on a limited number of one or multiple solutions of MICP subproblems, after which some or all of the integer and/or binary decision variables remain fixed, resulting in a number of one or multiple solutions of convex programming (CP) subproblems. The upper bound on the number of MICP solutions can be chosen sufficiently large to enable the MISCP optimization algorithm to compute a good feasible but possibly suboptimal solution to the MINMPC problem, while remaining relatively small such that the computational cost of the algorithm can be reduced considerably. For example, in some embodiments of the invention, only a single MICP subproblem needs to be solved at each sampling time instant of the real-time feasible MINMPC controller.

Some embodiments of the invention are based on the realization that one or multiple solutions of CP subproblems can be performed with a computational cost that is considerably smaller than one or multiple solutions of MICP subproblems. Some embodiments of the invention are based on the realization that fixing of some or all of the integer and/or binary decision variables, after a limited number of one or multiple solutions of MICP subproblems, may prevent cycling of the MISCP optimization algorithm in the proposed MINMPC controller.

In some embodiments of the invention, the number of MISCP iterations is determined by a termination condition of the optimization algorithm, which can be based on a norm of the Karush-Kuhn-Tucker (KKT) necessary conditions of optimality for the MINLP, excluding the integrality conditions.

In some embodiments of the invention, a homotopy-type penalty method can be used to adjust the cost function in each MICP subproblem to increasingly enforce the MISCP algorithm to compute an update to the optimal solution guess for some or all of the integer and/or binary decision variables that remains close to the solution guess of the integer and/or binary decision variables at the previous MISCP iteration. For example, a term $w_i z_i$ can be added to the cost function of the MICP minimization subproblem, where $w_i > 0$ is a positive weight value, to ensure a binary variable $z_i \in \{0,1\}$ to remain close to a solution guess $z_i^k = 0$. Alternatively, a term $w_i(1-z_i)$ can be added to the cost function of the MICP minimization subproblem, where $w_i > 0$ is a positive weight value, to ensure a binary variable $z_i \in \{0,1\}$ to remain close to a solution guess $z_i^k = 1$.

Some embodiments of the invention are based on the realization that the use of a homotopy-type penalty method for some or all of the integer and/or binary decision variables may prevent cycling in the MISCP optimization algorithm. In addition, some embodiments of the invention are based on the realization that the use of a homotopy-type penalty method for some or all of the integer and/or binary decision variables may considerably reduce the computational cost of solving the MICP subproblems in the MISCP optimization algorithm.

Accordingly, one embodiment discloses a predictive feedback controller for controlling a hybrid dynamical system with nonlinear dynamics and continuous and discrete elements of operation, the predictive feedback controller comprising: at least one processor; and a memory having instructions stored thereon that, when executed by the at least one processor, cause the predictive feedback controller to:
  accept feedback signal including measurements indicative of a current state of the hybrid dynamical system including one or a combination of a current state of the predictive controller, a current state of one or multiple actuators of the hybrid dynamical system, and a current state of outputs of the hybrid dynamical system;
  formulate a mixed-integer nonlinear programming (MINLP) problem optimizing an objective function subject to one or multiple constraints with a solution indicative of a control command for changing the current state of the hybrid dynamical system according to a control objective, wherein the constraints include equality constraints, inequality constraints, or both, and wherein the constraints and the control objective of the MINLP problem include one or multiple nonlinear functions of continuous optimization variables representing the continuous elements of the operation of the hybrid dynamical system and one or multiple linear functions of integer optimization variables representing the discrete elements of the operation of the hybrid dynamical system, such that the MINLP problem is formulated into a separable format ensuring that the discrete elements of the operation are present only in the linear functions of the MINLP problem;
  solve the MINLP problem over multiple iterations of a sequential convexification-based optimization procedure until a termination condition is met, wherein, to perform an iteration, the predictive feedback controller is configured to perform a partial convexification of a portion of a space of the solution including a current solution guess, wherein the partial convexification produces a convex approximation of the nonlinear functions of the MINLP without approximating the linear functions of the MINLP to produce a partially convexified MINLP; and update the current solution guess by solving a mixed-integer convex programming (MICP) formulation of the partially convexified MINLP problem; and
  submit the control command generated according to the solution of the MINLP problem to the hybrid dynamical system thereby causing a change of the current state of the hybrid dynamical system.

BRIEF DESCRIPTION OF THE DRAWINGS

FIG. 6A illustrates a block diagram of a compact formulation of the optimal control structured MINLP in separable format, which is solved at each time step of the MINMPC controller according to some embodiments of the invention.

FIG. 7C illustrates pseudo code of an MISQP optimization method, based on a line search procedure, to compute a feasible and (locally) optimal solution for the MINLP in an MINMPC controller, according to some embodiments.

FIG. 8B illustrates a block diagram of a trust-region procedure, based on a ratio of actual to predicted reduction for the value of a merit function and based on a trust-region radius value, to update the MINLP solution guess in each iteration of the sequential convexification-based optimization procedure.

FIG. 8D illustrates pseudo code of an MISQP optimization method, based on a trust-region search procedure, to compute a feasible and (locally) optimal solution for the MINLP in an MINMPC controller, according to some embodiments.

FIG. 15 illustrates a method for controlling a system, according to an example embodiment.

DETAILED DESCRIPTION

Some embodiments of the present disclosure provide a system and a method for controlling an operation of a system or a system using a predictive controller. An example of the predictive controller is a mixed-integer nonlinear model predictive controller (MINMPC) determining control inputs based on a nonlinear model of the controlled system having continuous and discrete elements of operations.

Figure 1A:
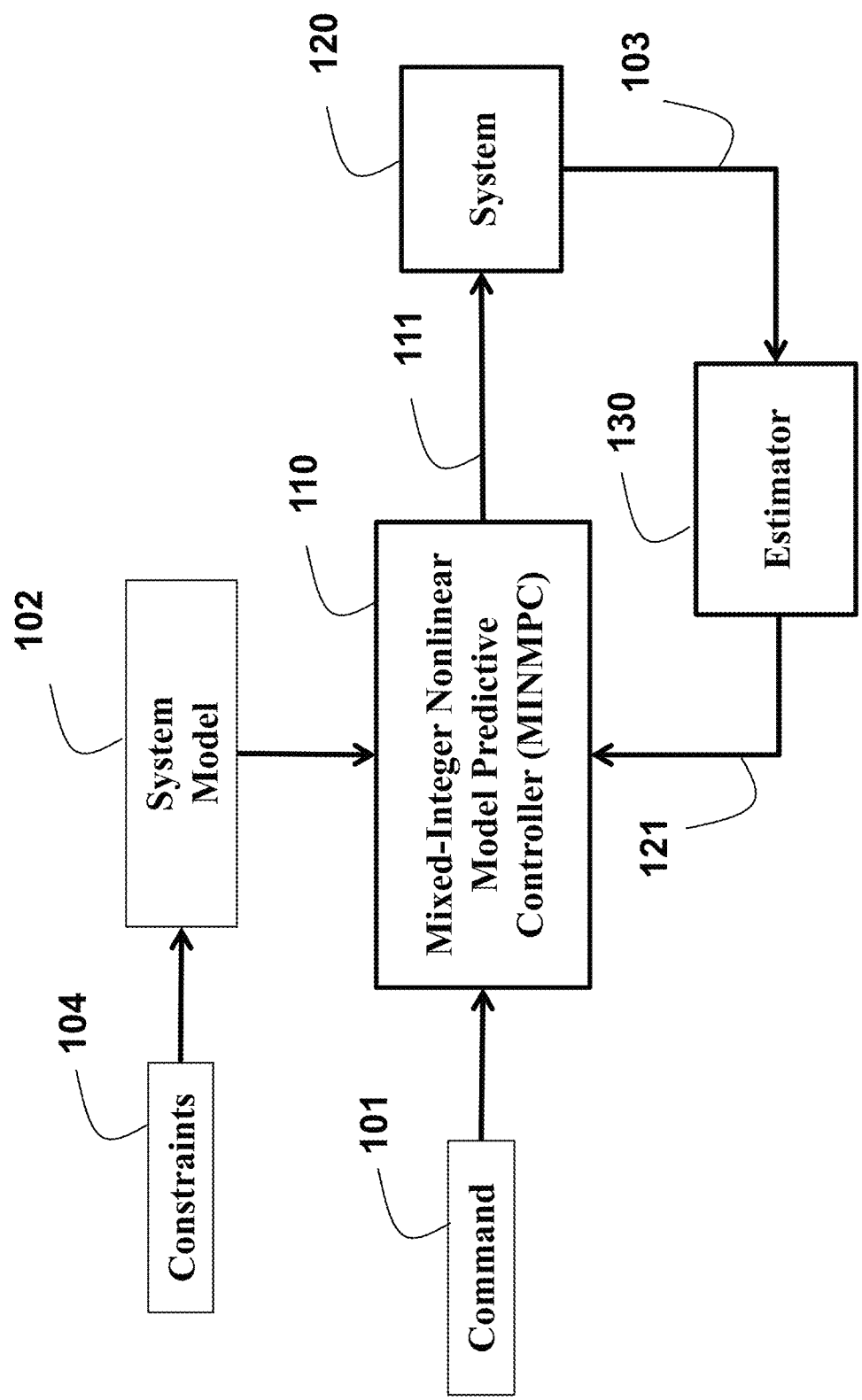
FIG. 1A illustrates a block diagram of a mixed-integer nonlinear model predictive controller and feedback system, according to some embodiments.

FIG. 1A illustrates a block diagram of a predictive controller 110 and feedback system 120, according to some embodiments. FIG. 1A shows an example feedback system (or system) 120 connected to the predictive controller 110 (or controller) via a state estimator 130 according to some embodiments. In some implementations, the predictive controller 110 is an MINMPC controller programmed according to a dynamical model 102 (or system model) of the system 120. The system model 102 can be a set of equations representing changes of the state and output 103 of the system 120 over time as functions of current and previous inputs 111 and previous outputs 103. The system model 102 can include constraints 104 that represent physical and operational limitations of the system 120. During the operation, the controller 110 receives a command 101 indicating the desired behavior of the system 120. The command can be, for example, a motion command. In response to receiving the command 101, the controller 110 generates a control signal 111 that serves as an input for the system 120 including both continuous and discrete elements of operation. In response to the input, the system updates the output 103 of the system 120. Based on measurements of the output 103 of the system 120, the estimator 130 updates the estimated state 121 of the system 120. This estimated state 121 of the system 120 provides the state feedback to the predictive controller 110. Thus, the predictive controller initially accepts feedback signal 121 of the system 120, via the estimator 130, where the feedback signal 121 includes measurements of a state of the system 120.

The system 120, as referred herein, can be any machine or device controlled by certain manipulation input signals, e.g., control signal 111 (inputs). The control input signal can possibly include continuous elements such as voltages, pressures, forces, torques, steering angles, velocities, and temperatures, as well as discrete elements such as energy levels, quantized valve inputs, gear shifts, on/off actuation, lane selection, and obstacle avoidance decision variables. The system 120 returns some controlled output signals 103 (outputs), possibly including continuous elements such as currents, flows, velocities, positions, temperatures, heading and steering angles, as well as discrete elements such as energy levels, quantized valve states, gear status, on/off status, and lane position, etc. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

The system model 102 may include a set of mathematical equations that describe how the system outputs change over time as functions of current and previous inputs, and the previous outputs. The mathematical equations can include one or multiple smooth equations depending on continuous variables as well as one or multiple mixed-integer equations depending on both continuous and discrete variables. Each function in the mathematical equations can be either a linear or a smooth nonlinear function. The state of the system 120 is any set of information, in general time varying, for instance an appropriate subset of current and previous inputs and outputs, that, together with the model of the system and future inputs, can uniquely define the future motion of the system.

The system 120 can be subject to physical limitations and specification constraints 104 limiting the range where the outputs, the inputs, and also possibly the states of the system 120 are allowed to operate. The constraints can include one or multiple smooth equations depending on continuous variables as well as one or multiple mixed-integer equations depending on both continuous and discrete variables. The constraint functions can be either linear or smooth nonlinear functions. Some embodiments of the invention are based on the realization that first or higher order directional derivatives can be computed for each of the smooth nonlinear functions in the constraints 104.

The predictive controller 110 can be implemented in hardware or as a software program executed in a processor, e.g., a microprocessor, which at fixed or variable control period sampling intervals receives the estimated state 121 of the system 120 and the desired motion command 101 and determines, using this information, the inputs, e.g., the control signal 111, for operating the system 120. The predictive controller 110 further solves an optimal control structured mixed-integer nonlinear programming (MINLP) problem using a mixed-integer sequential convex programming (MISCP) method, optimizing a current solution of the objective function subject to one or multiple equality and/or inequality constraints over multiple iterations until a termination condition is met, e.g., until the solution is feasible and (locally) optimal for the optimal control structured MINLP. Each iteration of the MISCP method performs a partial convexification of a portion of a space of the solution including the current solution, wherein the partial convexification produces a convex approximation of the smooth nonlinear functions of the MINLP without approximating the linear functions of the MINLP to produce a partially convexified MINLP. Then, each iteration can update the current solution by solving a mixed-integer convex programming (MICP) formulation of the partially convexified MINLP problem to produce a control signal 111. The predictive controller 110, further, controls the system 120 based on the control signal 111 to change the state of the system 120.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Thus, by using the MISCP optimization method, the processor computes a feasible and (locally) optimal solution for the optimal control structured MINLP by solving a sequence of MICP subproblems, where the formulation of each MICP subproblem is based on a partial convexification of a portion of the solution space. Due to the reduced computational complexity of solving the MICP subproblems compared to the computational complexity of solving the original MINLP, the processor is enabled to accurately determine feasible and (locally) optimal solutions to control the state of the system 120 in less time. Accordingly, the processor achieves fast processing speed with high accuracy.

Figure 1B:
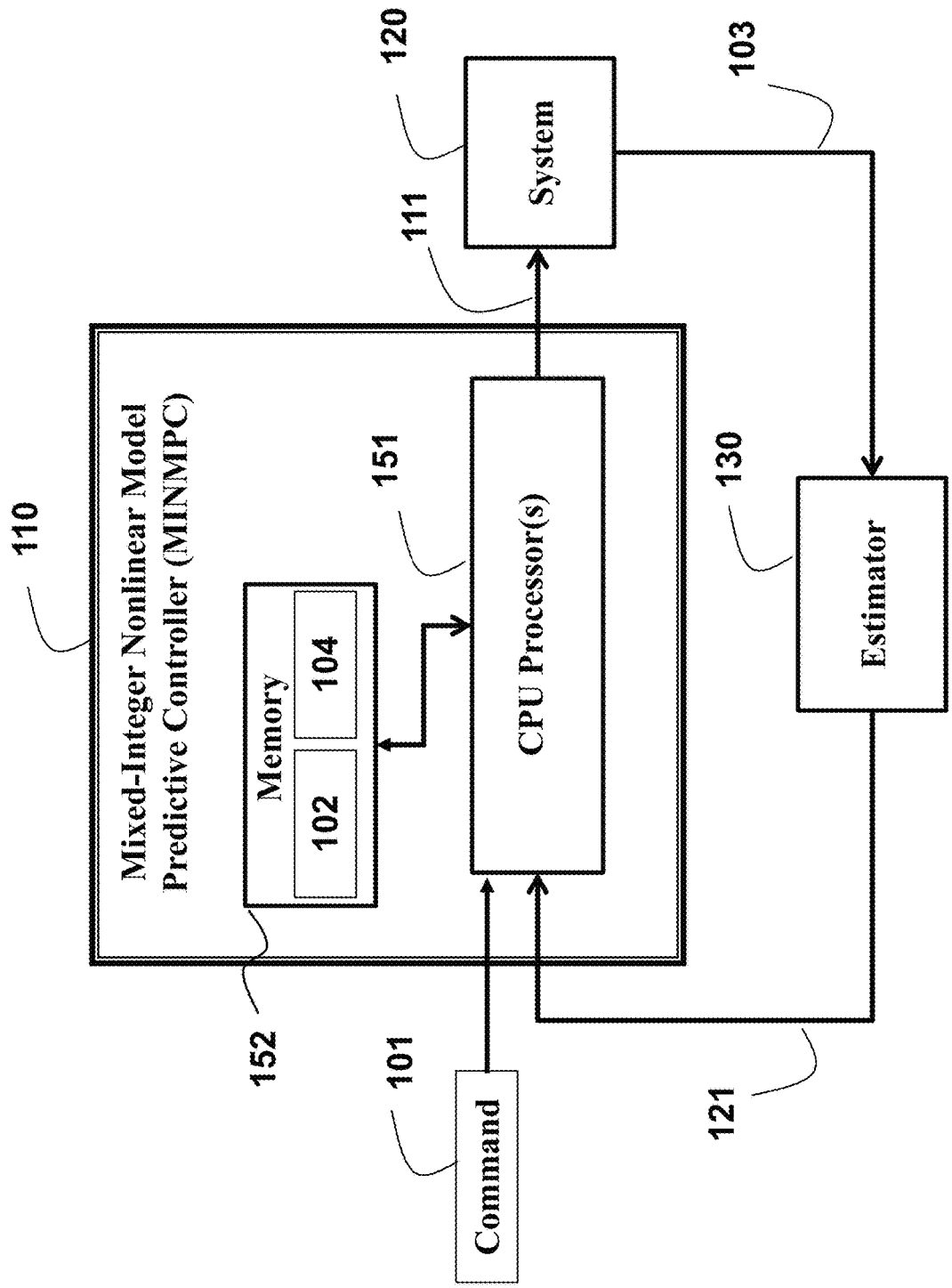
FIG. 1B illustrates a block diagram of the mixed-integer nonlinear model predictive controller and the feedback system, according to some embodiments.

FIG. 1B illustrates a block diagram of the mixed-integer nonlinear predictive controller 110 and the feedback system 120, according to some embodiments. The predictive controller 110 actuates the system 120 such that the estimated state 121 of the system 120 and output 103 follow the command 101. The controller 110 includes a computer, e.g., in the form of a single central processing unit (CPU) or multiple CPU processors 151 connected to memory 152 for storing the system model 102 and the constraints 104 on the operation of the system 120. The CPU processors 151 may be comprised of a single core processor, a multi-core processor, a computing cluster, or any number of other configurations. The memory 152 may include random access memory (RAM), read only memory (ROM), flash memory, or any other suitable memory systems.

Figure 1C:
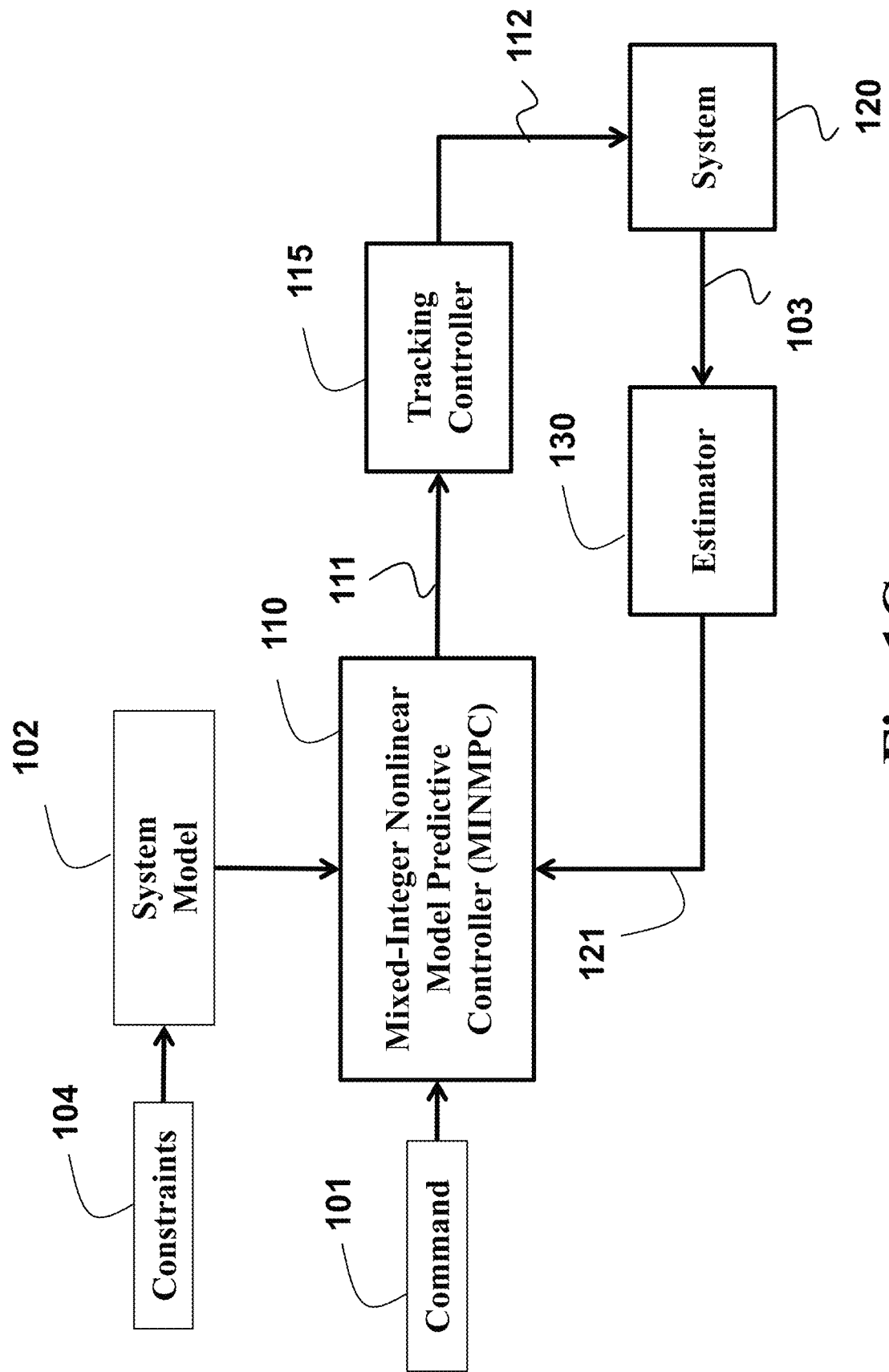
FIG. 1C illustrates a block diagram of a hierarchical integration between the mixed-integer nonlinear model predictive controller and a tracking controller to control the feedback system, according to some embodiments.

FIG. 1C illustrates a block diagram of a hierarchical integration between a mixed-integer nonlinear predictive controller 110 to compute a high-level control signal 111 and a tracking controller 115 that aims to track the high-level control signal 111 and to compute a low-level control signal 112 to directly control the feedback system 120, according to some embodiments of the invention. For example, the predictive controller 110 can be a MINMPC controller to compute a reference motion trajectory based on a nonlinear dynamical model of the controlled system having continuous and discrete elements of operations, and the tracking controller 115 aims to execute (part of) the reference motion trajectory by directly sending control inputs 112 to the actuators of the controlled system.

An example of a tracking controller 115 can be based on a proportional-integral-derivative (PID) controller to track the time-varying reference motion trajectory that is computed by the MINMPC controller 110. In some embodiments of the invention, the tracking controller 115 can be based on a model predictive controller (MPC) with a relatively simplified dynamical model and a set of simplified constraints, and therefore requiring a relatively small computational complexity. For example, the MPC tracking controller 115 can be based on a linear-quadratic objective function, linear dynamical model and linear equality and inequality constraints, which requires the solution of a convex linear programming (LP) or a convex quadratic programming (QP) problem that is computationally much easier to solve than the MINLP that is solved by the MINMPC controller 110.

Some embodiments of the invention are based on the realization that a relatively long prediction horizon can be used for the mixed-integer nonlinear predictive controller 110 and a relatively short prediction horizon can be used for the tracking controller 115, such that a relatively fast sampling rate can be used for the tracking controller, e.g., with a sampling period of 10-100 milliseconds, while a relatively slow sampling rate can be used for the mixed-integer nonlinear predictive controller 110, e.g., with a sampling period of 0.5-2 seconds.

Some embodiments of the invention are based on the realization that a relatively high-level, low-accuracy dynamical model 102 and constraints 104 can be used in the MINLP formulation of the mixed-integer nonlinear predictive controller 110, due to the computational complexity of solving MINLPs, while a relatively low-level, high-accuracy dynamical model 102 and constraints 104 can be used in the design and formulation of the computationally cheap tracking controller 115. [what could be the minimum ratio of long/short perdition horizons?How the partial convexification helps to achieve this ratio?]

Figure 2A:
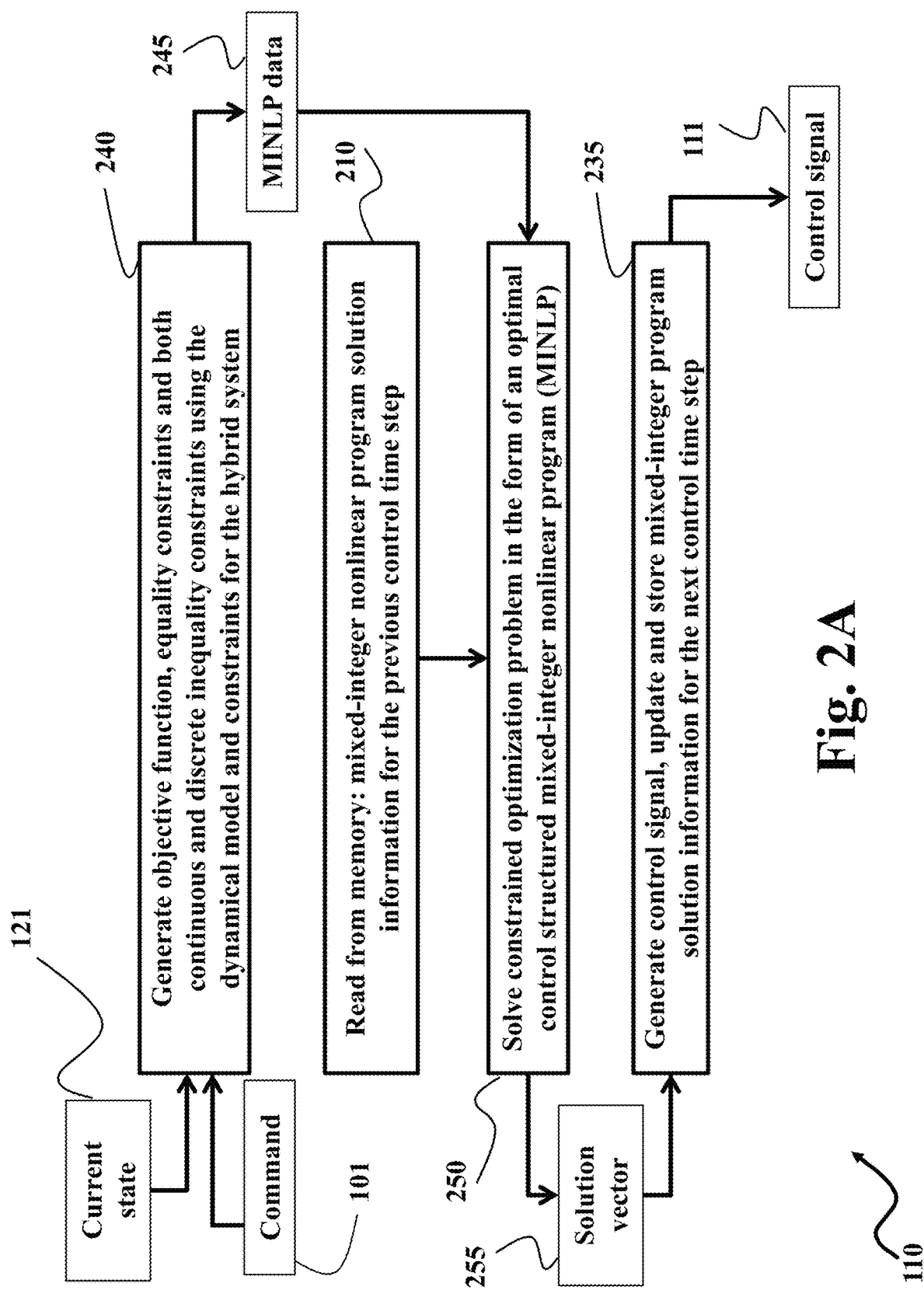
FIG. 2A illustrates a block diagram of a method for mixed-integer nonlinear model predictive control (MINMPC) to implement the predictive controller that computes the control signal, given the current state of the system, and the control command, according to some embodiments.

FIG. 2A illustrates a block diagram of a system and a method for mixed-integer nonlinear model predictive control (MINMPC) to implement the predictive controller 110 that computes the control signal 111, given the current state of the system 121 and the control command 101, according to some embodiments. Specifically, MINMPC computes a control solution, e.g., a solution vector 255 that can include a sequence of future optimal discrete and continuous control inputs over a prediction time horizon of the system 120, by solving a constrained mixed-integer nonlinear programming (MINLP) problem 250 at each control time step. The MINLP data 245 of the objective function, equality constraints, and discrete, continuous, and mixed-integer inequality constraints in this optimization problem 250 depends on the dynamical model, the system constraints 240, the current state of the system 121, objectives of control and the control command 101.

In some embodiments of the invention, the solution of this inequality constrained MINLP problem 250 uses one or multiple state and control values over a prediction time horizon, and potentially other MINLP solution information from the previous control time step 210, which can be read from the memory. This concept is called warm- or hot-starting of the optimization algorithm and it can reduce the required computational effort of the MINMPC controller in some embodiments. In a similar fashion, the corresponding solution vector 255 can be used to update and store in memory a sequence of one or multiple optimal state and control values over a prediction time horizon, and potentially other MINLP solution information for the next control time step 235.

In some embodiments, the mixed-integer optimization algorithm is based on a search algorithm to solve the MICP subproblem, which is the result of a partial convexification step in each iteration of the sequential convexification algorithm, such that the MINMPC controller updates and stores additional mixed-integer program solution information 260 in order to reduce the computational effort of the search algorithm at one or multiple iterations in the current and/or in the next control time step. In one embodiment, the MICP subproblem at each iteration is solved using a branch-and-bound optimization method and the warm starting information can include data related to the nodes in the binary search tree that are part of the solution path from the root node to the leaf node where the optimal integer-feasible control solution is found, in order to improve the node selection and variable branching strategies from one iteration to the next.

Figure 2B:
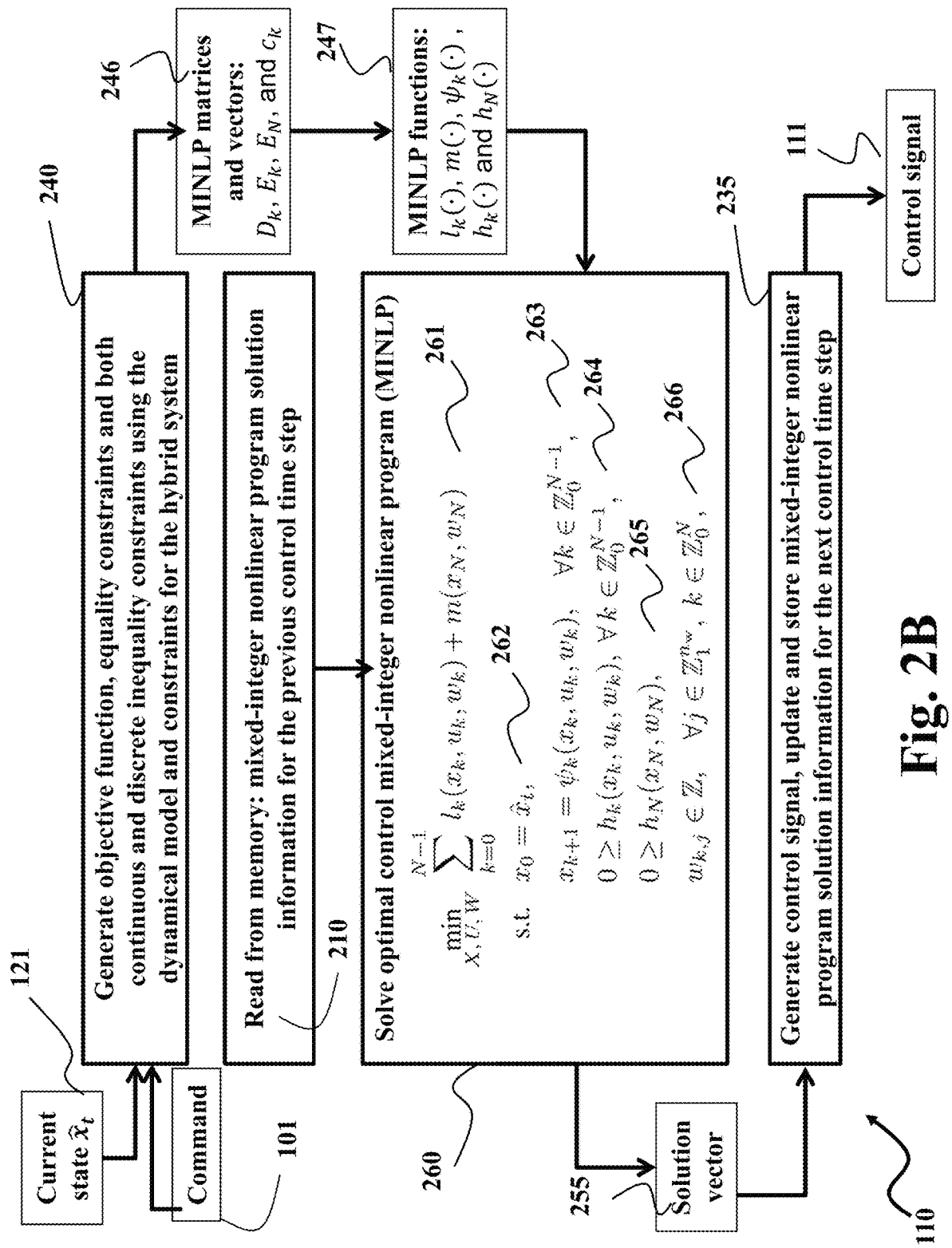
FIG. 2B illustrates a block diagram of an MINMPC method that solves an optimal control structured mixed-integer nonlinear program (MINLP), according to some embodiments.

FIG. 2B illustrates a block diagram of an MINMPC method that solves an optimal control structured MINLP 250 in order to compute the control signal 111 at each control time step, given the current state 121 of the system 120 and the command 101. Some embodiments of the invention are based on a nonlinear dynamical model of the system 263 with linear equality constraints 262, nonlinear mixed-integer inequality constraints 264 at each time step within the prediction time horizon, nonlinear mixed-integer inequality constraints 265 at a terminal time step of the prediction time horizon, linear discrete equality constraints 266, and a linear-quadratic or nonlinear objective function 261, such that a resulting constrained MINLP 260 needs to be solved at each control time step. The MINLP data 245 can include the MINLP matrices and vectors 246 and the MINLP functions 247 to formulate the optimal control structured MINLP 260.

In some embodiments of the invention, the nonlinear dynamical model of the system 263 is described by one or multiple linear and/or smooth nonlinear differential equations. In some embodiments of the invention, the dynamical model of the system 263 describes a linear or nonlinear hybrid system with state- and/or input-dependent jumps in the dynamic equations, for example, including piecewise linear and/or piecewise smooth nonlinear equations. Specifically, an equation $x_{k+1}=\psi_k(x_k, u_k, w_k)$ defines the state variables at the next time step $t_{k+1}$, given the state variables $x_k$, the control inputs $u_k$ and the integer variables $w_k$ at the previous time step $t_k$ within the prediction time horizon k=0, 1, ..., N−1.

In general, the linear discrete equality constraints 266 can state that a linear function of state and control variables is constrained to be equal to one of a discrete set of values. In some embodiments of the invention, the linear discrete equality constraints 266 can include integrality constraints, for example, a constraint $w_{k,j} \in \mathbb{Z}$ on a particular optimization variable $w_{k,j}$ to take only integer values. In some embodiments, the linear discrete equality constraints 266 can include binary equality constraints, for example, a constraint $w_{k,j} \in \{0,1\}$ on a particular optimization variable $w_{k,j}$ to be equal to either 0 or 1.

In some embodiments of the invention, the objective function 261 can include a summation of a stage cost within the prediction time horizon k=0, 1, ..., N−1 and a terminal cost at a final time step $t_N$. For example, in some embodiments, the stage cost $l_k(x_k, u_k, w_k)$ and the terminal cost $m(x_N, w_N)$ can include linear, linear-quadratic and/or nonlinear functions. In case the control command 101 includes a reference trajectory of state and control values $$\{x_k^{ref}, u_k^{ref}\}_{k=0,...},$$

the stage and terminal cost functions could read, for example, as follows $$l_k(x_k, u_k, w_k) = \|x_k - x_k^{ref}\|_Q^2 + \|u_k - u_k^{ref}\|_R^2$$
$$m(x_N, w_N) = \|x_N - x_N^{ref}\|_P^2$$

where the matrices Q, R, and P are typically symmetric and positive semidefinite, and $$\|x_k - x_k^{ref}\|_Q^2 = (x_k - x_k^{ref})^T Q (x_k - x_k^{ref}).$$

Similarly, in case the control command 101 includes a reference trajectory of state, control and integer values $$\{x_k^{ref}, u_k^{ref}, w_k^{ref}\}_{k=0,...},$$

the stage and terminal cost in the objective function 261 could read, for example, as follows $$l_k(x_k, u_k, w_k) = \|x_k - x_k^{ref}\|_Q^2 + \|u_k - u_k^{ref}\|_R^2 + \sum_j c_{k,j} |w_{k,j} - w_k^{ref}|$$
$$m(x_N, w_N) = \|x_N - x_N^{ref}\|_P^2 + \sum_j c_{N,j} |w_{N,j} - w_N^{ref}|$$

Figure 2C:
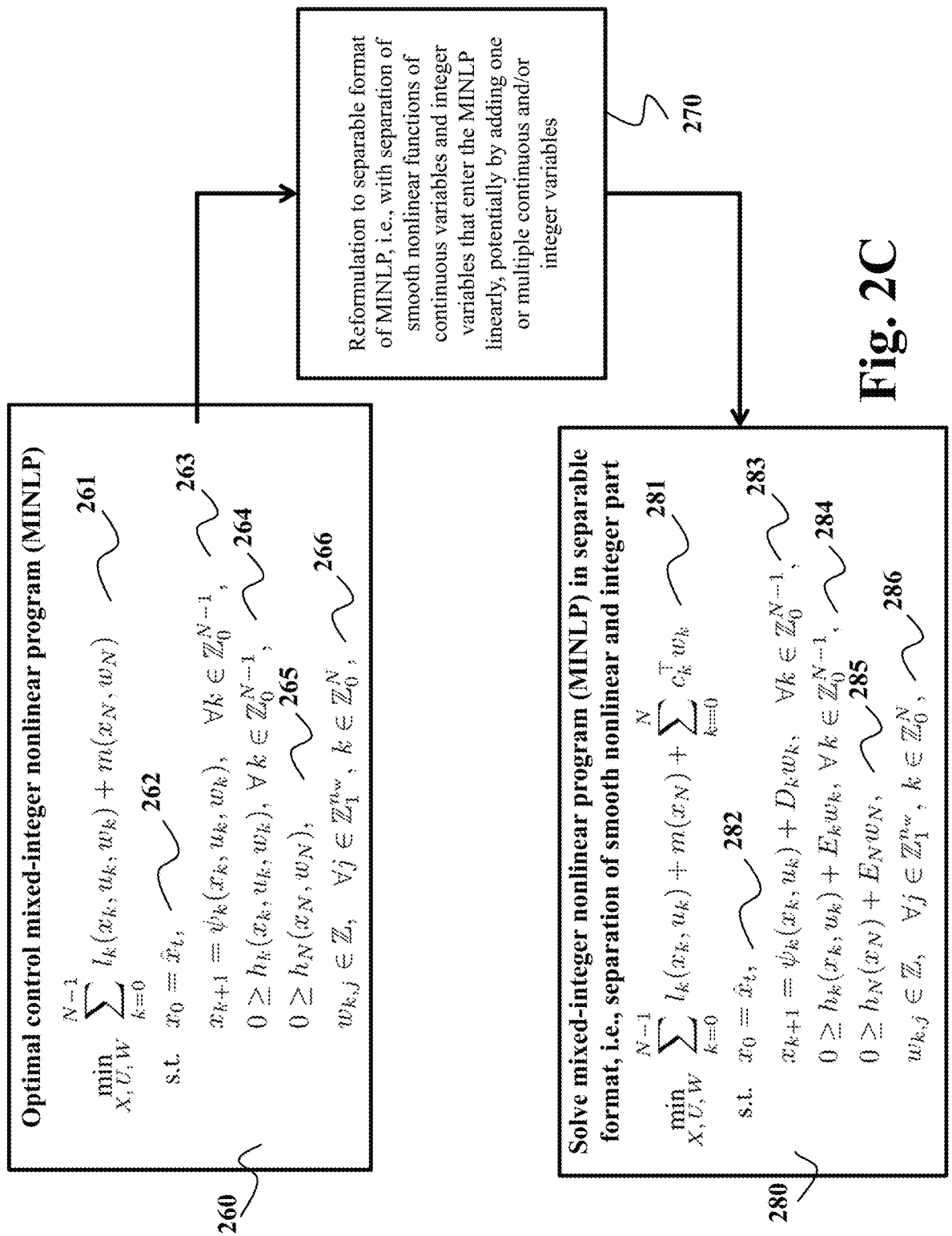
FIG. 2C illustrates a reformulation to separable format of the MINLP that is solved in an implementation of the MINMPC method, according to some embodiments.

FIG. 2C illustrates a reformulation of the optimal control structured MINLP 260 to separable format, i.e., with separation of smooth nonlinear functions of continuous variables and integer variables that enter the MINLP linearly, potentially by adding one or multiple continuous and/or integer variables 270. In some embodiments, the MINMPC predictive controller 110 solves the resulting MINLP in separable format 280 in order to compute the control signal 111 at each control time step, given the current state 121 of the system 120 and the command 101.

In some embodiments of the invention, the optimal control structured MINLP 260 can be reformulated trivially in separable format 270, for example, because the functions in the objective 261, the functions in the equality constraints 263, and the functions in the inequality constraints 264-265 are defined as follows $$l_k(x_k, u_k, w_k) = \tilde{l}_k(x_k, u_k) + c_k^T w_k$$
$$m(x_N, w_N) = \tilde{m}(x_N) + c_N^T w_N$$
$$\psi_k(x_k, u_k, w_k) = \tilde{\psi}_k(x_k, u_k) + D_k w_k$$
$$h_k(x_k, u_k, w_k) = \tilde{h}_k(x_k, u_k) + E_k w_k$$
$$h_N(x_N, w_N) = \tilde{h}_N(x_N) + E_N w_N$$

to define the functions in the objective 281, the functions in the equality constraints 283, and the functions in the inequality constraints 284-285 in separable format, based on matrices $D_k$, $E_k$, $E_N$ and vectors $c_k$ for each of the time steps within the prediction time horizon k=0, 1, ..., N−1.

In some embodiments of the invention, the optimal control structured MINLP 260 can be reformulated in separable format 270, for example, by defining one or multiple additional continuous input variables $\bar{u}_k$ and/or one or multiple additional integer optimization variables $\bar{w}_k$, such that the functions in the objective 281, the functions in the equality constraints 283, and the functions in the inequality constraints 284-285 in separable format read as follows $$\tilde{l}_k(x_k, \tilde{u}_k) + c_k^T \tilde{w}_k$$
$$\tilde{m}(x_N) + c_N^T \tilde{w}_N$$
$$\tilde{\psi}_k(x_k, \tilde{u}_k) + D_k \tilde{w}_k$$
$$\tilde{h}_k(x_k, \tilde{u}_k) + E_k \tilde{w}_k$$
$$\tilde{h}_N(x_N) + E_N \tilde{w}_N$$

where $$\tilde{u}_k = \begin{bmatrix} u_k \\ \bar{u}_k \end{bmatrix} \text{ and } \tilde{w}_k = \begin{bmatrix} w_k \\ \bar{w}_k \end{bmatrix}$$

are defined. For example, in case all the integer variables $w_k$ enter the system dynamics $\psi_k(x_k, u_k, w_k)$ 263 nonlinearly, then the system dynamics can be defined in separable format 283 as follows $$\tilde{\psi}_k(x_k, \tilde{u}_k) = \psi_k(x_k, u_k, \bar{u}_k)$$
$$0 = \bar{u}_k - w_k$$

where $\bar{u}_{k,j} = w_{k,j}$ $\forall j$, even though $\bar{u}_{k,j} \in \mathbb{R}$ and $w_{k,j} \in \mathbb{Z}$ Some embodiments of the invention are based on the realization that the MINLP in separable format 280 is mathematically equivalent to the original MINLP 260, i.e., the MINLP in separable format 280 is infeasible if and only if the original MINLP 260 is infeasible, and a feasible and (locally) optimal solution to the MINLP in separable format 280 can be used to construct a feasible and (locally) optimal solution of the original MINLP 260. For example, in some embodiments of the invention, an affine or nonlinear transformation exists to transform a feasible and (locally) optimal solution to the MINLP in separable format 280 into a feasible and (locally) optimal solution of the original MINLP 260.

Figure 2D:
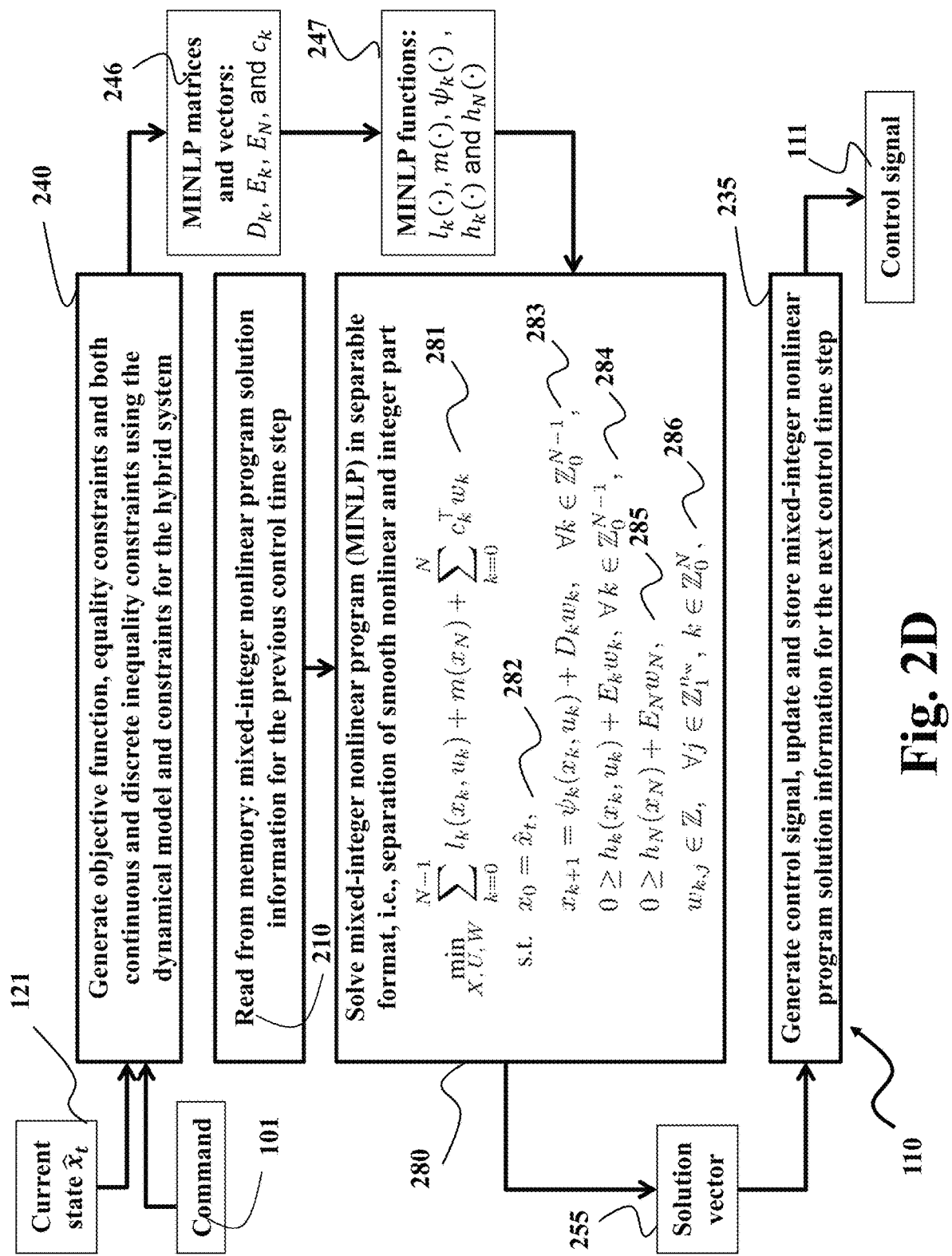
FIG. 2D illustrates a block diagram of an MINMPC method that solves an optimal control structured MINLP in separable format, according to some embodiments.

FIG. 2D illustrates a block diagram of an MINMPC method that solves an optimal control structured MINLP in separable format 280 in order to compute the control signal 111 at each control time step, given the current state 121 of the system 120 and the command 101. Some embodiments of the invention are based on a nonlinear dynamical model of the system 283 with linear equality constraints 282, nonlinear mixed-integer inequality constraints 284 at each time step within the prediction time horizon, nonlinear mixed-integer inequality constraints 285 at a terminal time step of the prediction time horizon, linear discrete equality constraints 286, and a linear-quadratic or nonlinear objective function 281, such that a resulting constrained MINLP 280 needs to be solved at each control time step. The MINLP data 245 can include the MINLP matrices and vectors 246 and the MINLP functions 247 to formulate the optimal control structured MINLP 280.

For example, the MINLP matrices and vectors 246 can include matrices $D_k$, $E_k$, $E_N$ and vectors $c_k$ in the constraint and objective functions of the optimal control structured MINLP 280. Similarly, the MINLP functions 247 can include functions $l_k(\cdot)$, $m(\cdot)$, $\psi_k(\cdot)$, $h_k(\cdot)$ and $h_N(\cdot)$ in the constraint and objective functions of the optimal control structured MINLP 280.

In some embodiments of the invention, the nonlinear dynamical model of the system 283 is described by one or multiple linear and/or smooth nonlinear differential equations. In some embodiments of the invention, the dynamical model of the system 283 describes a linear or nonlinear hybrid system with state- and/or input-dependent jumps in the dynamic equations, for example, including piecewise linear and/or piecewise smooth nonlinear equations. Specifically, an equation $x_{k+1} = \psi_k(x_k, u_k) + D_k w_k$ defines the state variables at the next time step $t_{k+1}$, given the state variables $x_k$, the control inputs $u_k$ and the integer variables $w_k$ at the previous time step $t_k$ within the prediction time horizon $k=0, 1, \ldots, N-1$.

In general, the linear discrete equality constraints 286 can state that a linear function of state and control variables is constrained to be equal to one of a discrete set of values. In some embodiments of the invention, the linear discrete equality constraints 286 can include integrality constraints, for example, a constraint $w_{k,j} \in \mathbb{Z}$ on a particular optimization variable $w_{k,j}$ to take only integer values. In some embodiments, the linear discrete equality constraints 286 can include binary equality constraints, for example, a constraint $w_{k,j} \in \{0, 1\}$ on a particular optimization variable $w_{k,j}$ to be equal to either 0 or 1.

In some embodiments of the invention, the objective function 281 can include a summation of a stage cost within the prediction time horizon $k=0, 1, \ldots, N-1$ and a terminal cost at a final time step $t_N$. For example, in some embodiments, the stage cost $l_k(x_k, u_k)$ and the terminal cost $m(x_N)$ can include linear, linear-quadratic and/or nonlinear functions. In case the control command 101 includes a reference trajectory of state and control values $\{x_k^{ref}, u_k^{ref}\}_{k=0, \ldots}$, the stage and terminal cost functions could read, for example, as follows $$l_k(x_k, u_k) = \|x_k - x_k^{ref}\|_Q^2 + \|u_k - u_k^{ref}\|_R^2$$

$$m(x_N) = \|x_N - x_N^{ref}\|_P^2$$

where the matrices Q, R, and P are typically symmetric and positive semidefinite, and $$\|x_k - x_k^{ref}\|_Q^2 = (x_k - x_k^{ref})^T Q (x_k - x_k^{ref}).$$

Figure 3A:
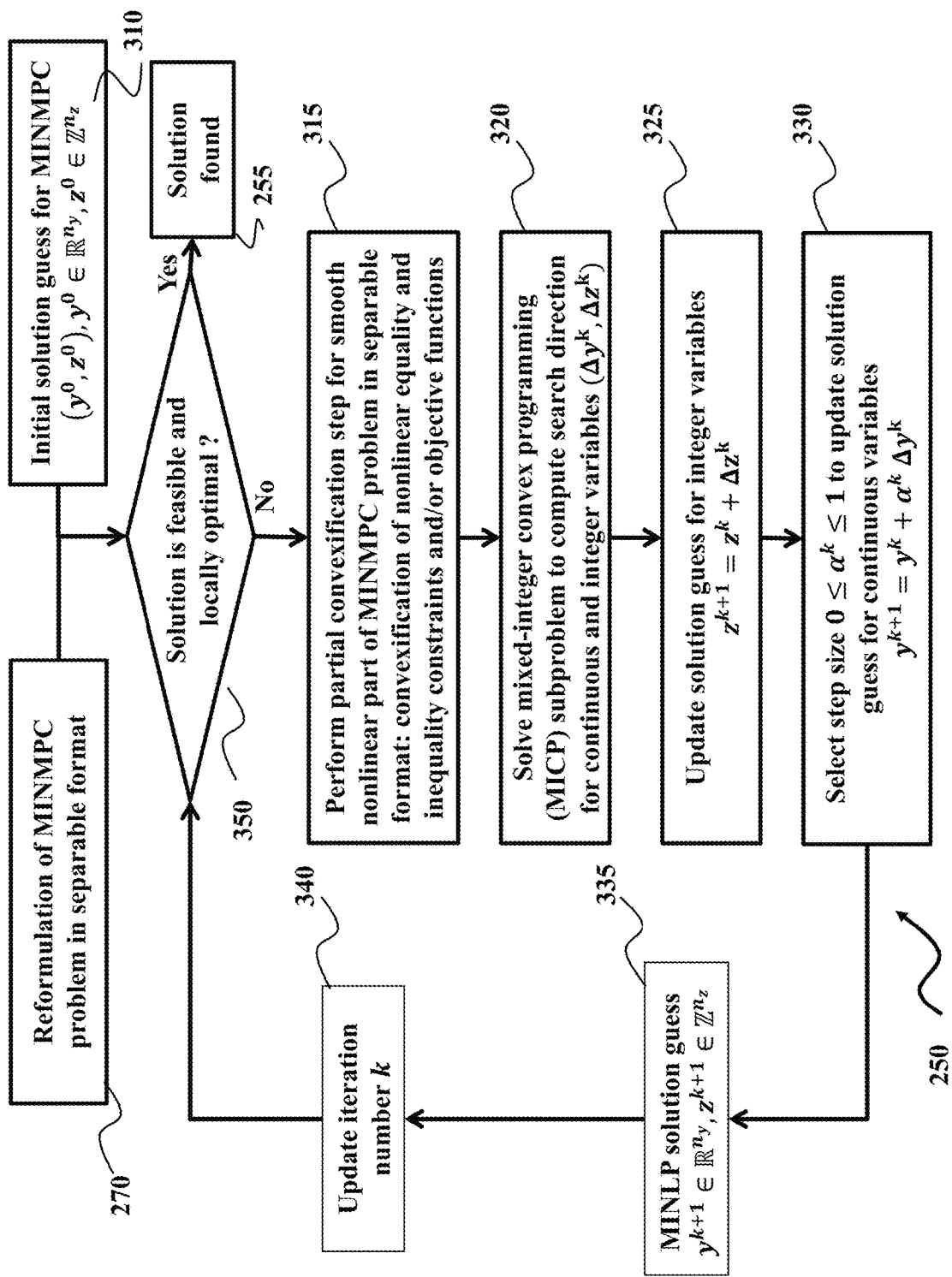
FIG. 3A illustrates a block diagram of an iterative optimization procedure, in which each iteration consists of a partial convexification step and the solution of a mixed-integer convex programming (MICP) subproblem to compute a feasible and (locally) optimal solution for MINMPC, according to some embodiments.

FIG. 3A illustrates a block diagram of an iterative optimization procedure to solve an optimal control structured MINLP 250, in which each iteration consists of a partial convexification step 315 and the solution of a mixed-integer convex programming (MICP) subproblem 320 to update an intermediate solution guess for integer variables 325 and for continuous variables 330, until a feasible and (locally) optimal solution is found 255, which can be used to construct the control signal 111 at each control time step, given the current state 121 of the system 120 and the command 101. An initialization step to the iterative optimization procedure can include the reformulation of the MINMPC problem in separable format 270, for example, as described in FIG. 2C, and the computation of an initial solution guess $(y^0, z^0)$, including an initial set of values $y^0 \in \mathbb{R}^{n_y}$ for continuous variables and an initial set of values $z^0 \in \mathbb{Z}^{n_z}$ for integer variables 310.

Each iteration of the sequential convexification-based optimization procedure includes checking whether the current intermediate solution guess is feasible and/or (locally) optimal 350, in which case either a solution is found 255 or a new iteration is performed to update the current intermediate MINLP solution guess 335 based on a partial convexification step 315 and an MICP subproblem solution 320 and a current iteration number k can be updated 340. In some embodiments of the invention, the termination condition 350 includes checking whether a current intermediate solution guess is both feasible, i.e., the solution satisfies all equality and inequality constraints in the MINLP, whether it is sufficiently close to the globally optimal solution and/or whether the computational cost of the iterative optimization procedure has reached a particular time limit. For example, a maximum number of iterations can be imposed to ensure that the iterative optimization procedure terminates in a deterministic runtime.

Some embodiments of the invention are based on the realization that each iteration of the sequential convexification-based optimization procedure to solve the MINLP in separable format 270 can be based on a partial convexification step 315 for only the smooth nonlinear part of the MINMPC problem in separable format, i.e., including a convexification step for each of the nonlinear equality and nonlinear inequality constraints and/or for each of the nonlinear objective functions. The partial convexification step 315 does not change the linear functions depending on one or multiple integer variables, for example, the linear constraint and objective functions in the separable MINLP format 280 based on matrices $D_k$, $E_k$, $E_N$ and vectors $c_k$ in the constraint and objective functions of the optimal control structured MINLP 280. Specifically, the partial convexification step 315 does not change the linear discrete equality constraints 286, resulting in a mixed-integer convex programming (MICP) subproblem to compute a search direction for continuous and integer variables ($\Delta y^k$, $\Delta z^k$) 320.

Some embodiments of the invention are based on the realization that, depending on the particular implementation of the partial convexification step 315, the MICP subproblem can correspond, for example, to a mixed-integer linear programming (MILP), mixed-integer quadratic programming (MIQP), mixed-integer quadratically constrained quadratic programming (MIQCQP) or a mixed-integer second order cone programming (MISOCP) subproblem.

In some embodiments of the invention, the MICP subproblem solution ($\Delta y^k$, $\Delta z^k$) 320 can be used directly to update the intermediate solution guess for integer variables $z^{k+1}=z^k+\Delta z^k$ 325, and it can be used to select a step size $0\le\alpha^k\le 1$ to update the intermediate solution guess for continuous variables $y^{k+1}=y^k+\alpha^k\,\Delta y^k$ 330, resulting in an updated MINLP solution guess $y^{k+1}\in\mathbb{R}^{n_y}$, $z^{k+1}\in\mathbb{Z}^{n_z}$ 335 that can be used in the next iteration $k\leftarrow k+1$ 340. In some embodiments of the invention, a line search method can be used to select a step size $0\le\alpha^k\le 1$ in the update of continuous variables 330, in order to ensure sufficient progress is made in each iteration of the optimization procedure with respect to one or multiple feasibility and optimality conditions for a solution to the MINLP in separable format 270. For example, a merit function can be used to quantify a combination of optimality and constraint satisfaction for a solution guess of values for continuous and discrete decision variables.

Figure 3B:
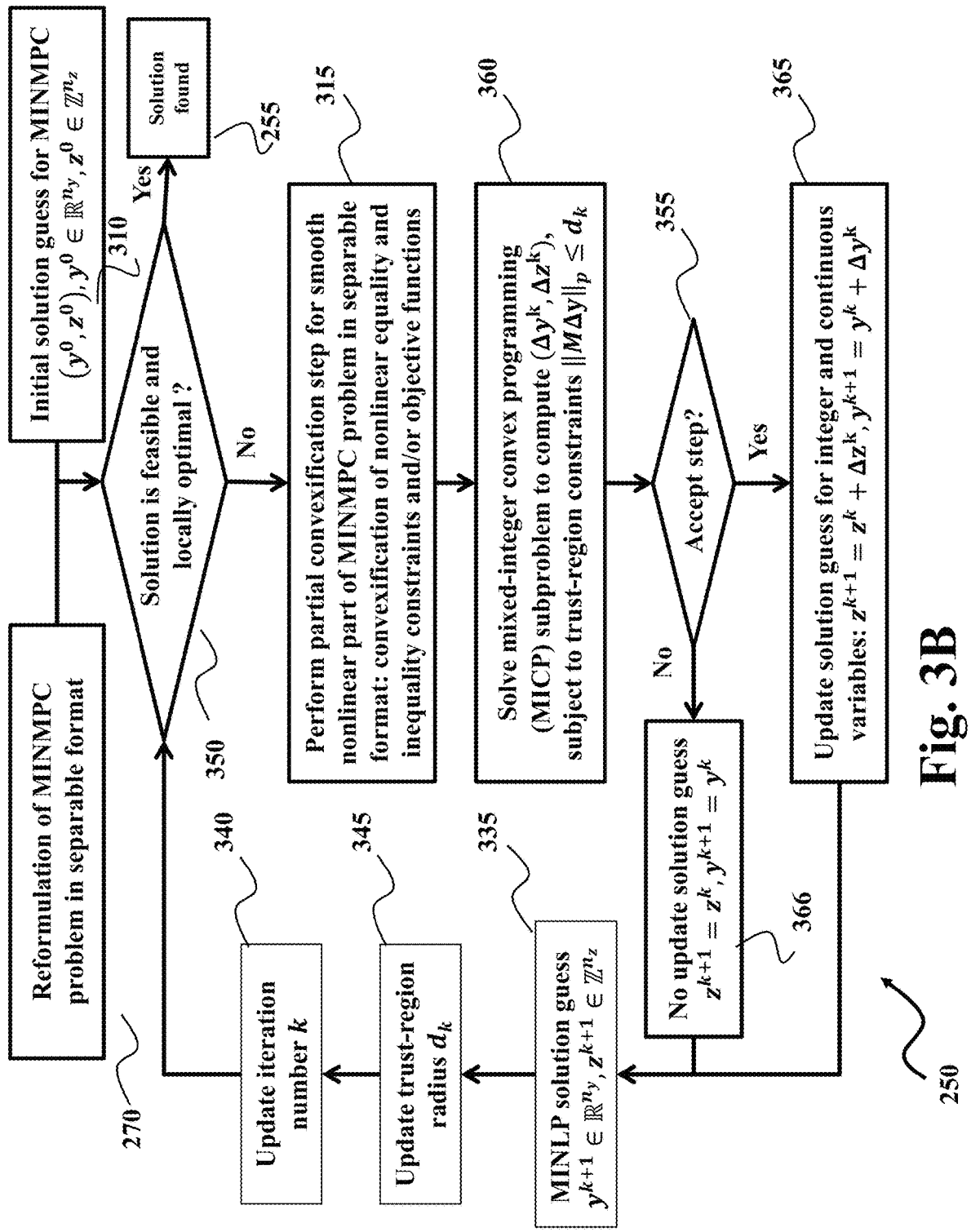
FIG. 3B illustrates a block diagram of an iterative optimization procedure, in which each iteration consists of a partial convexification step and the solution of an MICP subproblem subject to trust-region constraints to compute a feasible and (locally) optimal solution for MINMPC, according to some embodiments.

FIG. 3B illustrates a block diagram of an iterative optimization procedure to solve an optimal control structured MINLP 250, in which each iteration consists of a partial convexification step 315 and the solution of a mixed-integer convex programming (MICP) subproblem subject to trust-region constraints 360 to update an intermediate solution guess for integer and continuous variables 335, until a feasible and (locally) optimal solution is found 255, which can be used to construct the control signal 111 at each control time step, given the current state 121 of the system 120 and the command 101. Some embodiments of the invention are based on the realization that trust-region constraints can enforce an updated MINLP solution guess $y^{k+1}\in\mathbb{R}^{n_y}$, $z^{k+1}\in\mathbb{Z}^{n_z}$ 335 to remain within a sub-region of the MINLP solution space, in which the MICP subproblem forms a sufficiently accurate local approximation of the MINMPC in separable format.

In some embodiments of the invention, the MICP subproblem solution includes ($\Delta y^k$, $\Delta z^k$), subject to trust-region constraints that read as $\|M\Delta y\|_p\le d_k$, i.e., a p-norm value of the update of continuous variables $\Delta y^k$ is smaller than or equal to a trust-region radius value $d_k$. For example, a value of p=1, p=2, or p=∞ can be used to result in trust-region constraints in the MICP subproblem 360 based on a 1-norm, 2-norm, or ∞-norm function, respectively. In each iteration of the sequential convexification-based optimization procedure, the trust-region radius value $d_k$ can be updated 345, based on the MICP subproblem solution 360 and the updated MINLP solution guess $y^{k+1}\in\mathbb{R}^{n_y}$, $z^{k+1}\in\mathbb{Z}^{n_z}$ 335.

In some embodiments of the invention, the update step in each iteration of the optimization procedure is accepted or not based on one or multiple conditions which are checked 355 in each iteration. If the step is not accepted, then no update to the MINLP solution guess is performed, i.e., $z^{k+1}=z^k$, $y^{k+1}=y^k$ 366 and the trust-region radius value $d_k$ can be updated 345 accordingly. Alternatively, if the step is accepted, then an update to the MINLP solution guess is performed for both integer and continuous variables, i.e., $z^{k+1}=z^k+\Delta z^k$, $y^{k+1}=y+\Delta y^k$ 365 and the trust-region radius value $d_k$ can be updated 345 if necessary. In some embodiments of the invention, the check to accept a step or not 355 can be based on a merit function that quantifies a combination of optimality and constraint satisfaction for a solution guess of values for continuous and discrete decision variables. For example, if an update of the MINLP solution guess ($\Delta y^k$, $\Delta z^k$) results in a sufficient decrease in the value of a merit function, then the step is accepted 355 and an update to the MINLP solution guess is performed 365, otherwise, if the decrease in the value of a merit function is insufficiently large, then the step is not accepted 355 and no update is performed 366.

Figure 4A:
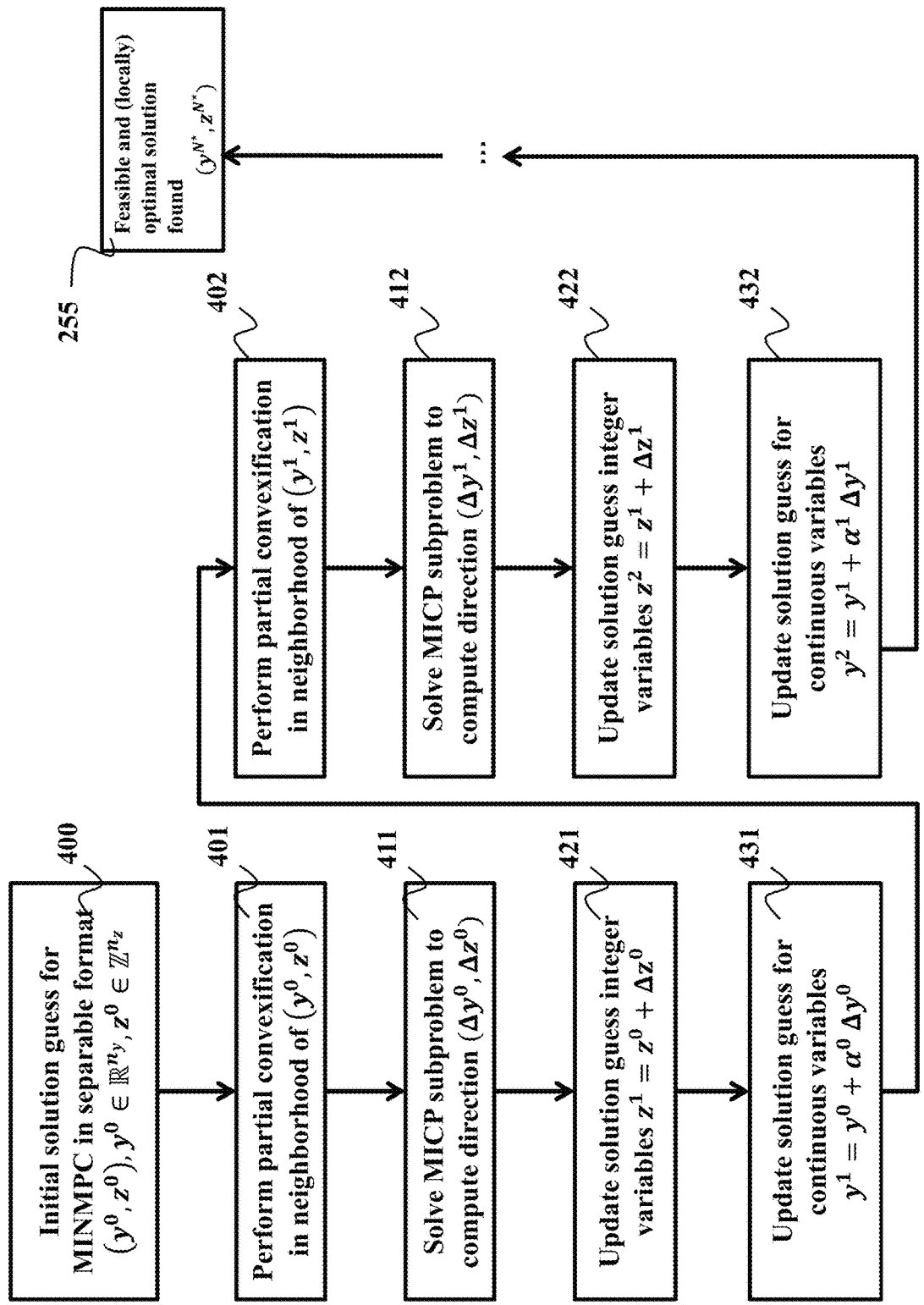
FIG. 4A illustrates a block diagram of one or multiple iterations of a sequential convexification-based optimization procedure to compute a feasible and (locally) optimal MINLP solution, according to some embodiments of the invention.

FIG. 4A illustrates a block diagram of one or multiple iterations of a sequential convexification-based optimization procedure to compute a feasible and (locally) optimal MINLP solution ($y^{N*}$, $z^{N*}$) 255, according to some embodiments of the invention. Starting from an initial solution guess ($y^0$, $z^0$), $y^0\in\mathbb{R}^{n_y}$, $z^0\in\mathbb{Z}^{n_z}$ 400 for the MINLP in separable format, the first iteration consists of a partial convexification step within a sub-region of the MINLP solution space that corresponds to a local neighborhood of ($y^0$, $z^0$) 401, followed by a solution of the MICP subproblem to compute a search direction ($\Delta y^0$, $\Delta z^0$) 411, a resulting update of the solution guess for integer variables $z^1=z^0+\Delta z^0$ 421 and a resulting update of the solution guess for continuous variables $y^1=y^0+\alpha^0\,\Delta y^0$ 431. In some embodiments of the invention, a line search method can be used to compute a step size value $0\le\alpha^0\le 1$ in order to ensure sufficient progress is made with respect to a merit function that quantifies a combination of optimality and constraint satisfaction for the search direction ($\Delta y^0$, $\Delta z^0$) 411.

Subsequently, the second iteration includes a partial convexification step within a sub-region of the MINLP solution space that corresponds to a local neighborhood of ($y^1$, $z^1$) 402, followed by a solution of the MICP subproblem to compute a search direction ($\Delta y^1$, $\Delta z^1$) 412, a resulting update of the solution guess for integer variables $z^2=z^1+\Delta z^1$ 422 and a resulting update of the solution guess for continuous variables $y^2=y^1+\alpha^1\,\Delta y^1$ 432. Similarly, one or multiple additional iterations can be performed until a termination condition 350 is satisfied, e.g., this condition may include checking whether a current intermediate solution guess is feasible, whether it is sufficiently close to the globally optimal solution and/or whether the computational cost of the sequential convexification-based optimization procedure has reached a particular time limit.

Figure 4B:
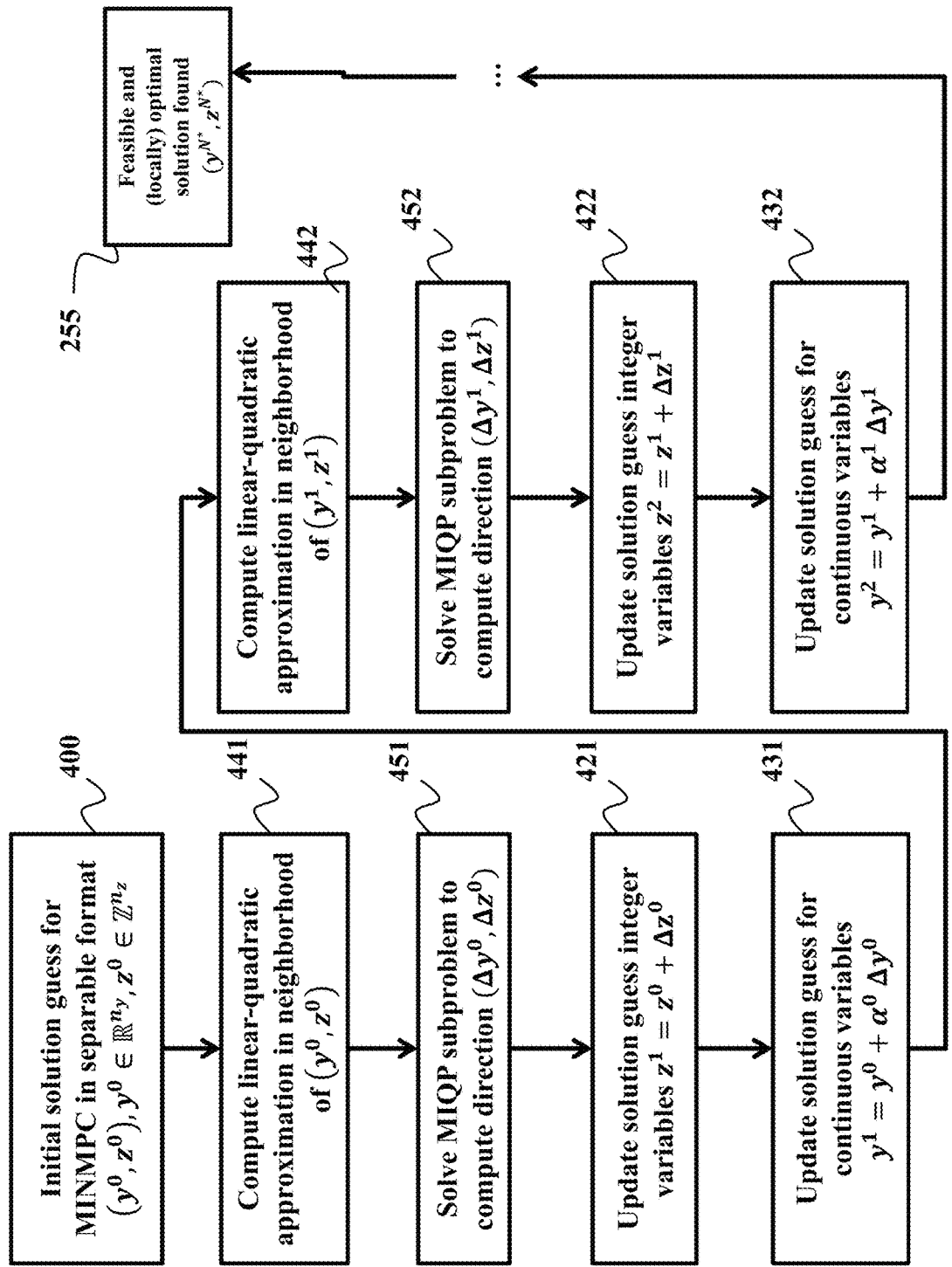
FIG. 4B illustrates a block diagram of one or multiple iterations of a sequential convexification-based optimization procedure, where each iteration consists of a local linear-quadratic approximation within a sub-region of the MINLP solution space and the solution of an MIQP subproblem, according to some embodiments.

FIG. 4B illustrates a block diagram of one or multiple iterations of a sequential convexification-based optimization procedure to compute a feasible and (locally) optimal MINLP solution ($y^{N*}$, $z^{N*}$) 255, where the partial convexification step 401-402 in each iteration is based on a local linear-quadratic approximation 441-442 within a sub-region of the MINLP solution space and the MICP subproblem 411-412 in each iteration corresponds to the solution of an MIQP subproblem 451-452 to compute a search direction in each iteration of the optimization procedure. In some embodiments of the invention, the partial convexification step in each iteration is based on a local linearization of only the smooth nonlinear part of the MINMPC problem in separable format, i.e., including a local linearization step for each of the nonlinear equality and nonlinear inequality constraints and/or a local linear-quadratic approximation step for each of the nonlinear objective functions.

Figure 4C:
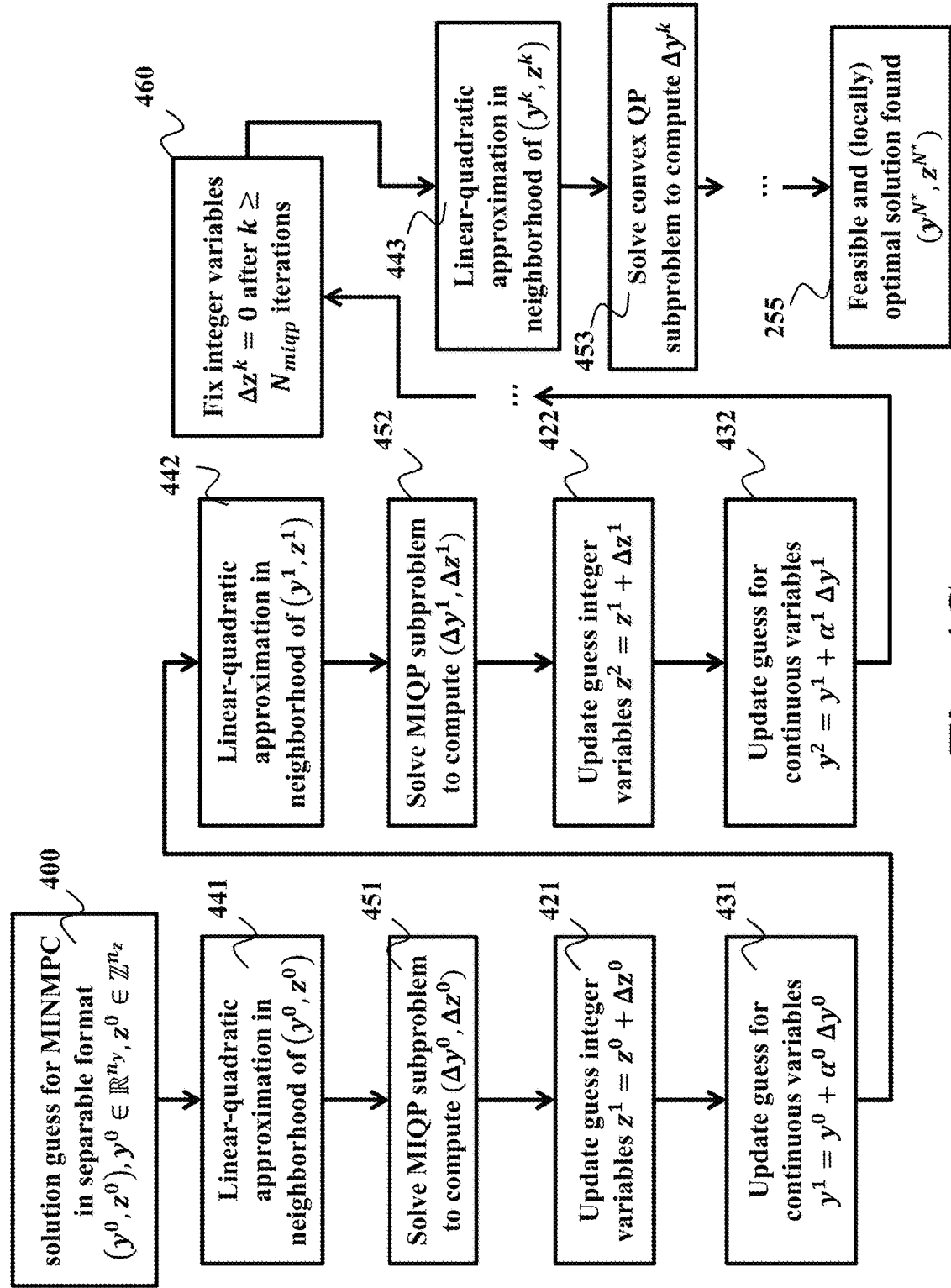
FIG. 4C illustrates a block diagram of a sequential convexification-based optimization procedure to compute a feasible and (locally) optimal MINLP solution, and where values for the integer variables are fixed after one or multiple iterations, according to some embodiments of the invention.

FIG. 4C illustrates a block diagram of a sequential convexification-based optimization procedure to compute a feasible and (locally) optimal MINLP solution $(y^{N*}, z^{N*})$ 255, where values for the integer variables are fixed after one or multiple iterations 460. Embodiments of the invention are based on the realization that the MIQP subproblem 451-452 to compute a search direction $(\Delta y^k, \Delta z^k)$ in each iteration of the optimization procedure becomes a convex QP subproblem 453 to compute a search direction $\Delta y^k$ for the continuous variables, after fixing the values for all the integer variables $\Delta z^k=0$ 460 after a particular condition is satisfied. Some embodiments of the invention perform one or multiple iterations of a sequential convexification-based optimization procedure after fixing the values for all the integer variables $\Delta z^k=0$ 460, where each iteration consists of a partial convexification or linear-quadratic approximation step within a sub-region of the MINLP solution space that corresponds to a local neighborhood of $(y^k, z^k)$ 443, followed by a solution of the convex QP subproblem to compute a search direction $\Delta y^k$ 453, and a resulting update of the solution guess for continuous variables $y^{k+1}=y^k+\alpha^k \Delta y^k$, until a feasible and (locally) optimal MINLP solution $(y^{N*}, z^{N*})$ 255 can be found.

Some embodiments of the invention are based on the realization that the solution of a convex QP subproblem 453 is generally much computationally cheaper than the solution of a non-convex MIQP subproblem 451-452 in each iteration of the sequential convexification-based optimization procedure. In some embodiments of the invention, the decision whether to fix the values for all the integer variables 460 is based on whether the current intermediate solution guess is sufficiently close to the globally optimal solution and/or whether the computational cost of the iterative optimization procedure has reached a particular time limit. For example, in some embodiments, a maximum number $N_{micp}$ of MICP subproblem solutions can be imposed to considerably reduce the computational effort of the iterative optimization procedure, e.g., by fixing the values of the integer variables $\gamma z^k=0$ after $k \geq N_{miqp}$ iterations 460.

Figure 5A:
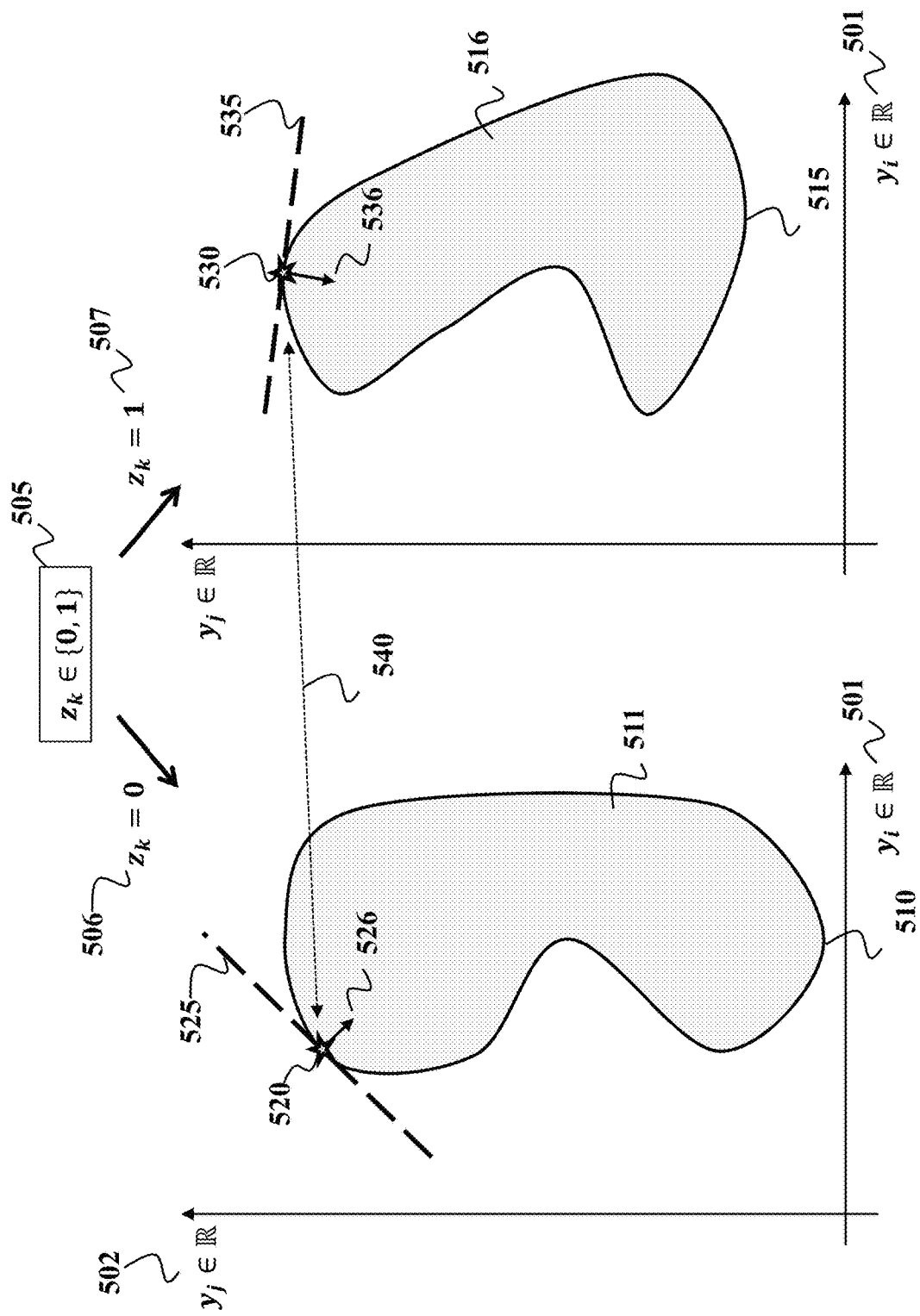
FIG. 5A illustrates a schematic of a partial convexification step to compute one or multiple convex inequality constraints to approximate one or multiple non-convex inequality constraints within a sub-region of the MINLP solution space in a local neighborhood of the current solution guess, according to some embodiments.

FIG. 5A illustrates a schematic of a partial convexification step, which computes one or multiple convex inequality constraints in order to approximate one or multiple non-convex inequality constraints within a sub-region of the MINLP solution space that corresponds to a local neighborhood of the current intermediate solution guess. Some embodiments of the invention are based on the realization that a partial convexification step only computes a convex approximation for one or multiple smooth nonlinear inequality constraint functions in the MINLP in separable format 280, while maintaining the linear functions that may depend on one or multiple integer variables unchanged.

For example, in FIG. 5A, the integer variables in the MINLP in separable format 280 can include a binary decision variable $z_k \in \{0, 1\}$ 505, i.e., the value of a binary decision variable can be either $z_k=0$ 506 or $z_k=1$ 507. The continuous variables in the MINLP in separable format 280 can include two continuous decision variables $y_i \in \mathbb{R}$ 501 and $y_j \in \mathbb{R}$ 502. In addition, the MINLP in separable format 280 can include one or multiple smooth nonlinear inequality constraint functions that define a non-convex set of feasible values 511 corresponding to the zero value $z_k=0$ 506 for the binary variable 505, defined by the boundary 510 around the non-convex feasible region, and similarly the same one or multiple smooth nonlinear inequality constraint functions can define a non-convex set of feasible values 516 corresponding to the one value $z_k=1$ 507 for the binary variable 505, defined by the boundary 515 around the non-convex feasible region.

In some embodiments of the invention, each iteration of a sequential convexification-based optimization procedure performs a partial convexification step to compute a convex approximation 525 of one or multiple non-convex constraints 510 in a local neighborhood of a current solution guess 520, in order to compute a search direction that is approximately inside 526 the non-convex feasible region 511. Some embodiments of the invention are based on the realization that each iteration of a sequential convexification-based optimization procedure computes a solution to an MICP subproblem 320 that is non-convex due to one or multiple integer variables, for example, including a binary decision variable $z_k \in \{0,1\}$ 505, which causes a convex approximation 525 to exist for a value $z_k=0$ 506, while a different convex approximation 535 of one or multiple non-convex constraints 515 can exist in a local neighborhood of a current solution guess 530 corresponding to a value $z_k=1$ 507, in order to compute a search direction that is approximately inside 536 the non-convex feasible region 516.

For example, a solution to the MICP subproblem 320 can include setting a binary variable $z_k \in \{0,1\}$ 505 to either $z_k=0$ 506 or $z_k=1$ 507, given the corresponding convex approximations 525 or 535 of a smooth nonlinear part of the MINLP. Some embodiments of the invention are based on the realization that a complex transformation 540 may exist between a current solution guess 520 or 530, a non-convex feasible region 511 or 516, and a corresponding convex approximation 525 or 535 for each iteration of a sequential convexification-based optimization procedure, depending on the value of a binary decision variable $z_k \in \{0, 1\}$ 505, i.e., depending on whether $z_k=0$ 506 or $z_k=1$ 507.

In some embodiments of the invention, a partial convexification step in each iteration of a sequential convexification-based optimization procedure is based on a local linearization of one or multiple smooth nonlinear inequality constraint functions that define a non-convex set of feasible values 511 or 516. Specifically, a partial convexification step can compute one or multiple linear inequality constraints, i.e., to stay inside one or multiple half-spaces 526 with respect to one or multiple linear functions 525, in order to approximate a non-convex set of feasible values 511, defined by one or multiple smooth nonlinear inequality constraints 284-285, within a sub-region of the MINLP solution space that corresponds to a local neighborhood of the current intermediate solution guess 520. Similarly, a partial convexification step can compute one or multiple linear equality constraints in order to approximate a non-convex set of feasible values, defined by one or multiple smooth nonlinear equality constraints 283, within a sub-region of the MINLP solution space that corresponds to a local neighborhood of the current intermediate solution guess.

Figure 5B:
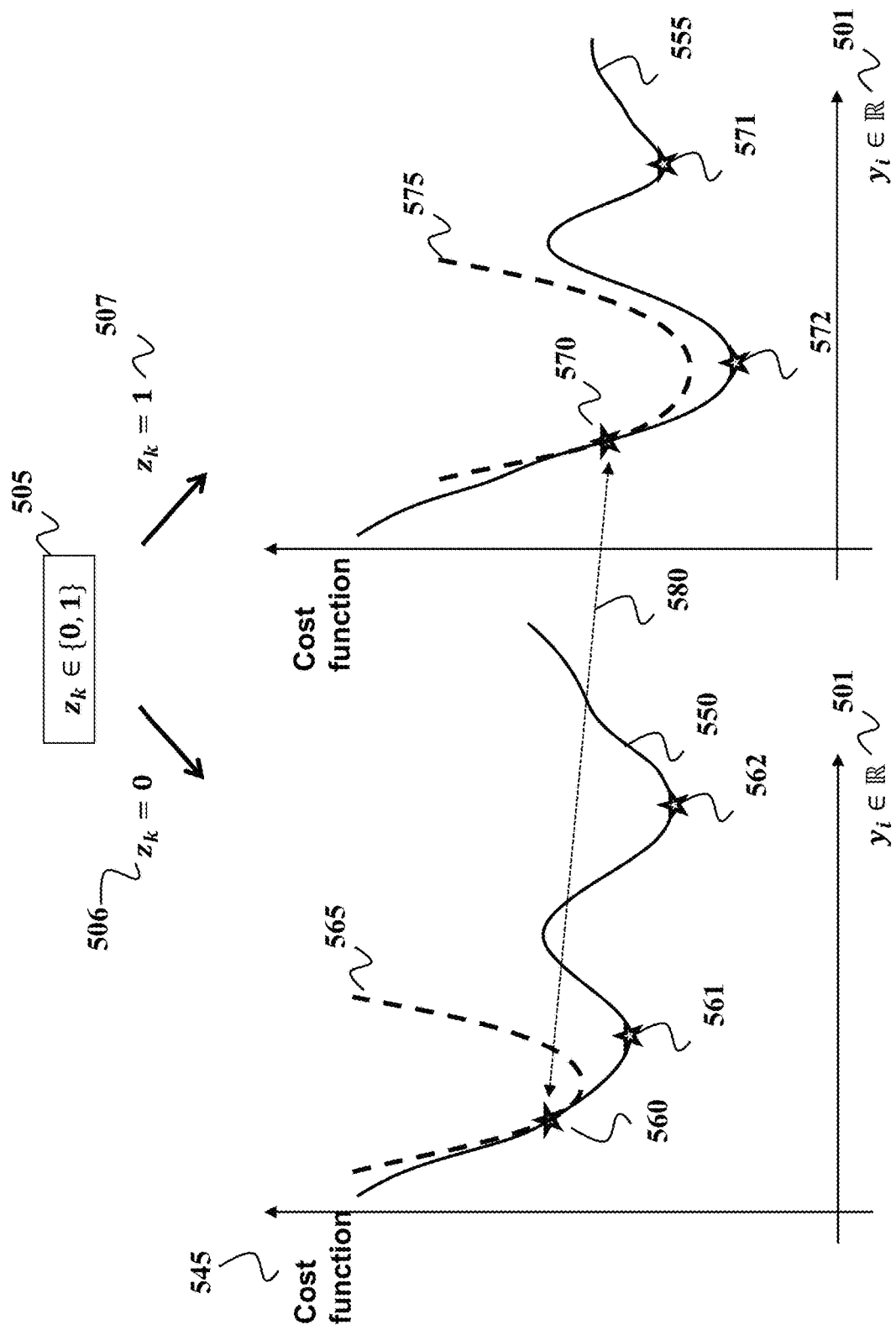
FIG. 5B illustrates a schematic of a partial convexification step to compute a convex approximation of one or multiple smooth nonlinear functions in the cost function of the MINLP in separable format, according to some embodiments.

FIG. 5B illustrates a schematic of a partial convexification step in each iteration of a sequential convexification-based optimization procedure to compute a convex approximation 565 of one or multiple smooth nonlinear functions 550 in the cost function 545 with respect to one or multiple continuous variables $y_i \in \mathbb{R}$ 501 of the MINLP in separable format 280 within a sub-region of the MINLP solution space that corresponds to a local neighborhood of a current solution guess 560. Specifically, the MINLP in separable format 280 can include one or multiple smooth nonlinear objective functions 281 that define a non-convex cost function 550 corresponding to the zero value $z_k=0$ 506 for the binary variable 505, and similarly the same one or multiple smooth nonlinear objective functions 281 can define a non-convex cost function 555 corresponding to the one value $z_k=1$ 507 for the binary variable 505.

In some embodiments of the invention, each iteration of a sequential convexification-based optimization procedure performs a partial convexification step to compute a convex approximation 565 of one or multiple non-convex cost functions 550 in a local neighborhood of a current solution guess 560, in order to compute a search direction that is approximately towards a local 561 or global minimum 562 of the non-convex cost function 550. Some embodiments of the invention are based on the realization that each iteration of a sequential convexification-based optimization procedure computes a solution to an MICP subproblem 320 that is non-convex due to one or multiple integer variables, for example, including a binary decision variable $z_k \in \{0, 1\}$ 505, which causes a convex approximation 565 to exist for a value $z_k=0$ 506, while a different convex approximation 575 of one or multiple non-convex cost functions 555 can exist in a local neighborhood of a current solution guess 570 corresponding to a value $z_k=1$ 507, in order to compute a search direction that is approximately towards a local 571 or global minimum 572 of the non-convex cost function 545.

Some embodiments of the invention are based on the realization that a complex transformation 580 may exist between a current solution guess 560 or 570, a non-convex cost function 550 or 555, and a corresponding convex approximation 565 or 575 for each iteration of a sequential convexification-based optimization procedure, depending on the value of a binary decision variable $z_k \in \{0, 1\}$ 505, i.e., depending on whether $z_k=0$ 506 or $z_k=1$ 507.

In some embodiments of the invention, a partial convexification step in each iteration of a sequential convexification-based optimization procedure is based on a local linear or linear-quadratic approximation 565 or 575 of one or multiple smooth nonlinear objective functions 281 that define a non-convex cost function 550 or 555. Specifically, a partial convexification step can compute one or multiple linear or linear-quadratic objective functions 565 or 575 in order to approximate a non-convex cost function 545 within a sub-region of the MINLP solution space that corresponds to a local neighborhood of the current intermediate solution guess 560 or 570, and the resulting MICP subproblem includes the one or multiple linear or linear-quadratic objective functions 565 or 575 such that the solution of the MICP subproblem defines a search direction within the MINLP solution space towards a local or global minimum of a non-convex cost function 545.

FIG. 6A illustrates a block diagram of a compact formulation of the optimal control structured MINLP in separable format, which is solved at each time step of the MINMPC controller according to some embodiments of the invention. Specifically, the original optimal control structured MINLP includes the functions in the objective 281, the functions in the equality constraints 283, and the functions in the inequality constraints 284-285 in separable format, based on matrices $D_k$, $E_k$, $E_N$ and vectors $c_k$ for each of the time steps within the prediction time horizon $k=0, 1, \ldots, N-1$. Therefore, some embodiments of the invention are based on a compact formulation $y = [x_0^\tau, u_0^\tau, x_1^\tau, \ldots, u_{N-1}^\tau, x_N^\tau]^\tau$ of continuous variables 636, including state variables $x_k \in \mathbb{R}^{n_x}$ within the prediction time horizon $k=0, 1, \ldots, N$ and control input variables $u_k \in \mathbb{R}^{n_u}$ within the prediction time horizon $k=0, 1, \ldots, N-1$, and $z = [w_0^\tau, w_1^\tau, \ldots, w_N^\tau]^\tau$ of integer variables 637, including integer $w_k \in \mathbb{Z}^{n_w}$ and/or binary $w_k \in \{0,1\}^{n_w}$ decision variables within the prediction time horizon $k=0, 1, \ldots, N$.

Based on a compact formulation $y = [x_0^\tau, u_0^\tau, x_1^\tau, \ldots, u_{N-1}^\tau, x_N^\tau]^\tau$ of continuous variables 636 and $z = [w_0^\tau, w_1^\tau, \ldots, w_N^\tau]^\tau$ of integer variables 637, a compact formulation of the optimal control structured MINLP in separable format 630 can be formulated, and which is mathematically equivalent 625 to the original optimal control structured MINLP in separable format 280, i.e., the compact MINLP 630 is infeasible if and only if the original MINLP 280 is infeasible, and a feasible and (locally) optimal solution to the compact MINLP 630 can be used to construct a feasible and (locally) optimal solution of the original MINLP 280.

In some embodiments of the invention, the objective function 631 in the compact formulation of the MINLP 630 is defined by a smooth nonlinear function $f(y): \mathbb{R}^{n_y} \to \mathbb{R}$, which depends only on the continuous variables $y \in \mathbb{R}^{n_y}$ 636, and a linear function $c^\tau z$ that is defined by a vector $c \in \mathbb{R}^{n_z}$ corresponding to the integer variables $z \in \mathbb{Z}^{n_z}$ 637. Similarly, the equality constraints 632 in the compact formulation of the MINLP 630 can be defined by a smooth nonlinear function $g(y): \mathbb{R}^{n_y} \to \mathbb{R}^{n_g}$ and a set of linear equations $Dz$ that is defined by a matrix $D \in \mathbb{R}^{n_g \times n_z}$ corresponding to the integer variables $z \in \mathbb{Z}^{n_z}$ 637. Similarly, the inequality constraints 633 in the compact formulation of the MINLP 630 can be defined by a smooth nonlinear function $h(y): \mathbb{R}^{n_y} \to \mathbb{R}^{n_h}$ and a set of linear equations $Ez$ that is defined by a matrix $E \in \mathbb{R}^{n_h \times n_z}$ corresponding to the integer variables $z \in \mathbb{R}^{n_z}$ 637. Finally, the compact formulation of the MINLP 630 can include one or multiple discrete equality constraints 634, which impose that each variable $z_j \in \mathbb{R}$ can only take integer values in the feasible MINLP solution space.

Figure 6B:
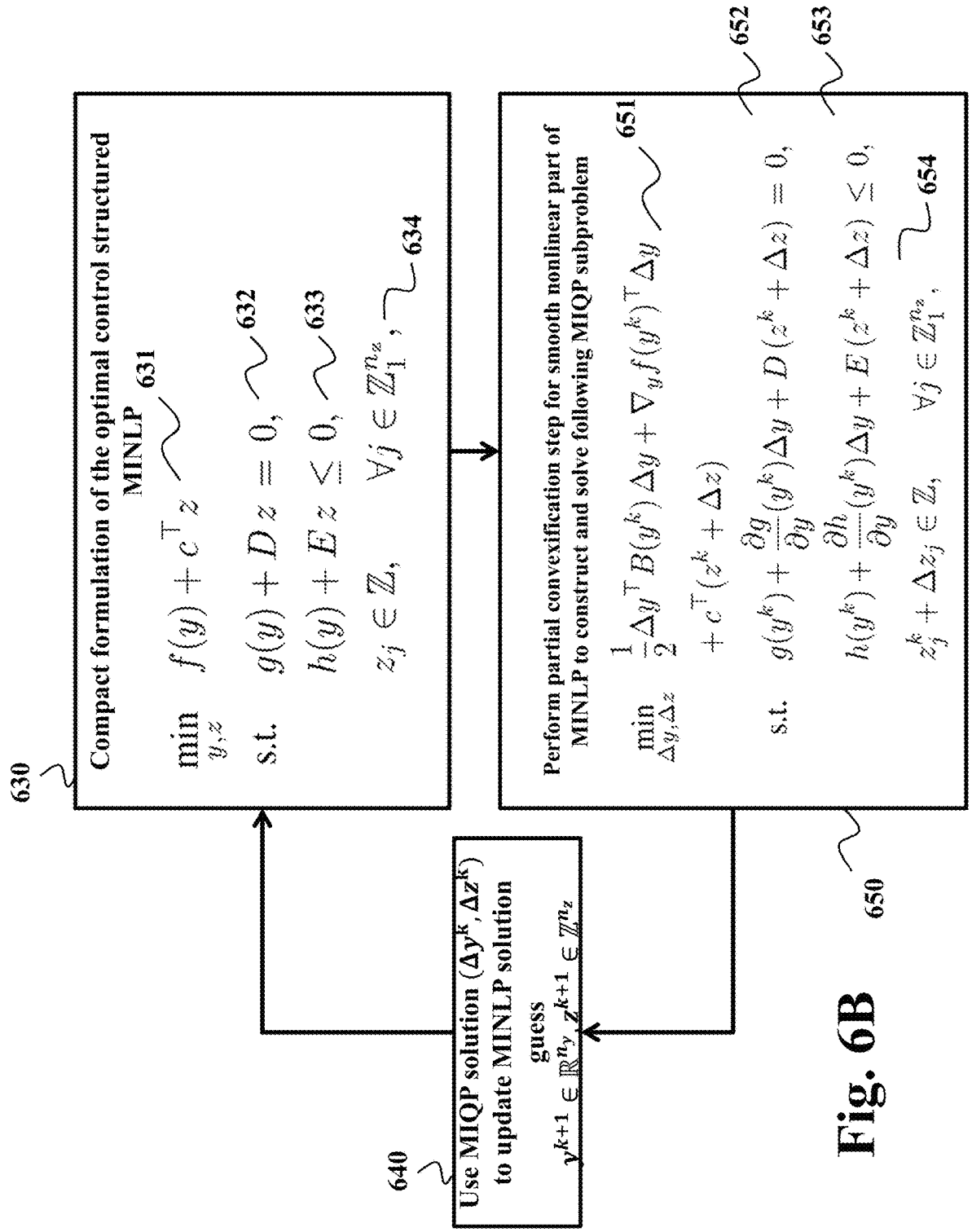
FIG. 6B illustrates a block diagram of a sequential convexification-based optimization procedure, based on a local linear-quadratic approximation within a sub-region of the MINLP solution space and the solution of an MIQP subproblem to update the MINLP solution guess, according to some embodiments.

FIG. 6B illustrates a block diagram of an implementation of a sequential convexification-based optimization procedure, based on a local linear-quadratic approximation within a sub-region of the MINLP solution space and the solution of an MIQP subproblem to update the MINLP solution guess, according to some embodiments of the invention. For example, to compute a feasible and (locally) optimal solution to the compact formulation of an optimal control structured MINLP in separable format 630, each iteration can perform a partial convexification step for a smooth nonlinear part of the MINLP to construct and solve an MIQP subproblem 650, such that the MIQP solution $(\Delta y^k, \Delta z^k)$ can be used to update the MINLP solution guess $y^{k+1} \in \mathbb{Z}^{n_y}$, $z^{k+1} \in \mathbb{Z}^{n_z}$ 640.

In some embodiments of the invention, the MIQP subproblem 650 is constructed based on a sequential convex programming (SCP) method or a sequential quadratic programming (SQP) method applied to the smooth nonlinear functions in the compact formulation of the MINLP in separable format 630 with respect to the continuous variables y 636, i.e., without affecting the linear terms with respect to the integer variables z 637 of the MINLP. Some embodiments of the invention are based on the realization that the MINLP in separable format 630 corresponds to a smooth nonlinear programming (NLP) problem, when fixing the integer variables to a feasible and/or (locally) optimal set of values $z=\bar{z}$, such that an SCP method or SQP method could be used to find a feasible and (locally) optimal set of values $y^*$ for the continuous variables y 636.

In some embodiments of the invention, in each iteration of the sequential convexification-based optimization procedure, the objective 651 of the MIQP subproblem 650 consists of a linear-quadratic term that depends on a gradient vector $\nabla_y f(y^k)$ for the function $f(y): \mathbb{R}^{n_y} \to \mathbb{R}$, evaluated at the current solution guess $y^k \in \mathbb{R}^{n_y}$, and on a symmetric Hessian matrix $B(y^k)$ that is positive semi-definite in general, or at least positive definite in the null space of all equality and all active inequality constraints to ensure that the MIQP subproblem 650 becomes a convex QP for a fixed set of values for integer variables $\Delta z = \overline{\Delta z} \in \mathbb{Z}^{n_z}$. For example, the matrix $B(y^k)$ can correspond to the Hessian of the Lagrangian $B(y^k) = \nabla_y^2 \mathcal{L}(y, \lambda, \mu)$, including the optimality and feasibility conditions for the MINLP 630 with respect to the continuous variables $y \in \mathbb{R}^{n_y}$ $$\mathcal{L}(y,\lambda,\mu) = f(y) + \lambda^\intercal g(y) + \mu^\intercal h(y),$$

where $\lambda$ denote the Lagrange multipliers with respect to the equality constraints 632 and $\mu$ denote the Lagrange multipliers with respect to the inequality constraints 633 of the MINLP in separable format 630.

In some embodiments of the invention, a possible regularization term can be added to the Hessian matrix $B(y^k)$ to ensure that the resulting matrix is positive semi-definite, for example, $B(y^k) + \gamma \mathbb{I} \geq 0$, where $\gamma \geq 0$ is a nonnegative regularization value and H is an identity matrix. In some embodiments of the invention, a quasi-Newton Hessian approximation method can be used to compute a computationally efficient approximation to the Hessian of the Lagrangian, e.g., based on a symmetric rank-1 (SR1) update method or using a variant of the Broyden-Fletcher-Goldfarb-Shanno (BFGS) method. In some embodiments of the invention, e.g., if the objective 631 consists of a nonlinear least squares function $f(y) = \|r(y)\|_2^2$, then a Gauss-Newton Hessian approximation to the Hessian of the Lagrangian can be computed as $B(y^k) =$ $$\frac{\partial r(y^k)^T}{\partial y} \frac{\partial r(y^k)}{\partial y} \approx \nabla_y^2 \mathcal{L}(y, \lambda, \mu),$$

where $\partial r(y^k)/\partial y$ denotes the Jacobian of a function $r(y)$: $\mathbb{R}^{n_y} \to \mathbb{R}^{n_r}$ with respect to the continuous variables y 636 and evaluated at a current solution guess $y^k \in \mathbb{R}^{n_y}$. Some embodiments of the invention are based on the realization that a Gauss-Newton Hessian approximation is computationally cheap to evaluate and is guaranteed to be positive semi-definite, i.e., $B(y^k) \geq 0$.

In some embodiments of the invention, the MIQP subproblem 650 at each iteration of the optimization procedure includes one or multiple linear equality constraints 652, based on a local linearization of the nonlinear equality constraints 632 of the MINLP in separable format 630. Specifically, the smooth nonlinear function $g(y)$: $\mathbb{R}^{n_y} \to \mathbb{R}^{n_g}$ can be approximated by a linearization $$g(y^k) + \frac{\partial g(y^k)}{\partial y} \Delta y$$

in a local neighborhood around a current solution guess $y^k \in \mathbb{R}^{n_y}$, where $$\frac{\partial g(y^k)}{\partial y}$$

denotes the Jacobian of a function $g(y)$: $\mathbb{R}^{n_y} \to \mathbb{R}^{n_g}$ with respect to the continuous variables y 636 and evaluated at a current solution guess $y^k \in \mathbb{R}^{n_y}$. In addition, the linear term Dz in the nonlinear equality constraints 632 remains unchanged in the linearized equality constraints 652, i.e., $Dz^{k+1} = D(z^k + \Delta z)$.

In some embodiments of the invention, the MIQP subproblem 650 at each iteration of the optimization procedure includes one or multiple linear inequality constraints 653, based on a local linearization of the nonlinear inequality constraints 633 of the MINLP in separable format 630. Specifically, the smooth nonlinear function $h(y)$: $\mathbb{R}^{n_y} \to \mathbb{R}^{n_h}$ can be approximated by a linearization $$h(y^k) + \frac{\partial h(y^k)}{\partial y} \Delta y$$

in a local neighborhood around a current solution guess $y^k \in \mathbb{R}^{n_y}$, where $$\frac{\partial h(y^k)}{\partial y}$$

denotes the Jacobian of a function $h(y)$: $\mathbb{R}^{n_y} \to \mathbb{R}^{n_h}$ with respect to the continuous variables y 636 and evaluated at a current solution guess $y^k \in \mathbb{R}^{n_y}$. In addition, the linear term Ez in the nonlinear inequality constraints 633 remains unchanged in the linearized inequality constraints 653, i.e., $Ez^{k+1} = E(z^k + \Delta z)$. Similarly, the discrete equality constraints 634 of the MINLP in separable format 630 remain unchanged in the discrete equality constraints 654 of the MIQP subproblem 650.

Figure 6C:
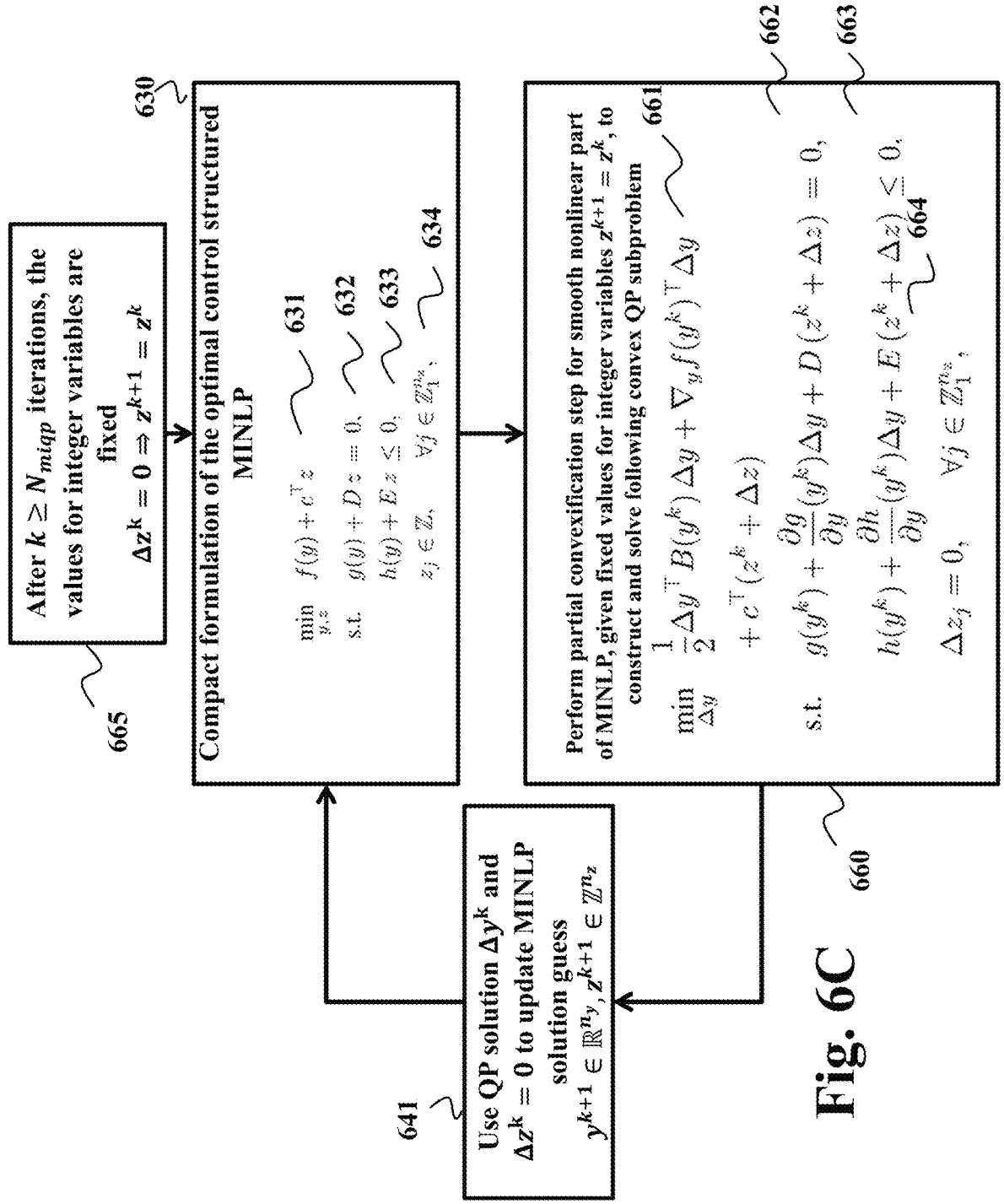
FIG. 6C illustrates a block diagram of a sequential convexification-based optimization procedure, which fixes the values for integer variables after one or multiple iterations and solves a convex QP subproblem in one or multiple subsequent iterations to update the MINLP solution guess.

FIG. 6C illustrates a block diagram of a sequential convexification-based optimization procedure, which fixes the values for integer variables after one or multiple iterations, for example, after $k \geq N_{miqp}$ iterations, the integer decision variables can be fixed $\Delta z^k = 0 \Rightarrow z^{k+1} = z^k$ 665. Given a fixed set of values for integer variables 665, a partial convexification step constructs and solves a convex QP subproblem 660, which corresponds to the MIQP subproblem 650 except for the additional equality constraints $\Delta z_j = 0$, $\forall j$ 664. Some embodiments of the invention are based on the realization that each of the equality constraints $\Delta z_j = 0$, $\forall j$ 664 can be used to remove the integer variables $\Delta z$ from the linear-quadratic objective 661, from the linearized equality constraints 662 and from the linearized inequality constraints 663 such that an optimal solution of the convex QP subproblem 660 includes only the continuous variables $\Delta y$.

Some embodiments of the invention are based on the realization that the solution of a convex QP subproblem 660 is generally much computationally cheaper than the solution of a non-convex MIQP subproblem 650 in each iteration of the sequential convexification-based optimization procedure. In some embodiments of the invention, the decision whether to fix the values for all the integer variables 665 is based on whether the current intermediate solution guess $y^k \in \mathbb{R}^{n_y}$, $z^k \in \mathbb{Z}^{n_z}$ is sufficiently close to the globally optimal solution and/or whether the computational cost of the iterative optimization procedure has reached a particular time limit. For example, in some embodiments, a maximum number $N_{miqp}$ of MIQP subproblem solutions can be imposed to considerably reduce the computational effort of the iterative optimization procedure, e.g., by fixing the values of the integer variables $\Delta z^k = 0$ after $k \geq N_{miqp}$ iterations 665.

In some embodiments of the invention, a sequential convexification-based optimization procedure solves a convex QP subproblem 660 in one or multiple subsequent iterations to update the MINLP solution guess $y^{k+1} \in \mathbb{R}^{n_y}$, $z^{k+1}=z^k \in \mathbb{Z}^{n_z}$ 641 after fixing the values for integer variables 665, until a feasible and (locally) optimal solution has been found 255 for the MINLP in separable format. In some embodiments of the invention, the integer variables can be turned back into free optimization variables, after one or multiple iterations of a sequential convexification-based optimization procedure based on a convex QP subproblem solution 660, for example, if the MINLP is detected to be infeasible for a fixed set of values $z=\bar{z}$, resulting in one or multiple iterations of the sequential convexification-based optimization procedure based on a non-convex MIQP subproblem solution 650 until either the integer variables can be fixed to a new set of values 665 or until a feasible and (locally) optimal solution has been found 255 for the MINLP in separable format.

Figure 6D:
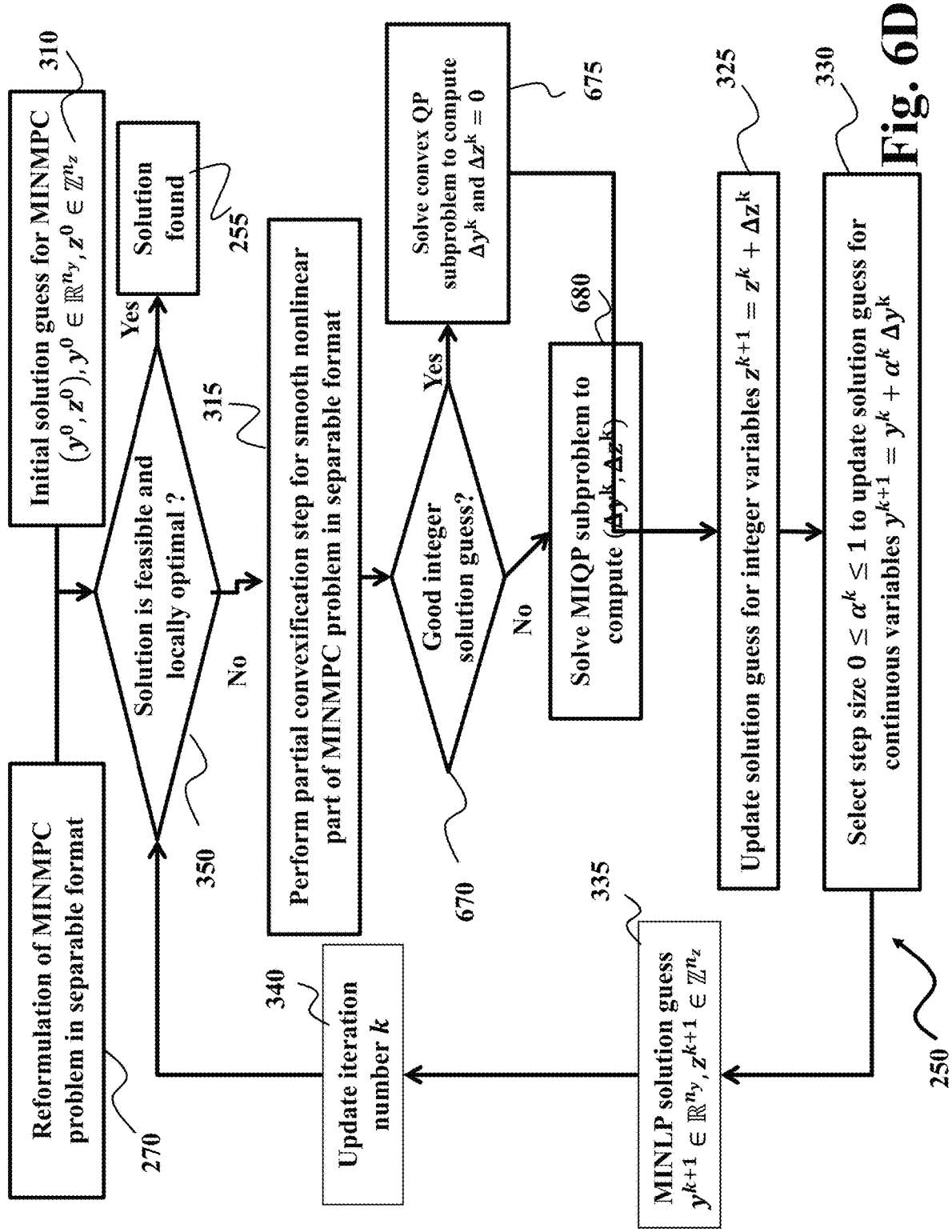
FIG. 6D illustrates a block diagram of a sequential convexification-based optimization procedure, in which each iteration consists of a partial convexification step, followed by the solution of a convex QP or a non-convex MIQP subproblem, to compute a solution to the MINMPC problem, according to some embodiments.

FIG. 6D illustrates a block diagram of an iterative sequential convexification-based optimization procedure to solve an optimal control structured MINLP 250, similar to the block diagram in FIG. 3A, in which each iteration consists of a partial convexification step 315, followed by the solution of a convex QP subproblem 675 or an MIQP subproblem 680 to update an intermediate solution guess for integer variables 325 and for continuous variables 330, until a feasible and (locally) optimal solution is found 255, which can be used to construct the control signal 111 at each control time step, given the current state 121 of the system 120 and the command 101. In some embodiments of the invention, after performing the partial convexification step 315, each iteration of the optimization procedure checks 670 whether the current solution guess for the integer variables $z^k \in \mathbb{Z}^{n_z}$ is sufficiently good, e.g., the solution guess is (likely) feasible and/or sufficiently close to a (locally) optimal solution, or the iteration checks 670 whether a computational cost of the iterative optimization procedure has reached a particular time limit.

If the current solution guess for the integer variables $z^k \in \mathbb{Z}^{n_z}$ is sufficiently good 670, then the values for integer variables can be fixed, i.e., $\Delta z^k=0$ and a convex QP subproblem can be constructed and solved to compute $\Delta y^k$ 675. Alternatively, if the current solution guess for the integer variables $z^k \in \mathbb{Z}^{n_z}$ is not sufficiently good 670, then a non-convex MIQP subproblem is constructed and solved to compute $(\Delta y^k, \Delta z^k)$ 680. Given a search direction $(\Delta y^k, \Delta z^k)$, computed by either solving a convex QP subproblem 675 or by solving a non-convex MIQP subproblem 680, it can be used directly to update the intermediate solution guess for integer variables $z^{k+1}=z^k+\Delta z^k$ 325, and it can be used to select a step size $0 \leq \alpha^k \leq 1$ to update the intermediate solution guess for continuous variables $y^{k+1}=y^k+\alpha^k \Delta y^k$ 330, resulting in an updated MINLP solution guess $y^{k+1} \in \mathbb{R}^{n_y}$, $z^{k+1} \in \mathbb{Z}^{n_z}$ 335 that can be used in the next iteration $k \leftarrow k+1$ 340.

Figure 7A:
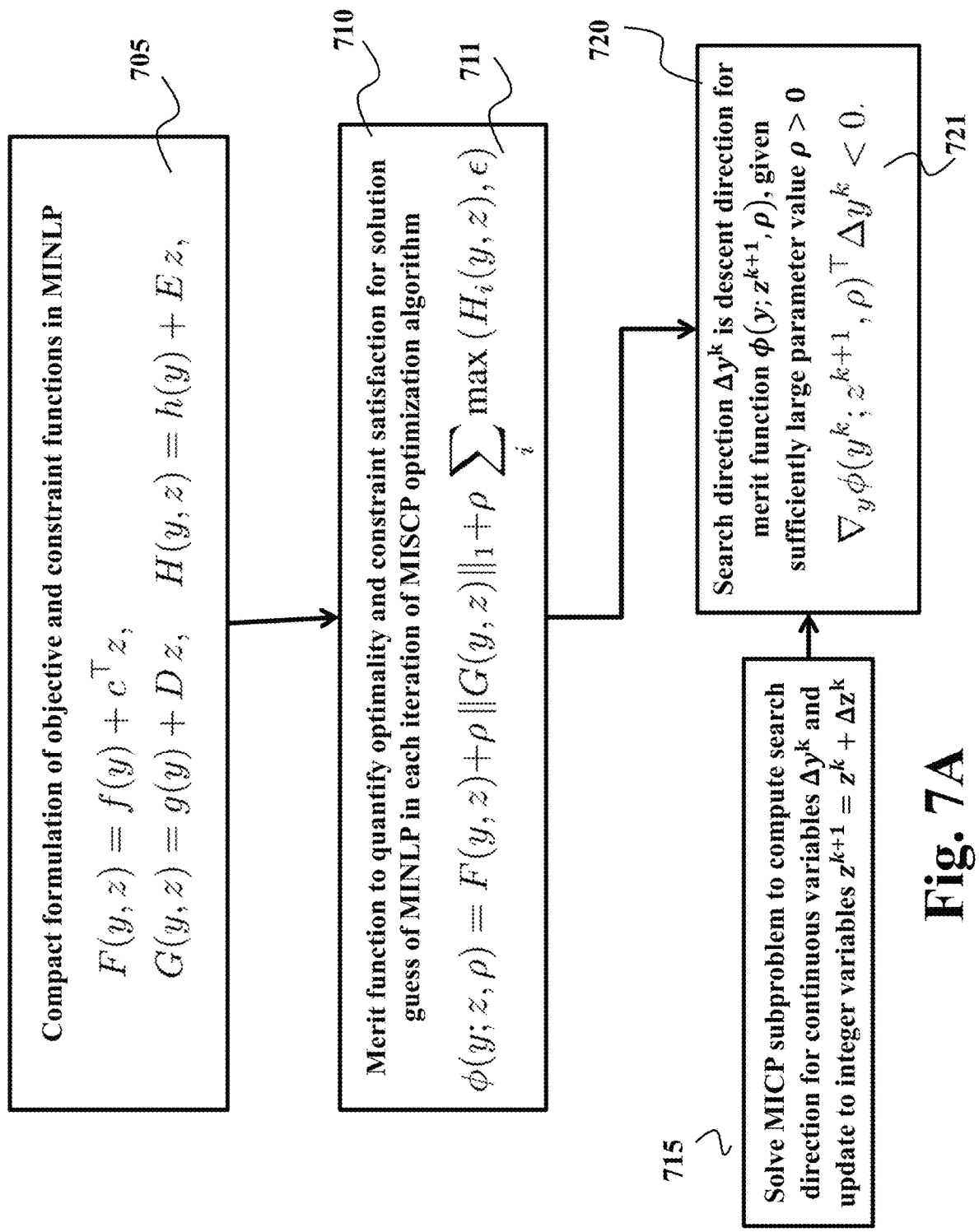
FIG. 7A illustrates a block diagram of a merit function to quantify optimality and constraint satisfaction for an MINLP solution guess in the sequential convexification-based optimization procedure, according to some embodiments.

FIG. 7A illustrates a block diagram of a merit function to quantify optimality and constraint satisfaction for an MINLP solution guess in the sequential convexification-based optimization procedure 710, which we refer to as the mixed-integer sequential convex programming (MISCP) optimization algorithm. Given a compact formulation of objective and constraints functions 705 in the MINLP $$F(y,z)=f(y)+c^\tau z,$$

$$G(y,z)=g(y)+D\,z, H(y,z)=h(y)+Ez,$$

a merit function can be defined as follows 711

$$\phi(y;z,\rho) = F(y,z) + \rho\|G(y,z)\|_1 + \rho\sum_i \max(H_i(y,z),\epsilon)$$

where a value of the merit function can be minimized to find a feasible and (locally) optimal solution of the MINLP in separable format 630.

In some embodiments of the invention, the merit function can consist of one or multiple terms. For example, a first term in the merit function 711 can correspond to the objective function $F(y, z)=f(y)+c^\tau z$ 631, which quantifies the optimality of an MINLP solution guess $(y, z)$ in the MISCP optimization algorithm. A second term in the merit function 711 can be defined as $\rho\|G(y, z)\|_1$, where $\rho>0$ denotes a positive penalty parameter value and $G(y, z)=0$ is a compact notation 705 for the nonlinear equality constraints $g(y)+Dz=0$ 632, such that a term $\rho\|G(y, z)\|_1$ quantifies the satisfaction of the nonlinear equality constraints for an MINLP solution guess $(y, z)$ in the MISCP optimization algorithm. If an MINLP solution guess is feasible, then $G(y, z)=g(y)+Dz=0$ and therefore the second term is minimized and $\rho\|G(y, z)\|_1=0$. In some embodiments of the invention, a different norm can be used in the merit function such as, for example, a 2-norm or an $\infty$-norm instead of the 1-norm.

Finally, a third term in the merit function 711 can be defined as $\rho \Sigma_i \max(H_i(y, z), \epsilon)$, where $\epsilon \geq 0$ is a small nonnegative tolerance value and $H(y, z) \leq 0$ is a compact notation 705 for the nonlinear inequality constraints $h(y)+Ez \leq 0$ 633, such that a term $\rho \Sigma_i \max(H_i(y, z), \epsilon)$ quantifies the satisfaction of the nonlinear inequality constraints for an MINLP solution guess $(y, z)$ in the MISCP optimization algorithm. If an MINLP solution guess is feasible, then $H_i(y,z)=h_i(y)+E_i z \leq 0$ and therefore the third term is minimized and $\rho \Sigma_i \max(H_i(y, z), \epsilon)=\rho \Sigma_i \epsilon$. In some embodiments of the invention, the tolerance value $\epsilon=0$ but, in other embodiments, the tolerance value can be chosen as a small positive value, for example, $\epsilon=10^{-6}$.

In some embodiments of the invention, the MISCP optimization algorithm performs one or multiple iterations, in which each iteration performs a partial convexification step, and then constructs and solves an MICP subproblem 715 to compute a search direction for continuous variables $\Delta y^k$ and a search direction for integer variables $\Delta z^k$. In some embodiments of the invention, given the solution of the MICP subproblem 715, the solution guess for integer variables can be updated directly as $z^{k+1}=z^k+\Delta z^k$. Some embodiments of the invention are based on the realization that a search direction for continuous variables $\Delta y^k$, computed as the solution of an MICP subproblem 715 such as the MIQP subproblem 650 in FIG. 6B, is a descent direction for a merit function $\phi(y; z^{k+1}, \rho)$ 711 evaluated at the updated solution guess for integer variables $z^{k+1}=z^k+\Delta z^k$, i.e., $$\nabla_y \phi(y^k; z^{k+1}, \rho)^\tau \Delta y^k < 0,$$

given a sufficiently large parameter value $\rho > 0$ 720.

In some embodiments of the invention, each iteration of the MISCP optimization algorithm computes a sufficiently large parameter value $\rho > 0$ such that the descent condition 721 holds. Embodiments of the invention are based on the realization that increasing the parameter value $\rho > 0$ results in a merit function 711 that quantifies constraint satisfaction relatively more strongly compared to optimality for the MINLP solution guess. Alternatively, decreasing the parameter value $\rho > 0$ results in a merit function 711 that quantifies optimality relatively more strongly compared to constraint satisfaction for the MINLP solution guess.

Figure 7B:
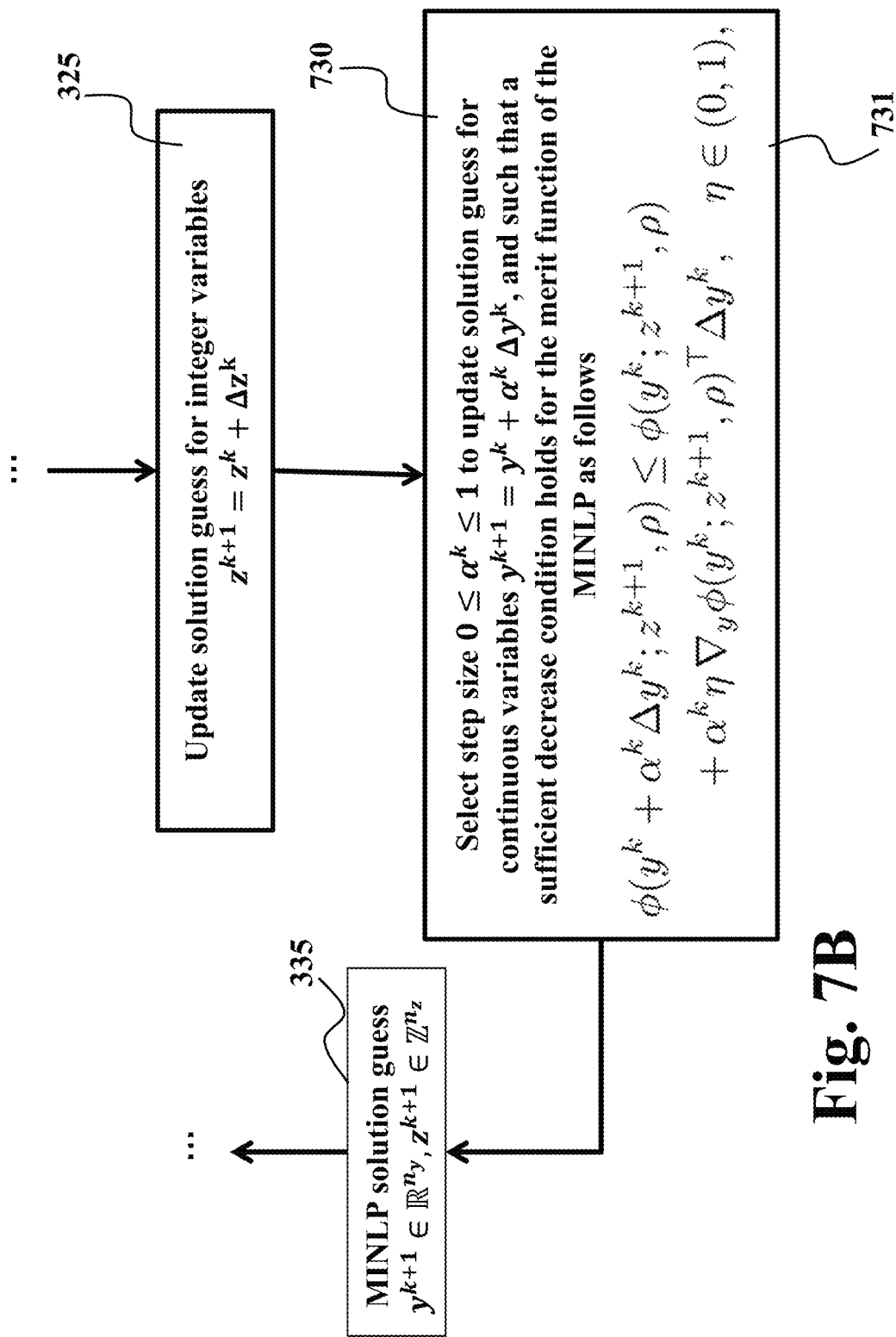
FIG. 7B illustrates a block diagram of a line search procedure for computing a step size, based on one or multiple merit function evaluations and a directional derivative, to update the MINLP solution guess in the sequential convexification-based optimization procedure, according to some embodiments.

FIG. 7B illustrates a block diagram of a line search procedure for computing a step size 730, based on one or multiple merit function evaluations and a directional derivative computation, to update the MINLP solution guess in the sequential convexification-based optimization procedure as described in FIG. 3A. In some embodiments of the invention, each iteration performs a partial convexification step 315, solves an MICP subproblem to compute a search direction $(\Delta y^k, \Delta z^k)$ 320, updates the solution guess for integer variables $z^{k+1}=z^k+\Delta z^k$ 325, then selects a step size value $0 \leq \alpha^k \leq 1$ to update the solution guess for continuous variables $y^{k+1}=y^k+\alpha^k \Delta y^k$ 730 to obtain a new MINLP solution guess $y^{k+1} \in \mathbb{R}^{n_y}$, $z^{k+1} \in \mathbb{Z}^{n_z}$ 335 for the next iteration of the MISCP optimization algorithm.

In some embodiments of the invention, the step size value $0 \leq \alpha^k \leq 1$ is selected to ensure a sufficient decrease condition holds for a merit function of the MINLP, for example the 1-norm based merit function 711, as follows 731

$$\phi(y^k + \alpha^k \Delta y^k; z^{k+1}, \rho) \leq \phi(y^k; z^{k+1}, \rho) + \alpha^k \eta \nabla_y \phi(y^k; z^{k+1}, \rho)^T \Delta y^k,$$
$$\eta \in (0, 1),$$

where a parameter value $0<\eta<1$ can be chosen. Embodiments of the invention are based on the realization that the sufficient decrease condition 731 ensures that a merit function value $\phi(y^k+\alpha^k\Delta y^k; z^{k+1}, \phi)$ for the updated MINLP solution guess $y^{k+1}=y^k+\alpha^k \Delta y^k$ 730 is at least smaller than the merit function value $\phi(y^k; z^{k+1}, \rho)$ for the current MINLP solution guess $y^k$, given the directional derivative computation $\nabla_y\phi(y^k; z^{k+1}, \rho)$ for the merit function evaluated at the current solution guess $y^k$ for continuous variables and the updated solution guess $z^{k+1}$ for integer variables. Embodiments of the invention are based on the realization that the directional derivative of a merit function can be evaluated computationally efficiently using symbolic differentiation, algorithmic differentiation, and/or numerical differentiation tools. For example, the gradient $\nabla_y\phi(y^k; z^{k+1}, \rho)$ can be evaluated efficiently using an adjoint mode of algorithmic differentiation applied to the merit function 711.

In some embodiments of the invention, an iterative backtracking procedure is used to select the step size value $0 \leq \alpha^k \leq 1$, starting from an initial value $\alpha^k=1$ and this step size value can be decreased iteratively towards $0 \leq \alpha^k$ until the sufficient decrease condition 731 holds for a merit function of the MINLP.

FIG. 7C illustrates pseudo code of a possible implementation of an MISQP optimization method, based on a line search procedure, to compute a feasible and (locally) optimal solution for the MINLP in an MINMPC controller 740, according to some embodiments of the invention. An initialization step 741 computes an initial MINLP solution guess $(y^0, z^0)$, for example, based on a modification of a feasible and (locally) optimal solution to an MINLP at a previous control time step. In addition, the initialization step 741 selects values for the parameters $0<\eta<1$, $0<\beta<1$, a tolerance parameter value $\epsilon_{tol}>0$, and the iteration number $k \leftarrow 0$ is initialized. In some embodiments of the invention, the MISQP optimization method performs one or multiple iterations until a termination condition is satisfied, for example, until a norm of the optimality and/or feasibility conditions is smaller than or equal to the tolerance parameter value $\epsilon_{tol}>0$ 742.

In some embodiments of the invention, the termination condition of the MISQP optimization algorithm can be based on a norm of the Karush-Kuhn-Tucker (KKT) necessary conditions of optimality for the MINLP $\|r(y^k, z^k)\|$ 742, excluding the integrality conditions. Therefore, as long as the condition $\|r(y^k, z^k)\|>\epsilon_{tol}$ 742 holds, the MISQP optimization algorithm performs one or multiple additional iterations to compute a feasible and (locally) optimal MINLP solution.

Each iteration performs a partial convexification step 315, followed by the solution of an MIQP subproblem to compute a search direction $(\Delta y^k, \Delta z^k)$ 680 such as the MIQP subproblem 650 in FIG. 6B, or followed by the solution of a convex QP subproblem to compute a search direction $\Delta y^k$ and $\Delta z^k=0$ is fixed 675 such as the convex QP subproblem 660 in FIG. 6C. For example, in some embodiments of the invention, the decision to solve either an MIQP subproblem 680 or a convex QP subproblem 675 can be based on the number of iterations 743. For example, if $k \geq N_{miqp}$, then a convex QP subproblem is solved 675, otherwise an MIQP subproblem is solved 680. In other embodiments, each iteration of the optimization procedure checks 670 whether the current solution guess for the integer variables $z^k \in \mathbb{Z}^{n_z}$ is sufficiently good, e.g., the solution guess is (likely) feasible and/or sufficiently close to a (locally) optimal solution. If the current solution guess for the integer variables $z^k \in \mathbb{Z}^{n_z}$ is sufficiently good 670, then the values for integer variables can be fixed, i.e., $\Delta z^k=0$ and a convex QP subproblem can be solved to compute $\Delta y^k$ 675. Alternatively, if the current solution guess for the integer variables $z^k \in \mathbb{Z}^{n_z}$ is not sufficiently good 670, then a non-convex MIQP subproblem is constructed and solved to compute $(\Delta y^k, \Delta z^k)$ 680.

Given a new search direction $(\Delta y^k, \Delta z^k)$, each iteration of the MISQP optimization method can update the solution guess for integer variables $z^{k+1}=z^k+\Delta z^k$ 325, an iteration can compute a sufficiently large parameter value $\rho>0$ such that a descent condition 721 holds, and a step size value can be initialized as $\alpha^k \leftarrow 1$ 747. Then, in some embodiments of the invention, an iterative backtracking procedure is used to select the step size value $0 \leq \alpha^k \leq 1$ while a sufficient decrease condition 731 is not yet satisfied 748. For example, each iteration of the iterative backtracking procedure decreases the current step size value $\alpha^k \leftarrow \tilde{\beta}\alpha^k$ 749, given a parameter value $0<\tilde{\beta}\leq\beta<1$, until a sufficient decrease condition 731 is satisfied for a merit function of the MINLP. In some embodiments of the invention, the value for $\tilde{\beta}$ is decreased gradually in each iteration of the iterative backtracking procedure in order to reduce the number of evaluations for the merit function of the MINLP, and therefore reduce the computational cost of the step size selection in the MISQP optimization algorithm. At the end of each iteration, the step size value $0 \leq \alpha^k \leq 1$ can be used to update the solution guess for continuous variables $y^{k+1}=y^k+\alpha^k \Delta y^k$ 730 to obtain a new MINLP solution guess $y^{k+1} \in \mathbb{R}^{n_y}$, $z^{k+1} \in \mathbb{Z}^{n_z}$ 335 for the next iteration of the MISQP optimization algorithm 740.

Figure 8A:
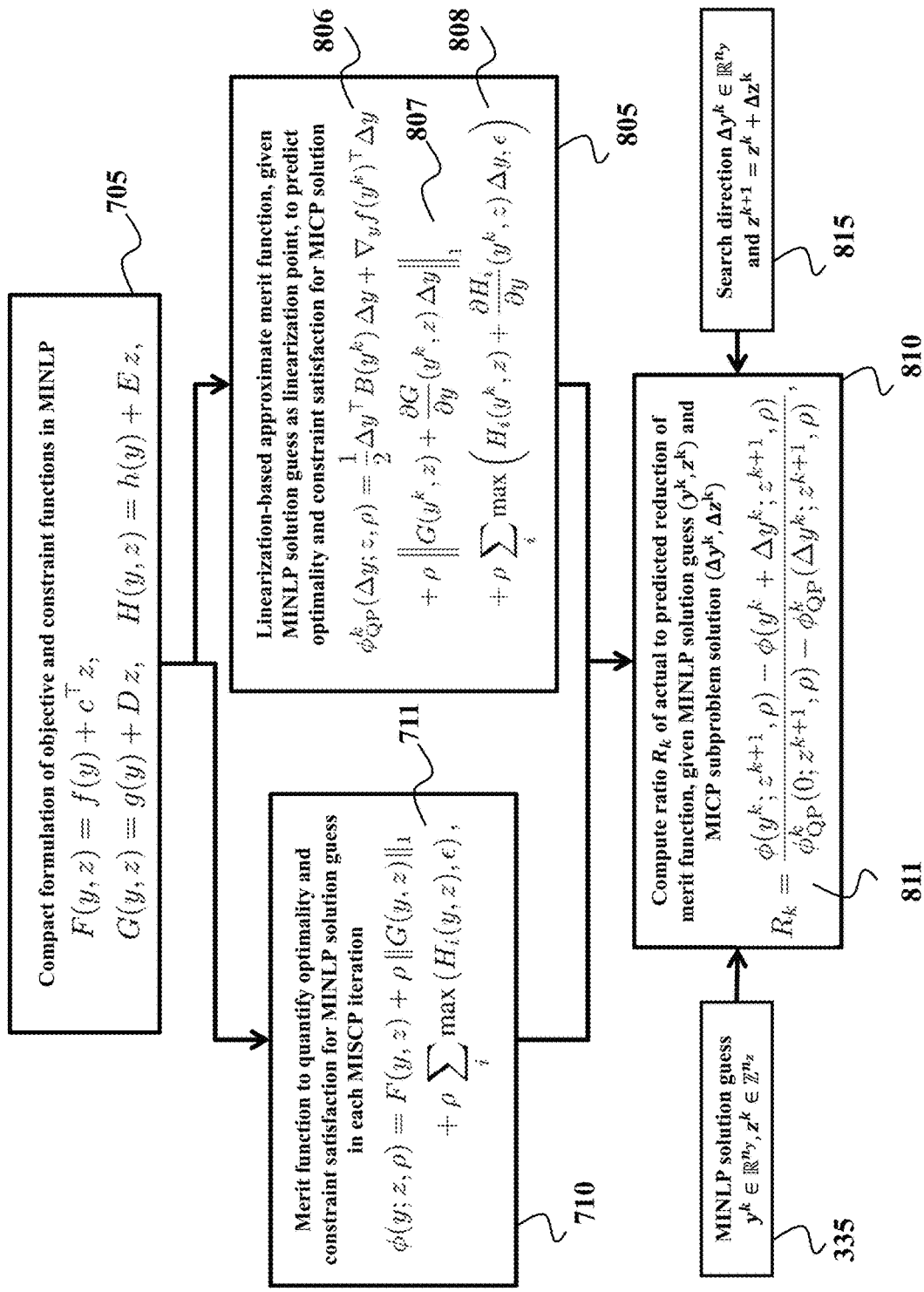
FIG. 8A illustrates a block diagram for a ratio of actual to predicted reduction for the value of a merit function in each iteration of the sequential convexification-based optimization procedure, according to some embodiments.

FIG. 8A illustrates a block diagram to compute a ratio $R_k$ of actual to predicted reduction for the value of a merit function 810, given the MINLP solution guess $(y^k, z^k)$ and MICP subproblem solution $(\Delta y^k, \Delta z^k)$, in each iteration of the sequential convexification-based optimization procedure. Given a compact formulation of objective and constraints functions 705 in the MINLP, a merit function can be defined to quantify optimality and constraint satisfaction for an MINLP solution guess in each MISCP iteration 711

$$\phi_{QP}^k(\Delta y; z, \rho) = \frac{1}{2}\Delta y^T B(y^k)\Delta y + \nabla_y f(y^k)^T \Delta y +$$

$$\rho \left\| G(y^k, z) + \frac{\partial G}{\partial y}(y^k, z)\Delta y \right\|_1 + \rho \sum_i \max\left(H_i(y^k, z) + \frac{\partial H_i}{\partial y}(y^k, z)\Delta y, \epsilon\right)$$

where a value of the merit function can be minimized to find a feasible and (locally) optimal solution of the MINLP in separable format 630.

In some embodiments of the invention, a linearization-based approximation of the merit function 805 can be used, given the MINLP solution guess $(y^k, z^k)$ and MICP subproblem solution $(\Delta y^k, \Delta z^k)$, to predict the optimality and constraint satisfaction in the search direction that is computed by the MICP subproblem solution, for example, as follows $$\phi_{QP}^k(\Delta y; z, \rho) = \frac{1}{2}\Delta y^T B(y^k)\Delta y + \nabla_y f(y^k)^T \Delta y +$$

$$\rho \left\| G(y^k, z) + \frac{\partial G}{\partial y}(y^k, z)\Delta y \right\|_1 + \rho \sum_i \max\left(H_i(y^k, z) + \frac{\partial H_i}{\partial y}(y^k, z)\Delta y, \epsilon\right)$$

which includes a linear-quadratic approximation of the objective function 806, based on a gradient vector $\nabla_y f(y^k)$ for the function $f(y): \mathbb{R}^{n_y} \to \mathbb{R}$, evaluated at the current solution guess $y^k \in \mathbb{R}^{n_y}$, and on a symmetric Hessian matrix $B(y^k)$ that is positive semi-definite in general, similar to the linear-quadratic objective 651 of the MIQP subproblem 650 in FIG. 6B. In addition, a second term 807 in the linearization-based approximate merit function 805 can correspond to the value of a 1-norm $\rho\|\cdot\|_1$ applied to the linearized equality constraints $$G(y^k, z) + \frac{\partial G(y^k, z)}{\partial y}\Delta y = g(y^k) + \frac{\partial g(y^k)}{\partial y}\Delta y + Dz$$

652 of the MIQP subproblem 650 in FIG. 6B. Finally, a third term 808 in the linearization-based approximate merit function 805 can correspond to the value of a modified 1-norm $\rho \sum_i \max(\cdot, \epsilon)$ applied to the linearized inequality constraints $$H(y^k, z) + \frac{\partial H(y^k, z)}{\partial y}\Delta y = h(y^k) + \frac{\partial h(y^k)}{\partial y}\Delta y + Ez$$

653 of the MIQP subproblem 650 in FIG. 6B.

In some embodiments of the invention, given a merit function for the MINLP 711, given a linearization-based approximation of the merit function 805, given an MINLP solution guess $y^k \in \mathbb{R}^{n_y}$, $z^k \in \mathbb{Z}^{n_z}$ 335, given a search direction $\Delta y^k \in \mathbb{R}^{n_y}$ and given an updated solution guess for integer variables $z^{k+1} = z^k + \Delta z^k$ 815, a ratio $R_k$ of actual to predicted reduction for the value of a merit function 810 can be defined, for example, as follows 811

$$R_k = \frac{\phi(y^k; z^{k+1}, \rho) - \phi(y^k + \Delta y^k; z^{k+1}, \rho)}{\phi_{QP}^k(0; z^{k+1}, \rho) - \phi_{QP}^k(\Delta y^k; z^{k+1}, \rho)},$$

where a positive ratio value $R_k > 0$ can correspond to a reduction in the actual value of the merit function $\phi(y^k + \Delta y^k; z^{k+1}, \rho) < \phi(y^k; z^{k+1}, \rho)$ 710 and a reduction in the linearization-based approximation of the merit function $\phi_{QP}^k(\Delta y^k; z^{k+1}, \rho) < \phi_{QP}^k(0; z^{k+1}, \rho)$ 805. Some embodiments of the invention are based on the realization that a value for the ratio $R_k$ needs to be positive and sufficiently large in order to accept a step in the search direction $\Delta y^k$ for the continuous variables in each iteration of the MISCP optimization method.

FIG. 8B illustrates a block diagram of a trust-region procedure for deciding on how to update the MINLP solution guess, based on a computation of a ratio value $R_k$ of actual to predicted reduction for the value of a merit function 810 and based on a computation of a new trust-region radius value $d_{k+1}$ 820, given a current trust-region radius value $d_k$, ratio value $R_k$ and MICP subproblem solution $(\Delta y^k, \Delta z^k)$, to update the MINLP solution guess in the sequential convexification-based optimization procedure as described in FIG. 3B. In some embodiments of the invention, each iteration performs a partial convexification step 315, solves an MICP subproblem to compute a search direction $(\Delta y^k, \Delta z^k)$ 320, updates the solution guess for integer variables $z^{k+1} = z^k + \Delta z^k$ 325, then evaluates a ratio value $R_k$ 811 to compute a new trust-region radius value $d_{k+1}$ 820 and to decide whether to perform a full-step update to the MINLP solution guess $z^{k+1} = z^k + \Delta z^k$, $y^{k+1} = y^k + \Delta y^k$ 830 or not to update the MINLP solution guess $z^{k+1} = z^k$, $y^{k+1} = y^k$ 831, for example, based on a condition if the ratio value $R_k$ is Positive and sufficiently large 825, to obtain a new MINLP solution guess $y^{k+1} \in \mathbb{R}^{n_y}$, $z^{k+1} \in \mathbb{Z}^{n_z}$ 335 for the next iteration of the MISCP optimization algorithm.

In some embodiments of the invention, the update of a new trust-region radius value $d_{k+1}$ 820 can include decreasing the trust-region radius value $d_{k+1}$ 820, compared to the current radius value $d_k$, if the ratio value $R_k < \eta_1 \ll 1$ 861 is considerably small or even negative. In addition, in some embodiments of the invention, the update of a new trust-region radius value $d_{k+1}$ 820 can include decreasing the trust-region radius value $d_{k+1}$ 820, compared to the current radius value $d_k$, if the step search direction $\Delta y^k$ for the continuous variables is considerably smaller than the current radius value $d_k$, for example, if $\|M\Delta y^k\|_p < \gamma_1 d_k$ 863 where $M \succeq 0$ denotes a scaling matrix and $0 < \gamma_1 < 1$. In some embodiments of the invention, the value $p \in [1, \infty]$ defines the norm for the trust-region procedure in the MISCP optimization algorithm, for example, $p=1$ or $p=\infty$ to define the 1-norm or $\infty$-norm, respectively.

In some embodiments of the invention, the update of a new trust-region radius value $d_{k+1}$ 820 can include increasing the trust-region radius value $d_{k+1}$ 820, compared to the current radius value $d_k$, for example, if the ratio value $R_k$ is sufficiently large and positive $R_k > \eta_2 > 0$ and the step search direction $\Delta y^k$ for the continuous variables is strictly bounded by the current trust-region radius value $d_k$, i.e., the condition $\|M\Delta y^k\|_p = d_k$ 865 holds as an equality constraint.

Figure 8C:
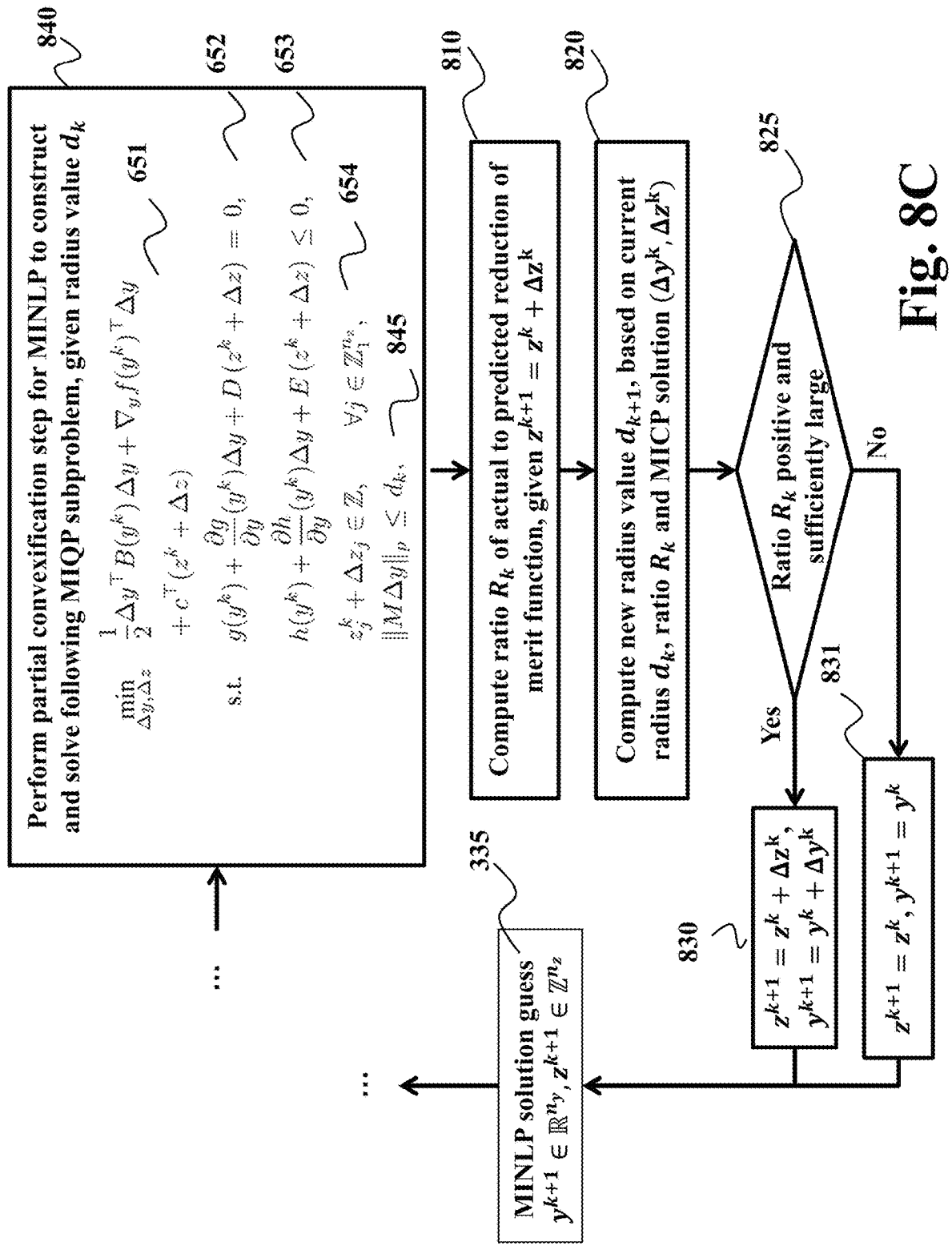
FIG. 8C illustrates a block diagram of an MISQP optimization algorithm, based on a partial convexification step to construct and solve an MIQP subproblem subject to trust-region constraints to restrict the search direction within a sub-region of the MINLP solution space, according to some embodiments.

FIG. 8C illustrates a block diagram of a trust-region procedure for deciding on how to update the MINLP solution guess in the sequential convexification-based optimization procedure as described in FIG. 3B, based on a partial convexification step 315 to construct and solve an MICP subproblem subject to trust-region constraints 360 to restrict the search direction within a sub-region of the MINLP solution space in each iteration of the MISCP optimization algorithm. For example, in some embodiments of the invention, a partial convexification step can be used to construct and solve an MIQP subproblem 840 that includes one or multiple trust-region constraints of the form $\|M\Delta y\|_p \leq d_k$ 845, where $M \succeq 0$ denotes a scaling matrix which can often be a diagonal matrix to represent the relative scaling for each of the dimensions in the MINLP solution space. Some embodiments of the invention are based on the realization that the MIQP subproblem 840 corresponds to the MIQP subproblem 650 in FIG. 6B with the additional trust-region constraints 845 to restrict the search direction $\Delta y$ within a sub-region of the MINLP solution space in which the MIQP subproblem forms a sufficiently accurate approximation of the original MINLP in separable format 630.

Some embodiments of the invention are based on the realization that, in general, the MICP subproblem becomes computationally cheaper to solve for increasingly small values of the trust-region radius $d_k$. Therefore, in some embodiments of the invention, the trust-region procedure aims to reduce the trust-region radius when it is possible without slowing down convergence of the MISCP optimization algorithm to a feasible and (locally) optimal MINLP solution.

FIG. 8D illustrates pseudo code of a possible implementation of an MISQP optimization method, based on a trust-region search procedure, to compute a feasible and (locally) optimal solution for the MINLP in an MINMPC controller 850, according to some embodiments of the invention. An initialization step 851 computes an initial MINLP solution guess $(y^0, z^0)$, for example, based on a modification of a feasible and (locally) optimal solution to an MINLP at a previous control time step. In addition, the initialization step 851 selects values for the parameters $0 < \eta_1 \leq \eta_2 < 1$, parameters $0 < \gamma_1 \leq \gamma_2 < 1 \leq \gamma_3$, values for bounds on the trust-region radius $0 < \underline{d} \leq \overline{d}$, an initial trust-region radius value $d_0 \in [\underline{d}, \overline{d}]$, a tolerance parameter value $\epsilon_{tol} > 0$, and the iteration number $k \leftarrow 0$ is initialized. In some embodiments of the invention, the MISQP optimization method performs one or multiple iterations until a termination condition is satisfied, for example, until a norm of the optimality and/or feasibility conditions is smaller than or equal to the tolerance parameter value $\epsilon_{tol} > 0$ 742.

Each iteration of a trust-region MISQP optimization method performs a partial convexification step 315, followed by the solution of an MIQP subproblem to compute a search direction $(\Delta y^k, \Delta z^k)$ 855 such as the MIQP subproblem 840 in FIG. 8C, or followed by the solution of a convex QP subproblem to compute a search direction $\Delta y^k$ and $\Delta z^k = 0$ is fixed 854 such as the convex QP subproblem that results when fixing $\Delta z^k = 0$ in the MIQP subproblem 840 in FIG. 8C, similar to the convex QP subproblem 660 in FIG. 6C, but including one or multiple trust-region constraints of the form $\|M\Delta y\|_p \leq d_k$ 845. The decision to solve either an MIQP subproblem 855 or a convex QP subproblem 854, including trust-region constraints, can be made similarly as for the pseudo code in FIG. 7C.

Given a new search direction $(\Delta y^k, \Delta z^k)$, each iteration of the trust-region MISQP optimization method can compute a ratio $R_k$ of actual to predicted reduction for the value of a merit function 810 and, if the ratio value $R_k$ is sufficiently large and positive $R_k \geq \eta_1 > 0$ 825 then the search direction is accepted and a full-step update to the MINLP solution guess $y^{k+1} \leftarrow y^k + \Delta y^k$ and $z^{k+1} \leftarrow z^k + \Delta z^k$ 830 is computed and otherwise, if the ratio value $R_k$ is not sufficiently large and positive $R_k < \eta_1$ 825 then the search direction is rejected and the MINLP solution guess is not updated, i.e., $y^{k+1} \leftarrow y^k$ and $z^{k+1} \leftarrow z^k$ 831. Next, in some embodiments of the invention, a new trust-region radius value is computed 820.

Some embodiments of the invention shrink the trust-region radius value $d_{k+1} \leftarrow \max(\gamma_1 \|M\Delta y^k\|_p, \underline{d})$ 862, if the ratio value $R_k < \eta_1 \ll 1$ 861 is considerably small or even negative. In addition, some embodiments of the invention shrink the trust-region radius value $d_{k+1} \leftarrow \max(\gamma_2 d_k, \underline{d})$ 864, if the step search direction $\Delta y^k$ for the continuous variables is considerably smaller than the current radius value $d_k$, for example, if $\|M\Delta y^k\|_p < \gamma_1 d_k$ 863 where $M \succeq 0$ denotes a scaling matrix and $0 < \gamma_1 < 1$. Some embodiments of the invention, for example, grow the trust-region radius value $d_{k+1} \leftarrow \min(\gamma_3 d_k, \overline{d})$ 866, if the ratio value $R_k$ is sufficiently large and positive $R_k > \eta_2 > 0$ and the step search direction $\Delta y^k$ for the continuous variables is strictly bounded by the current trust-region radius value $d_k$, i.e., the condition $\|M\Delta y^k\|_p = d_k$ 865 holds as an equality constraint.

Figure 9A:
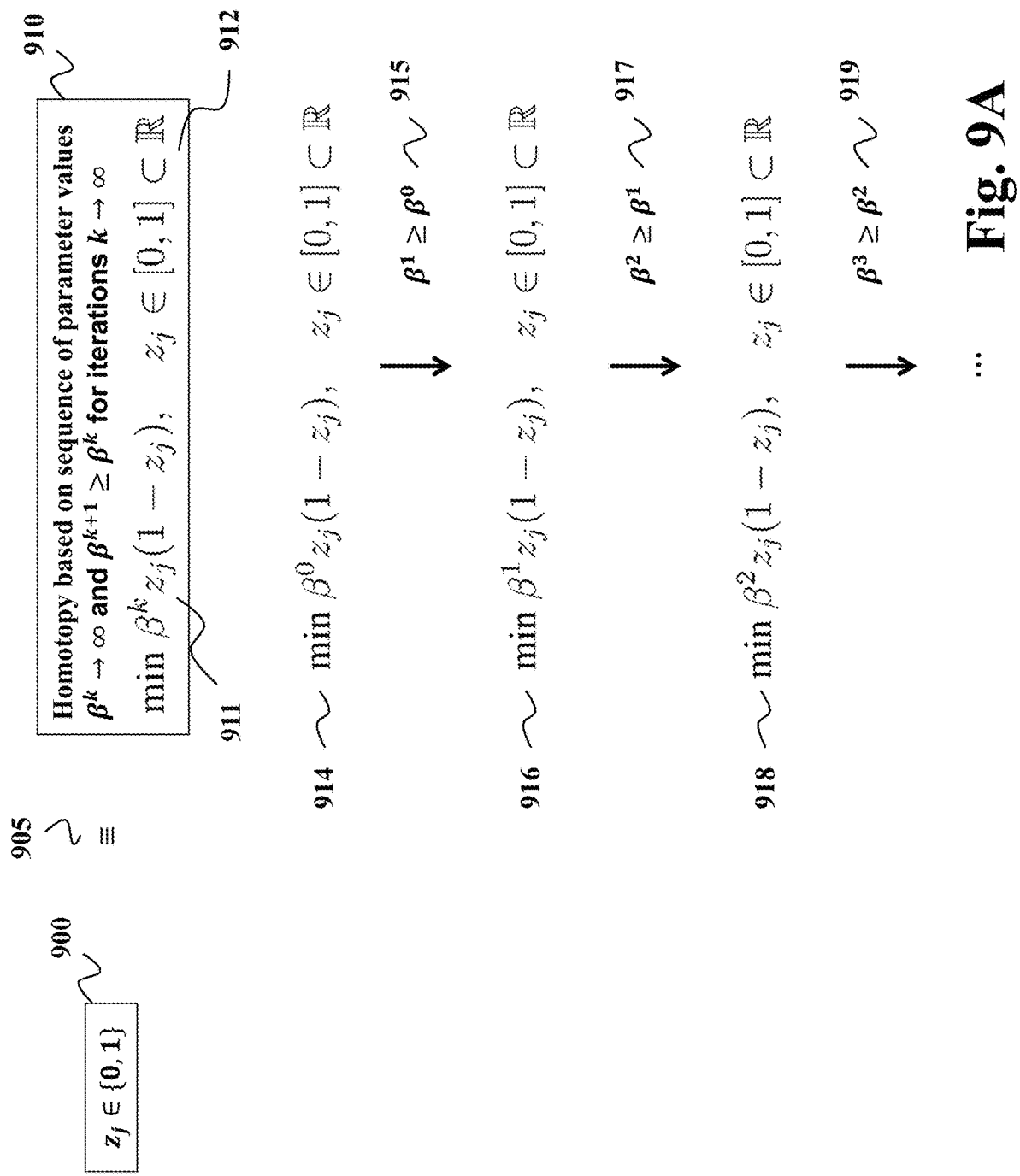
FIG. 9A illustrates an example of a homotopy-type penalty method, by adding one or multiple additional penalty terms to the MINLP objective function, that can be used to speed up convergence of a sequential convexification-based optimization procedure, according to some embodiments of the invention.

FIG. 9A illustrates an example of a homotopy-type penalty method that can be used to speed up convergence of a sequential convexification-based optimization procedure, according to some embodiments of the invention. For example, in some embodiments of the invention, if the integer variables of the MINLP 630 include one or multiple binary optimization variables $z_j \in \{0, 1\}$ 900, one or multiple additional penalty terms can be added to the MINLP objective function 631 in order to avoid cycling between different values of the MINLP solution guess in subsequent iterations of the MISCP optimization algorithm. Some embodiments of the invention are based on the realization that adding one or multiple additional penalty terms to the MINLP objective function 631 can result in an MICP subproblem 650 that is computationally cheaper to solve in each iteration of the MISCP optimization algorithm.

Some embodiments of the invention are based on the realization that enforcing an optimization variable to be binary, i.e., $z_j \in \{0, 1\}$ 900, can be equivalent 905 to adding a penalty term $\beta^k z_j(1-z_j)$ 911 to the MINLP objective function 631, while restricting $0 \leq z_j \leq 1$ 912, for a homotopy sequence of increasing parameter values $\beta^{k+1} \geq \beta^k$ such that $\beta^k \to \infty$ for iterations $k \to \infty$ 910. For example, in some embodiments of the invention, the MISCP optimization algorithm performs one or multiple iterations including a penalty term $\beta^0 z_j(1-z_j)$ 914 in the MINLP objective function 631, followed by an update to the homotopy penalty parameter value $\beta^1 \geq \beta^0$ 915, then the MISCP optimization algorithm performs one or multiple iterations including a penalty term $\beta^1 z_j(1-z_j)$ 916 in the MINLP objective function 631, followed by an update to the homotopy penalty parameter value $\beta^2 \geq \beta^1$ 917, and these computational steps can be repeated 918-919 for one or multiple iterations of the MISCP optimization algorithm until a feasible and (locally) optimal solution is found for the MINLP.

Figure 9B:
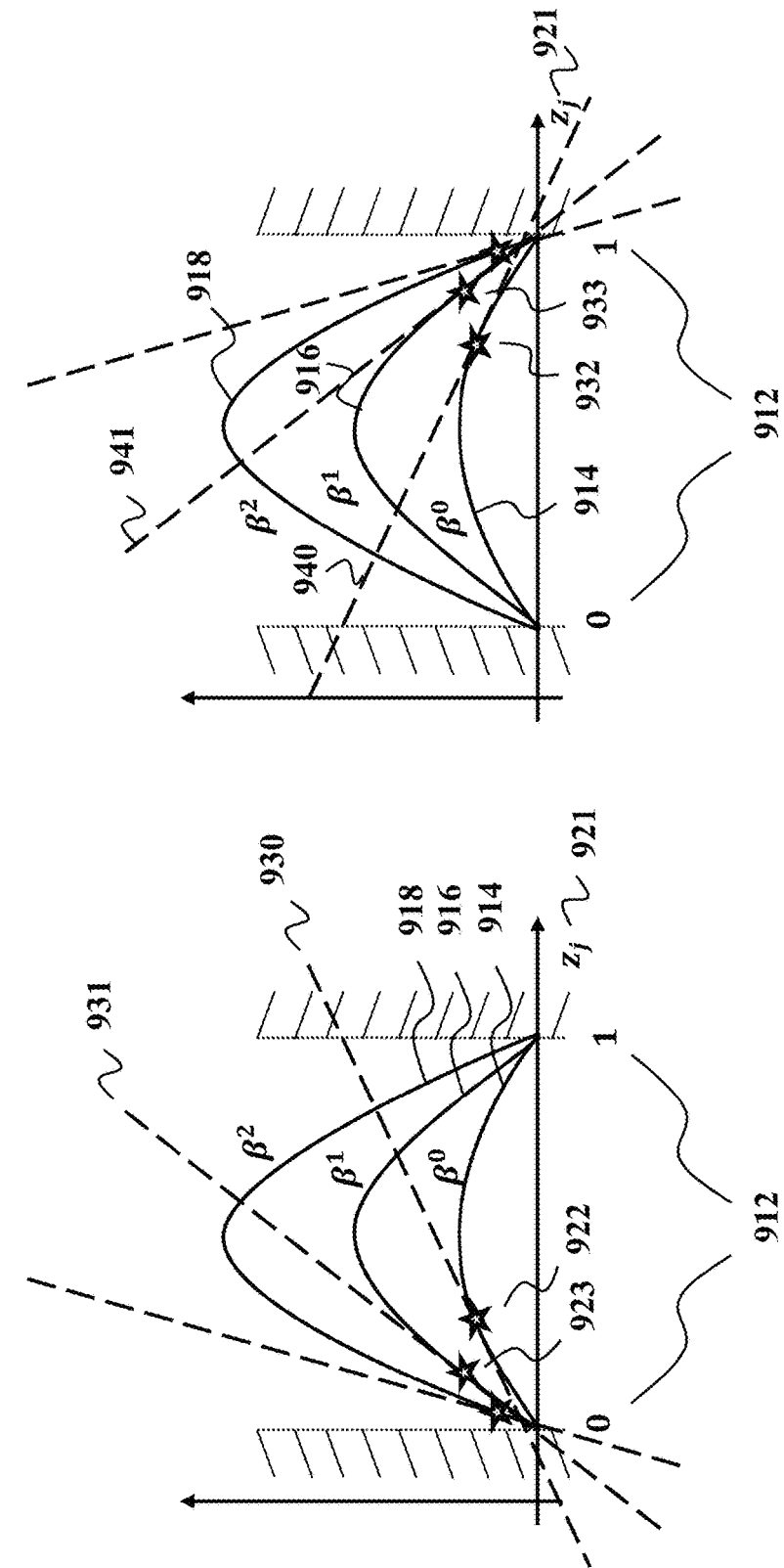
FIG. 9B illustrates a schematic of an example of a homotopy-type penalty method, by adding one or multiple additional penalty terms to the MINLP objective function, that can be used to speed up convergence of an MISCP optimization algorithm to find a feasible and (locally) optimal solution of the MINLP.

FIG. 9B illustrates a schematic of an example of a homotopy-type penalty method that can be used to speed up convergence of an MISCP optimization algorithm to find a feasible and (locally) optimal solution of the MINLP. In some embodiments of the invention, a homotopy-type penalty method can be used to adjust the cost function in each MICP subproblem 320 to increasingly enforce the MISCP optimization algorithm to compute an update to the MINLP solution guess for some or all of the integer and/or binary decision variables that remains close to the solution guess of the integer and/or binary decision variables at a previous MISCP iteration. For example, one or multiple linear terms $w_j z_j$ 930 can be added to the cost function of the MICP minimization subproblem, where $w_j > 0$ is a positive weight value, to ensure a binary variable $z_j$ 921, which is bounded as $0 \leq z_j \leq 1$ 912, to remain close to a solution guess $z_j^k = 0$. In some embodiments of the invention, a linear term $w_j^0 z_j$ 930 in the cost function of the MICP minimization subproblem can be computed as a linear approximation of a penalty term $\beta^0 z_j(1-z_j)$ 914 at an MINLP solution guess 922. Similarly, after one or multiple iterations of the MISCP optimization algorithm, and for an increased homotopy penalty parameter value $\beta^1 \geq \beta^0$ 915, a linear term $w_j^1 z_j$ 931 in the cost function of the MICP minimization subproblem can be computed as a linear approximation of a penalty term $\beta^1 z_j(1-z_j)$ 916 at an updated MINLP solution guess 923.

In addition, in some embodiments of the invention, one or multiple linear terms $w_j(1-z_j)$ 940 can be added to the cost function of the MICP minimization subproblem, where $w_j > 0$ is a positive weight value, to ensure a binary variable $z_j$ 921, which is bounded as $0 \leq z_j \leq 1$ 912, to remain close to a solution guess $z_j^k = 1$. In some embodiments of the invention, a linear term $w_j^0(1-z_j)$ 940 in the cost function of the MICP minimization subproblem can be computed as a linear approximation of a penalty term $\beta^0 z_j(1-z_j)$ 914 at an MINLP solution guess 932. Similarly, after one or multiple iterations of the MISCP optimization algorithm, and for an increased homotopy penalty parameter value $\beta^1 \geq \beta^0$ 915, a linear term $w_j^1(1-z_j)$ 941 in the cost function of the MICP minimization subproblem can be computed as a linear approximation of a penalty term $\beta^1 z_j(1-z_j)$ 916 at an updated MINLP solution guess 933.

Some embodiments of the invention are based on the realization that the use of a homotopy-type penalty method for some or all of the integer and/or binary decision variables may prevent cycling in the MISCP optimization algorithm. In addition, some embodiments of the invention are based on the realization that the use of a homotopy-type penalty method for some or all of the integer and/or binary decision variables may considerably reduce the computational cost of solving the MICP subproblems in the MISCP optimization algorithm. For example, some embodiments of the invention are based on a branch-and-bound method to solve the MICP subproblem in each iteration of the MISCP optimization algorithm, and adding one or multiple linear penalty terms to the cost function may result in a considerably smaller branch-and-bound search tree and therefore a considerably reduced computational cost of solving the MICP subproblem.

Figure 9C:
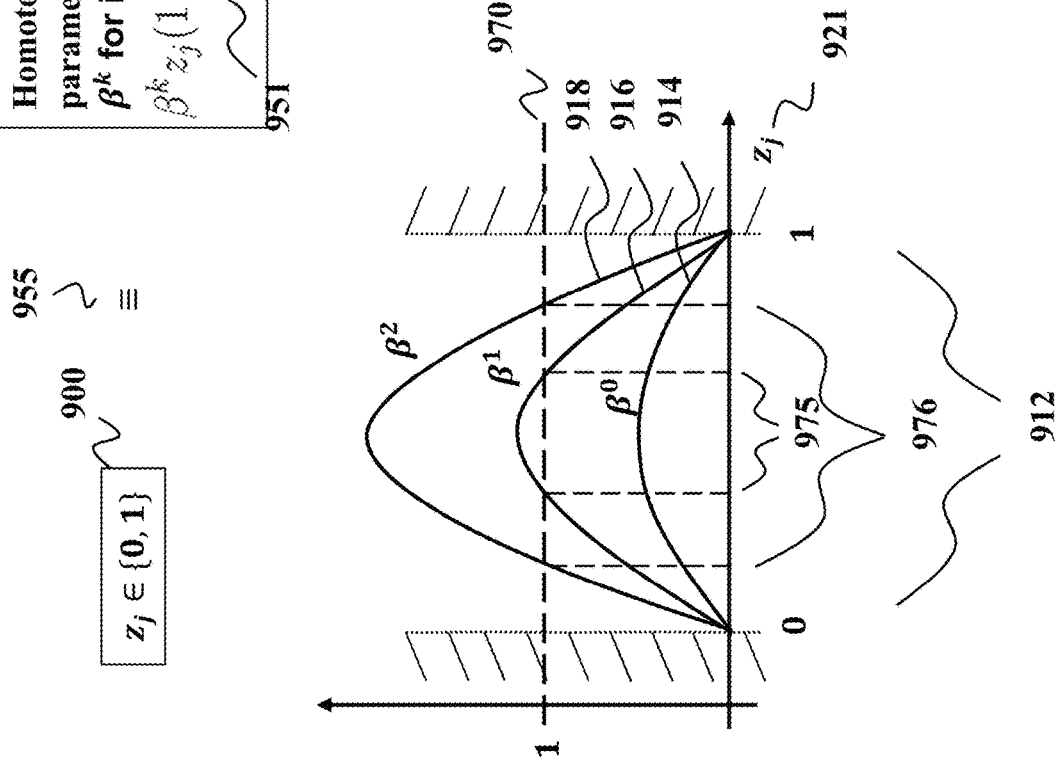
FIG. 9C illustrates a schematic of an example of a homotopy-type penalty method, by adding one or multiple additional linear and/or smooth nonlinear inequality constraints, that can be used to speed up convergence of an MISCP optimization algorithm to find a feasible and (locally) optimal solution of the MINLP.

FIG. 9C illustrates a schematic of an example of a homotopy-type penalty method, by adding one or multiple additional linear and/or smooth nonlinear inequality constraints, that can be used to speed up convergence of an MISCP optimization algorithm to find a feasible and (locally) optimal solution of the MINLP. For example, in some embodiments of the invention, if the integer variables of the MINLP 630 include one or multiple binary optimization variables $z_j \in \{0, 1\}$ 900, one or multiple additional linear and/or smooth nonlinear inequality constraints can be added to the MINLP constraints 633 in order to avoid cycling between different values of the MINLP solution guess in subsequent iterations of the MISCP optimization algorithm. Some embodiments of the invention are based on the realization that adding one or multiple additional linear and/or smooth nonlinear inequality constraints to the MINLP constraints 633 can result in an MICP subproblem 650 that is computationally cheaper to solve in each iteration of the MISCP optimization algorithm.

Some embodiments of the invention are based on the realization that enforcing an optimization variable to be binary, i.e., $z_j \in \{0, 1\}$ 900, can be equivalent 955 to adding a smooth nonlinear inequality constraint $\beta^k z_j(1-z_j) \leq 1$ 951 to the MINLP constraints 633, while restricting $0 \leq z_j \leq 1$ 912, for a homotopy sequence of increasing parameter values $\beta^{k+1} \geq \beta^k$ such that $\beta^k \to \infty$ for iterations $k \to \infty$ 950. For example, in some embodiments of the invention, the MISCP optimization algorithm performs one or multiple iterations including a smooth nonlinear inequality constraint $\beta^0 z_j(1-z_j) \leq 1$ 961 in the MINLP constraints 633, followed by an update to the homotopy penalty parameter value $\beta^1 \geq \beta^0$ 962, then the MISCP optimization algorithm performs one or multiple iterations including a smooth nonlinear inequality constraint $\beta^1 z_j(1-z_j) \leq 1$ 963 in the MINLP constraints 633, followed by an update to the homotopy penalty parameter value $\beta^2 \geq \beta^1$ 964, and these computational steps can be repeated 965-966 for one or multiple iterations of the MISCP optimization algorithm until a feasible and (locally) optimal solution is found for the MINLP.

In some embodiments of the invention, a homotopy-type penalty method can be used to add one or multiple inequality constraints to each MICP subproblem 320 to increasingly enforce the MISCP optimization algorithm to compute an update to the MINLP solution guess for some or all of the integer and/or binary decision variables that remains close to the solution guess of the integer and/or binary decision variables at a previous MISCP iteration. For example, a smooth nonlinear inequality constraint $\beta^0 z_j(1-z_j) \leq 1$ 970 may be feasible for all values of $0 \leq z_j \leq 1$ 912, given a particular homotopy parameter value $\beta^0 > 0$. However, for an increasingly large homotopy penalty parameter value $\beta^1 \geq \beta^0$ 962, a sub-region of the solution space 975 may become infeasible, and an increasingly large sub-region of the solution space 976 may become infeasible for an increasingly large homotopy penalty parameter value $\beta^2 \geq \beta^1$ 964, such that the MINLP solution guess is enforced to become equal to either $z_j^k = 0$ or $z_j^k = 1$ in one or multiple iterations of the MISCP optimization algorithm.

In some embodiments of the invention, if a particular set of values for one or multiple integer variables and/or continuous variables is detected to be infeasible for the MINLP 630, then each of the subsequent iterations of the MISCP optimization algorithm can include one or multiple linear and/or smooth nonlinear inequality constraints to avoid revisiting the same set of values for one or multiple integer variables and/or continuous variables for the MINLP 630.

Some embodiments of the invention are based on a branch-and-bound method to solve the MICP subproblem in each iteration of the MISCP optimization algorithm, and adding one or multiple inequality constraints may result in a considerably smaller branch-and-bound search tree and therefore a considerably reduced computational cost of solving the MICP subproblem.

Figure 10A:
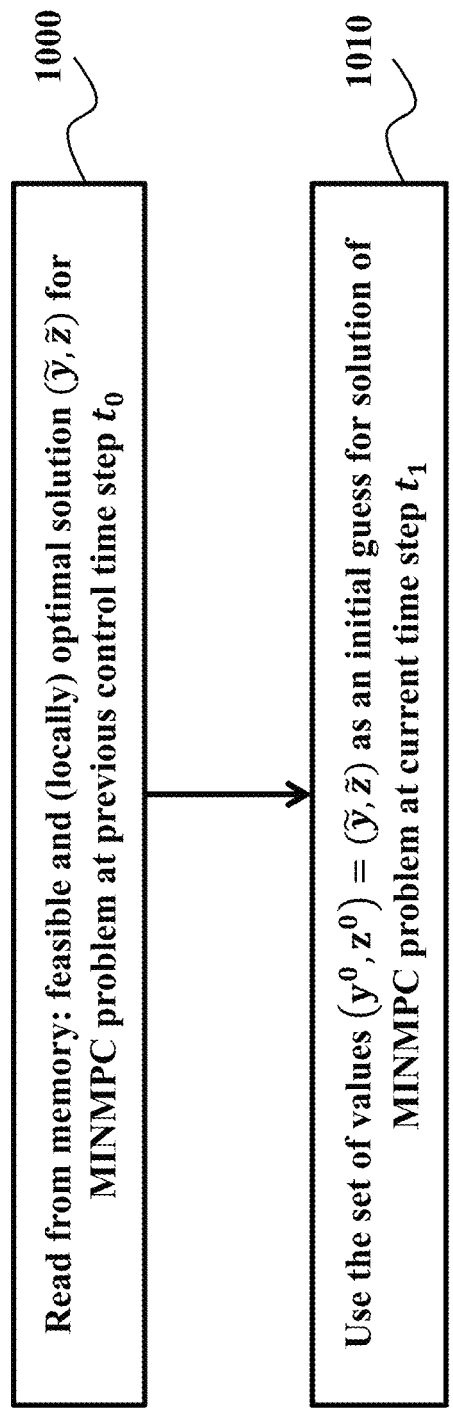
FIG. 10A illustrates a block diagram of a warm start initialization procedure to compute an initial MINLP solution guess, given an (approximate) solution to the MINMPC problem at a previous control time step, according to some embodiments of the invention.

FIG. 10A illustrates a block diagram of a warm start initialization procedure to compute an initial MINLP solution guess $(y^0, z^0) = (\tilde{y}, \tilde{z})$ 1010, given an (approximate) feasible and (locally) optimal solution to the MINMPC problem at a previous control time step 1000, which can be read from memory 210 in some embodiments of the invention. For example, in some embodiments of the invention, an MINLP solution guess $(\tilde{y}, \tilde{z})$ at a previous control time step to 1000 can be used directly as an initial MINLP solution guess $(y^0, z^0) = (\tilde{y}, \tilde{z})$ 1010 for the MISCP optimization algorithm to compute a feasible and (locally) optimal solution for the MINMPC problem at the current control time step $t_1$.

Figure 10B:
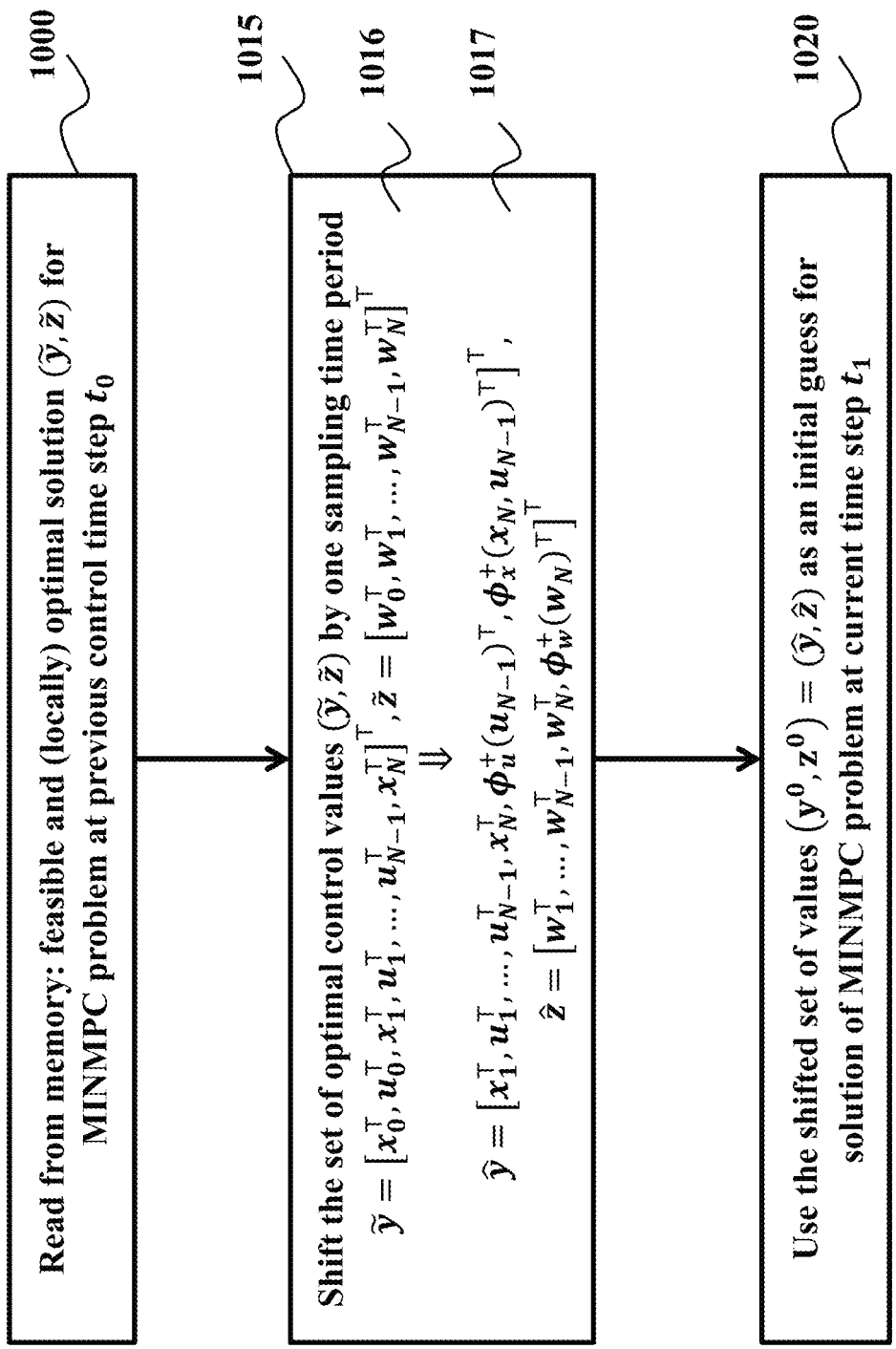
FIG. 10B illustrates a block diagram of a warm start initialization procedure, based on a time shifting operation, to compute an initial solution guess for an optimal control structured MINLP, given an (approximate) solution to the MINMPC problem at a previous control time step, according to some embodiments.

FIG. 10B illustrates a block diagram of a warm start initialization procedure, based on a time shifting operation 1015, to compute an initial solution guess $(y^0, z^0) = (\hat{y}, \hat{z})$ 1020 for an optimal control structured MINLP, given an (approximate) feasible and (locally) optimal solution to the MINMPC problem at a previous control time step 1000, which can be read from memory 210 in some embodiments of the invention. For example, some embodiments of the invention are based on the realization that an MINLP solution guess ($\tilde{y}$, $\tilde{z}$) at a previous control time step $t_0$ 1000 can include a set of optimal control values as follows 1016

$$\tilde{y} = [x_0^\tau, u_0^\tau, x_1^\tau, u_1^\tau, \ldots, u_{N-1}^\tau, x_N^\tau]^\tau, \tilde{z} = [w_0^\tau, w_1^\tau, \ldots, w_{N-1}^\tau, w_N^\tau]^\tau$$

which can be shifted in time by one sampling time period 1015 to result in the following shifted MINLP solution guess 1017

$$\hat{y} = [x_1^\tau, u_1^\tau, \ldots, u_{N-1}^\tau, x_N^\tau, \phi_u^+(u_{N-1}^\tau), \phi_x^+(x_N^\tau, u_{N-1}^\tau)]^\tau,$$

$$\hat{z} = [w_1^\tau, \ldots, w_{N-1}^\tau, w_N^\tau, \phi_w^+(w_N^\tau)]^\tau$$

where $\phi_u^+(\cdot)$, $\phi_x^+(\cdot)$ and $\phi_w^+(\cdot)$ denote linear or nonlinear operators to predict values for the control input variables, the state variables and the integer decision variables at the next time step within the prediction time horizon. In some embodiments of the invention, the time shifted set of optimal control values can be used directly as an initial MINLP solution guess $(y^0, z^0) = (\hat{y}, \hat{z})$ 1020 for the MISCP optimization algorithm to compute a feasible and (locally) optimal solution for the MINMPC problem at the current control time step $t_1$.

Figure 11A:
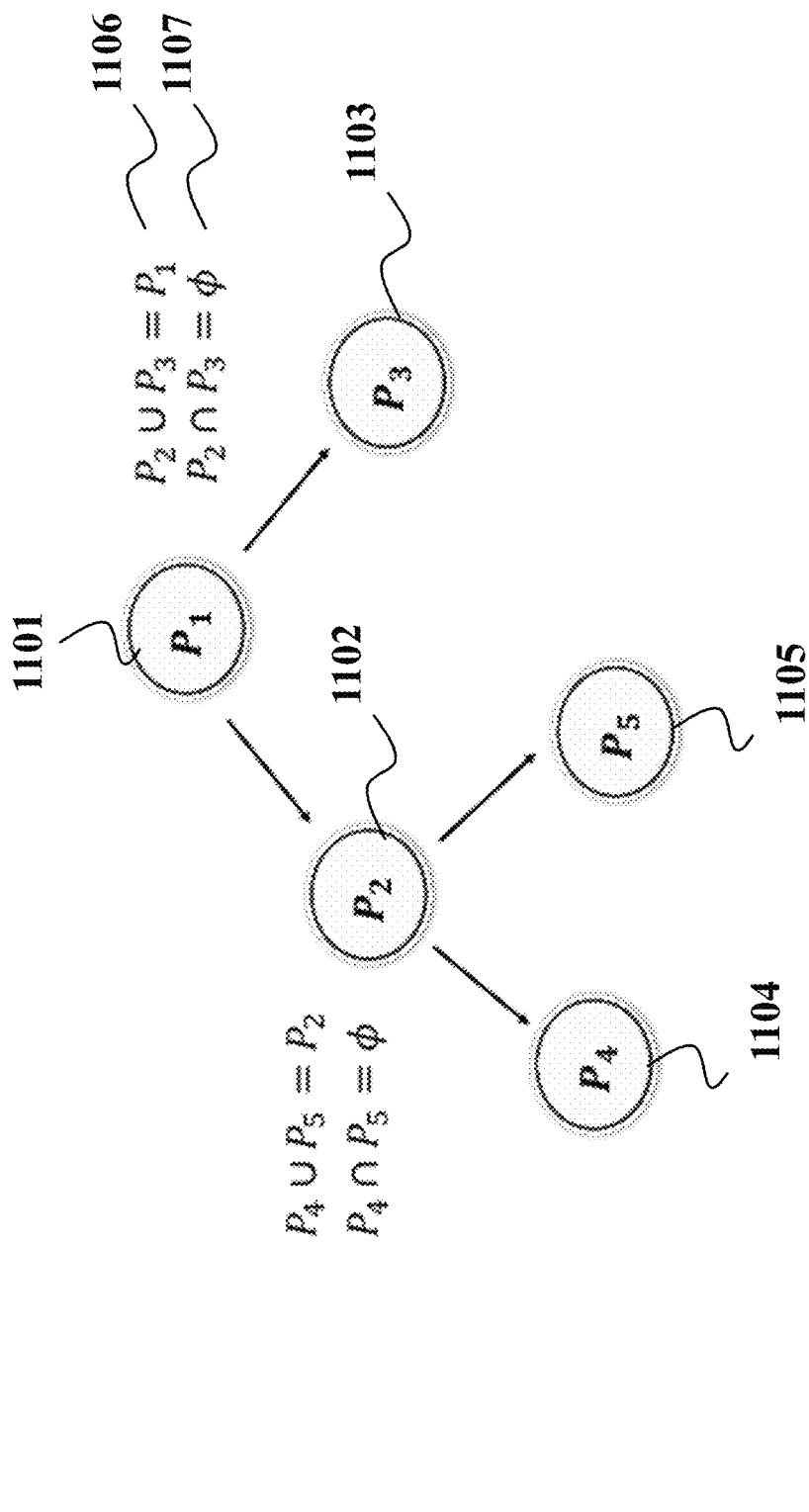
FIG. 11A illustrates a schematic of an example of a binary control variable search tree that represents a nested tree of search regions for the integer-feasible solution of the MICP subproblem, according to some embodiments.

FIG. 11A illustrates a schematic of an example of a binary control variable search tree that represents a nested tree of search regions for the integer-feasible solution of an MICP subproblem in an MISCP optimization algorithm, according to some embodiments. FIG. 11A shows a schematic representation of a branch-and-bound method, which is used to implement the MINMPC controller in some embodiments, by showing the binary search tree 1100 at a particular iteration of the mixed-integer optimization algorithm. The main idea of a branch-and-bound (B&B) method is to sequentially create partitions of the original MICP subproblem and then attempt to solve those partitions, where each partition corresponds to a particular region of the discrete control variable search space. In some embodiments, a branch-and-bound method selects a partition or node and selects a discrete control variable to branch this partition into smaller partitions or search regions, resulting in a nested tree of partitions or search regions.

For example, the partition $P_1$ 1101 represents a discrete search region that can be split or branched into two smaller partitions or regions $P_2$ 1102 and $P_3$ 1103, i.e., a first and a second region that are nested in a common region. The first and the second region are disjoint, i.e., the intersection of these regions is empty $P_2 \cap P_3 = \phi$ 1107, but they form the original partition or region $P_1$ together, i.e., the union $P_2 \cup P_3 = P_1$ 1106 holds after branching. The branch-and-bound method then solves an integer-relaxed convex problem for both the first and the second partition or region of the search space, resulting in two solutions (local optimal solutions) that can be compared against each other as well as against the currently known upper bound value to the optimal objective value. The first and/or the second partition or region can be pruned if their performance metric is less optimal than the currently known upper bound to the optimal objective value of the MICP subproblem. The upper bound value can be updated if the first region, the second region or both regions result in a discrete feasible solution to the MICP subproblem. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program or by using duality. If the solution method for the MICP subproblem happens to obtain an integer-feasible solution while solving a local relaxation, the branch-and-bound method can then use it to obtain a global upper bound for the mixed-integer control solution of the original MICP subproblem in the MISCP optimization algorithm to find a feasible and (locally) optimal solution of the MINLP. This may help to avoid solving or branching certain partitions that were already created, i.e., these partitions or nodes can be pruned. This general algorithmic idea of partitioning can be represented as a binary search tree 1100, including a root node, e.g., $P_1$ 1101 at the top of the tree, and leaf nodes, e.g., $P_4$ 1104 and $P_5$ 1105 at the bottom of the tree. In addition, the nodes $P_2$ 1102 and $P_3$ 1103 are typically referred to as the direct children of node $P_1$ 1101, while node $P_1$ 1101 is referred to as the parent of nodes $P_2$ 1102 and $P_3$ 1103. Similarly, nodes $P_4$ 1104 and $P_5$ 1105 are children of their parent node $P_2$ 1102.

Figure 11B:
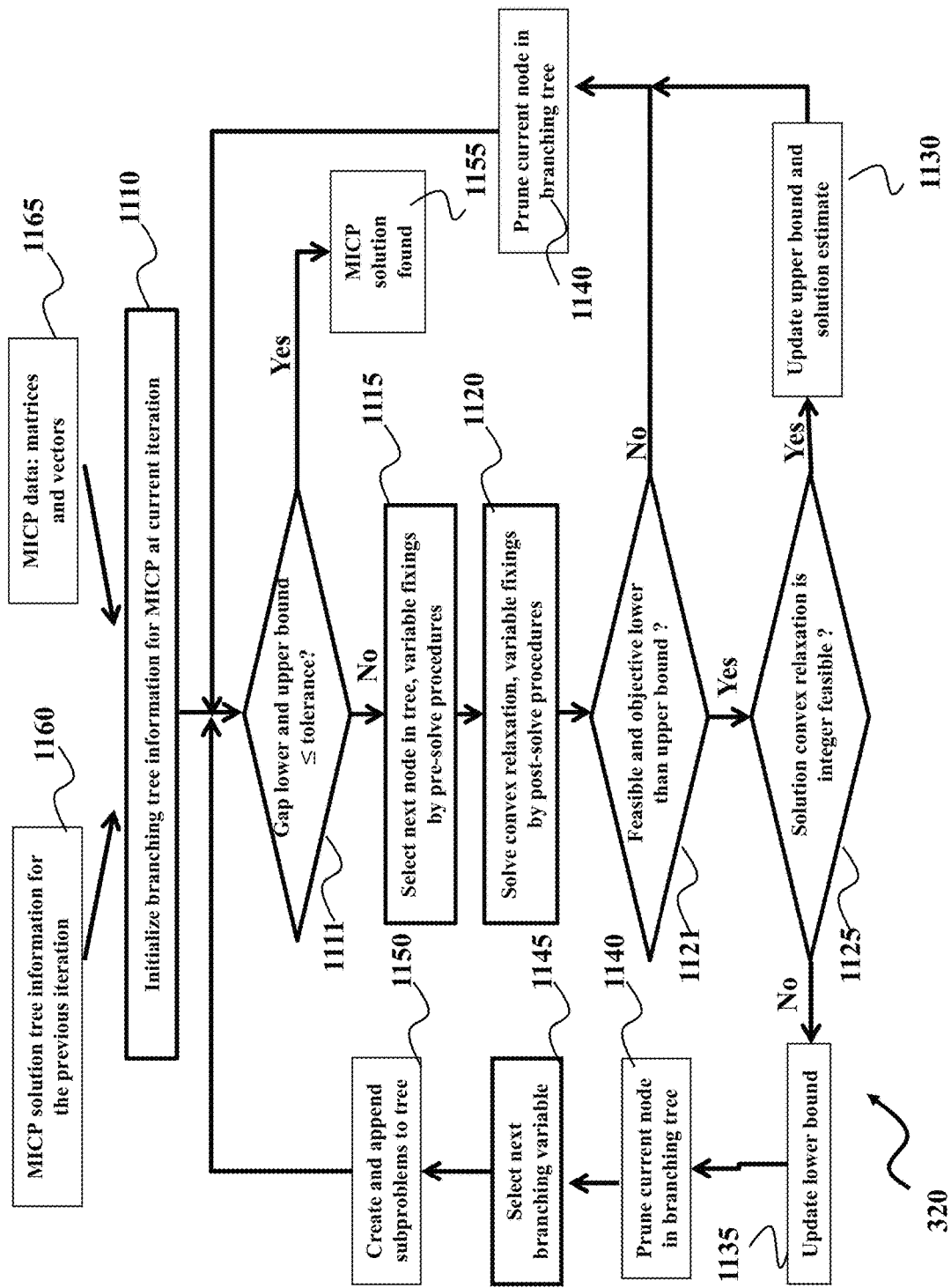
FIG. 11B illustrates a block diagram of a branch-and-bound mixed-integer optimization algorithm to search for the integer-feasible optimal solution of the MICP subproblem based on a nested tree of search regions and corresponding lower/upper bound values, according to some embodiments.

FIG. 11B illustrates a block diagram of a branch-and-bound mixed-integer optimization algorithm to search for the integer-feasible optimal solution of the MICP subproblem 320 based on a nested tree of search regions and corresponding lower/upper bound values, according to some embodiments. The block diagram of a branch-and-bound mixed-integer optimization algorithm illustrated in FIG. 11B can be used to implement the MINMPC controller in some embodiments. The branch-and-bound method initializes the branching search tree information for the mixed-integer convex program (MICP) at the current control time step 1110, based on the MICP data 1165 that consists of matrices and vectors. The initialization can additionally use the branching search tree information and MICP solution information from the previous iteration 1160 in order to generate a warm started initialization for the current control time step 1110. The main goal of the optimization algorithm is to construct lower and upper bounds on the objective value of the MICP subproblem solution. At step 1111, if the gap between the lower and upper bound value is smaller than a particular tolerance value, then the mixed-integer optimal control solution 1155 is found.

As long as the gap between the lower and upper bound value is larger than a particular tolerance value at step 1111, and a maximum execution time is not yet reached by the optimization algorithm, then the branch-and-bound method continues to search iteratively for the mixed-integer optimal control solution of the MICP subproblem 1155. Each iteration of the branch-and-bound method starts by selecting the next node in the tree, corresponding to the next region or partition of the integer variable search space, with possible variable fixings based on pre-solve branching techniques 1115. After the node selection, the corresponding integer-relaxed convex problem is solved, with possible variable fixings based on post-solve branching techniques 1120.

If the integer-relaxed convex problem has a feasible solution, then the resulting relaxed control solution provides a lower bound on the objective value for that particular region or partition of the integer variable search space. At step 1121, if the objective is determined to be larger than the currently known upper bound for the objective value of the optimal mixed-integer control solution of the MICP subproblem, then the selected node is pruned or removed from the branching tree 1140. However, at step 1121, if the objective is determined to be lower than the currently known upper bound, and the relaxed control solution is integer feasible 1125, then the currently known upper bound and corresponding mixed-integer control solution estimate is updated at step 1130.

If the integer-relaxed convex problem has a feasible solution and the objective is lower than the currently known upper bound 1121, but the relaxed control solution is not yet integer feasible 1125, then the global lower bound for the objective can be updated 1135 to be the minimum of the objective values for the remaining leaf nodes in the branching tree and the selected node is pruned from the tree 1140. In addition, starting from the current node, a discrete variable with a fractional value is selected for branching according to a particular branching strategy 1145, in order to create and append the resulting auxiliary MICP subproblems, corresponding to sub-regions or partitions of the discrete search space of the original MICP subproblem, as children of that node in the branching tree 1150.

An important step in the branch-and-bound method is how to create the partitions, i.e., which node to select 1115 and which discrete variable to select for branching 1145. Some embodiments are based on branching one of the binary control variables with fractional values in the integer-relaxed convex problem solution. For example, if a particular binary control variable $u_{i,k} \in \{0,1\}$ has a fractional value as part of the integer-relaxed convex problem solution, then some embodiments create two partitions of the MICP subproblem by adding, respectively, the equality constraint $u_{i,k}=0$ to one subproblem and the equality constraint $u_{i,k}=1$ to the other subproblem. Some embodiments are based on a reliability branching strategy for variable selection 1145, which aims to predict the future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments are based on a branch-and-bound method that uses a best-first strategy that selects the node with the currently lowest local lower bound. Some embodiments employ a combination of the depth-first and best-first node selection approach, in which the depth-first node selection strategy is used until an integer-feasible control solution is found, followed by using the best-first node selection strategy in the subsequent iterations of the branch-and-bound based optimization algorithm. The latter implementation is motivated by aiming to find an integer-feasible control solution early at the start of the branch-and-bound procedure (depth-first) to allow for early pruning, followed by a more greedy search for better feasible solutions (best-first).

The branch-and-bound method continues iterating until either one or multiple of the following conditions have been satisfied:

The maximum execution time for the processor is reached.

All the nodes in the branching search tree have been pruned, such that no new node can be selected for solving convex relaxations or branching.

The optimality gap between the global lower and upper bound value for the objective of the MICP subproblem solution is smaller than the tolerance.

Figure 12A:
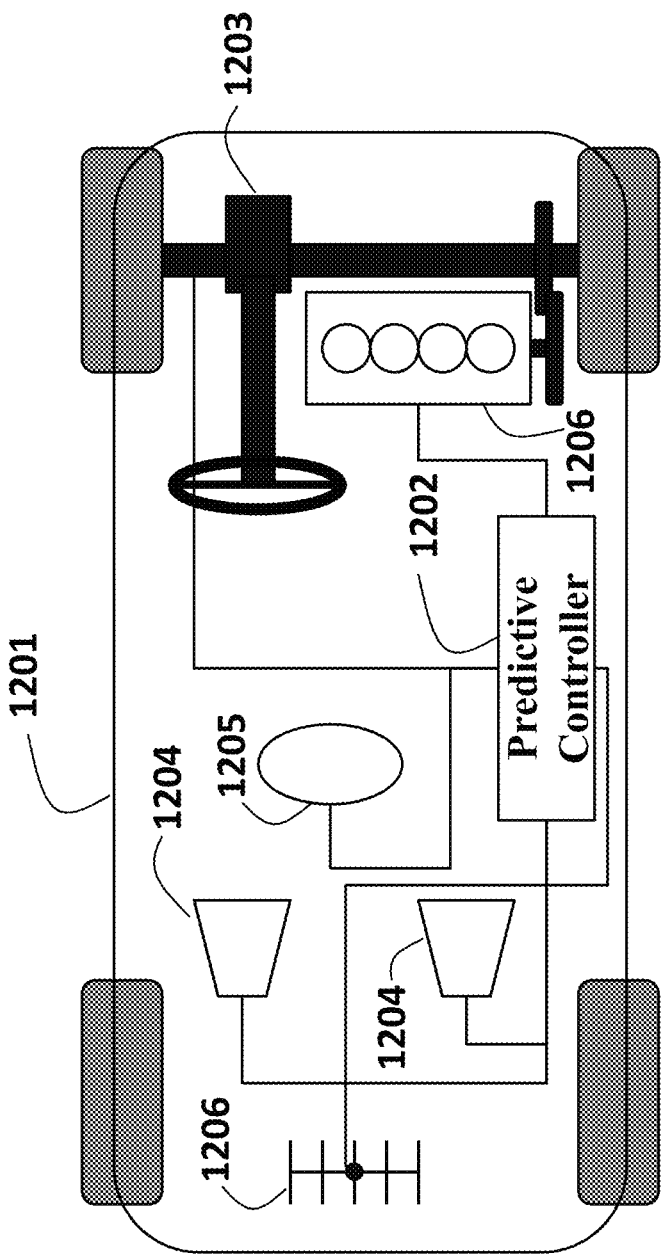
FIG. 12A illustrates a schematic of a vehicle including a predictive controller employing principles of some embodiments.

FIG. 12A illustrates a schematic of a vehicle 1201 including a predictive controller 1202 employing principles of some embodiments. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 12B:
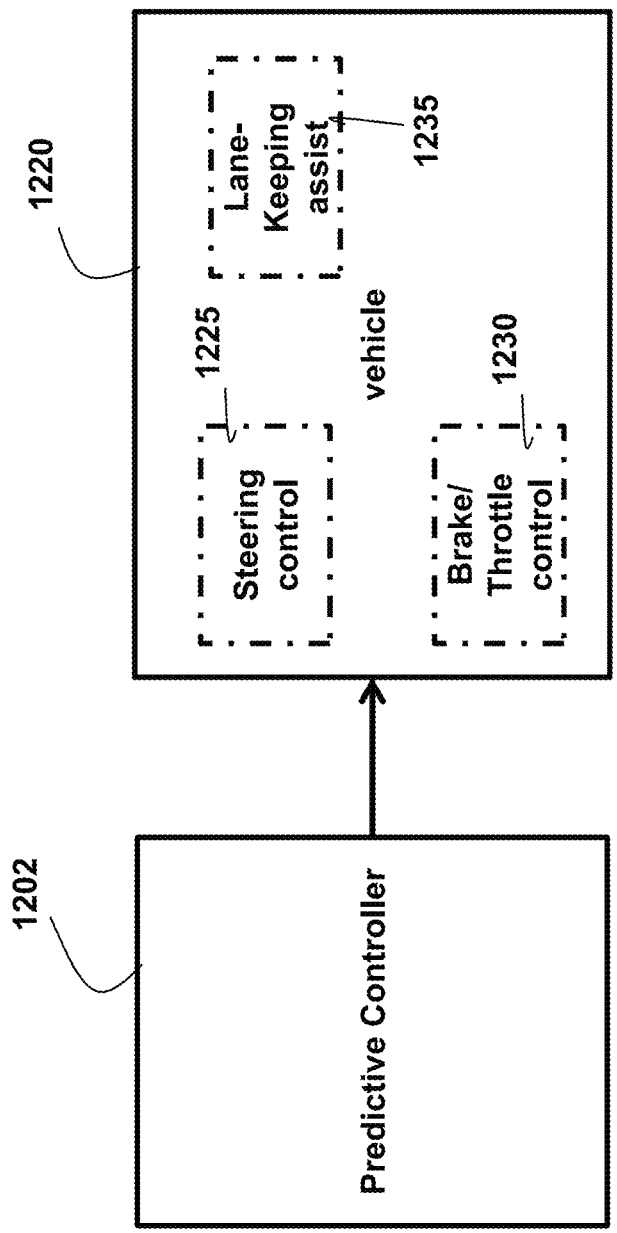
FIG. 12B illustrates a schematic of interaction between the predictive controller and other controllers of the vehicles, according to some embodiments.

FIG. 12B illustrates a schematic of interaction between the controller 1202, e.g., a mixed-integer nonlinear model predictive controller (MINMPC) and other controllers 1220 of the vehicle 1201, according to some embodiments. For example, in some embodiments, the controllers 1220 of the vehicle 1201 are steering 1225 and brake/throttle controllers 1230 that control rotation and acceleration of the vehicle 1220, respectively. In such a case, the predictive controller 1202 outputs control inputs to the controllers 1225 and 1230 to control the state of the vehicle 1201. The controllers 1220 can also include high-level controllers, e.g., a lane-keeping assist controller 1235, that further process the control inputs of the predictive controller 1202. In both cases, the controllers 1220 use the outputs of the predictive controller 1202 to control at least one actuator of the vehicle 1201, such as the steering wheel and/or the brakes of the vehicle 1201, in order to control the motion of the vehicle 1201. Further, the predictive controller 1202 determines an input to the vehicle 1201 based on a mixed-integer optimal control solution, where the input to the vehicle 1201 includes one or a combination of an acceleration of the vehicle 1201, an engine torque of the vehicle 1201, brake torques, and a steering angle, and the discrete optimization variables to model one or a combination of discrete control decisions, switching in the system dynamics, gear shifting, and obstacle avoidance constraints.

Figure 12C:
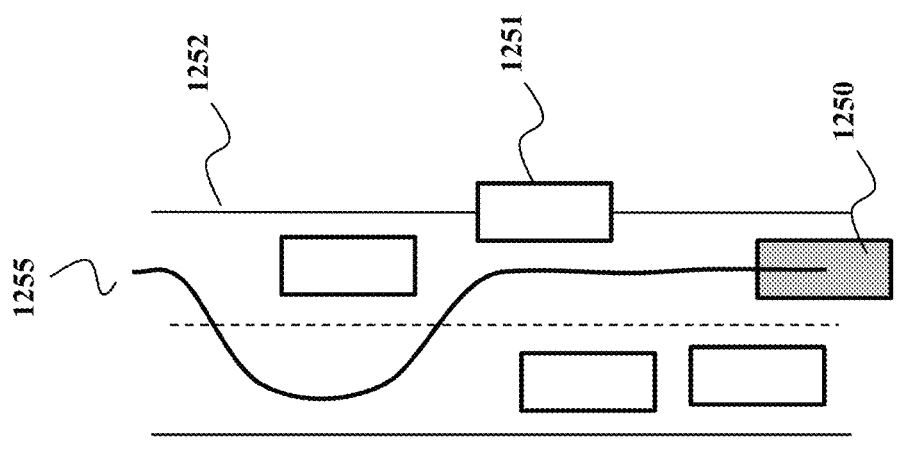
FIG. 12C illustrates a schematic of a path and/or motion planning method for a controlled vehicle employing principles of some embodiments.

FIG. 12C illustrates a schematic of a path and/or motion planning method for a controlled vehicle employing principles of some embodiments. Further, FIG. 12C illustrates a schematic of an autonomous or semi-autonomous controlled vehicle 1250 for which a dynamically feasible, and often optimal trajectory 1255 can be computed by using embodiments of the present disclosure. The generated trajectory aims to keep the vehicle within particular road bounds 1252, and aims to avoid other controlled and/or uncontrolled vehicles, i.e., these vehicles are obstacles 1251 for this particular controlled vehicle 1250. In some embodiments, each of the obstacles 1251 can be represented by one or multiple inequality constraints in a time or space formulation of the constrained mixed-integer nonlinear programming problem, including one or multiple additional discrete variables for each of the obstacles. For example, based on embodiments configured to implement a mixed-integer nonlinear model predictive controller, the autonomous or semi-autonomous controlled vehicle 1250 can make discrete decisions in real time such as, e.g., pass another vehicle on the left or on the right side or instead to stay behind another vehicle within the current lane of the road 1252, while additionally making continuous decisions in real time such as, e.g., the velocity, acceleration or steering inputs to control the motion of the vehicle 1250.

Figure 12D:
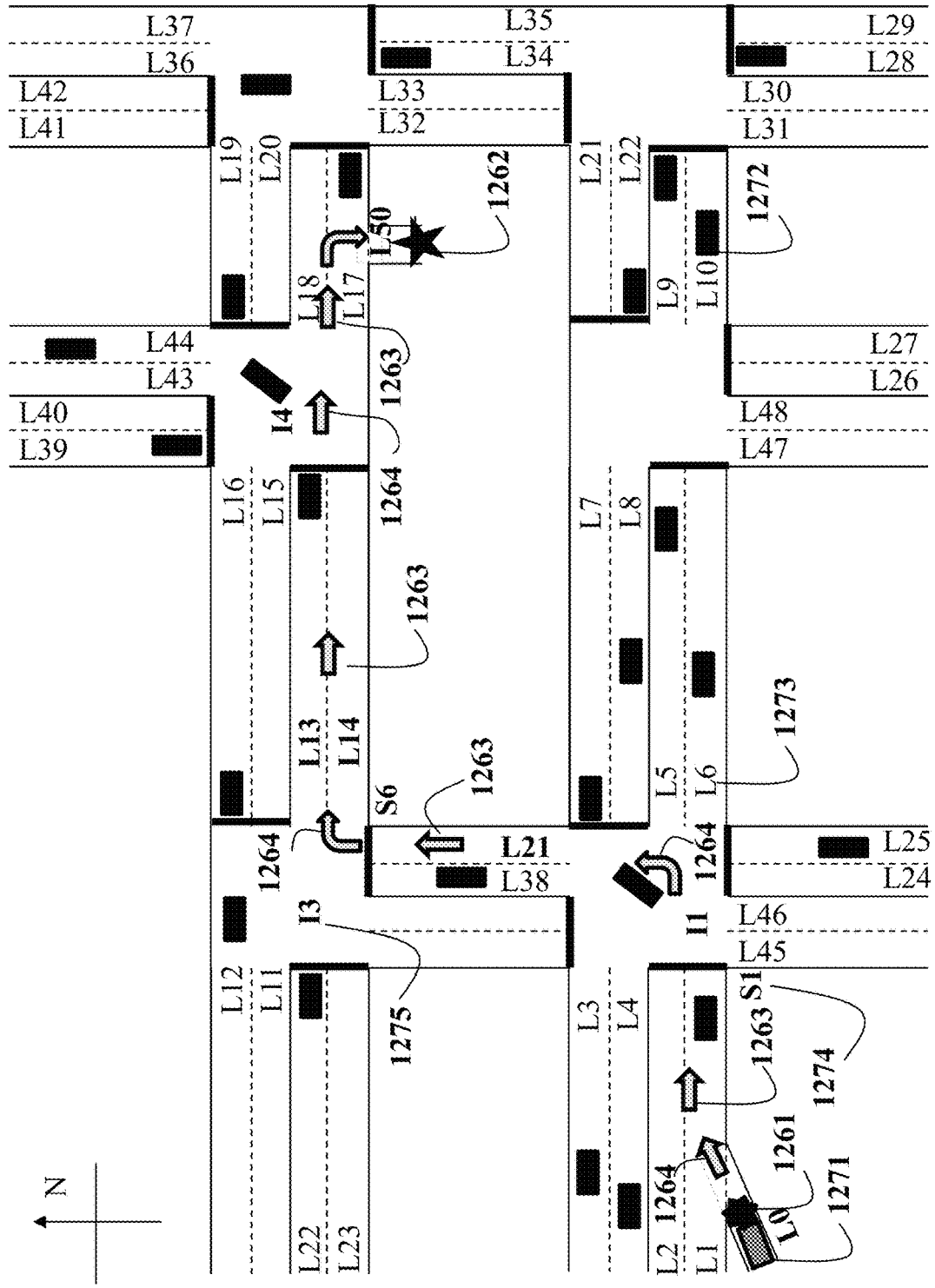
FIG. 12D illustrates an exemplary traffic scene for a single- or multi-vehicle decision making module based on some embodiments.

FIG. 12D illustrates an exemplary traffic scene for a single- or multi-vehicle decision making module based on some embodiments. The FIG. 12D depicts a scenario with one or multiple vehicles under control, referred to as an ego vehicle 1271, with the traffic composed of other vehicles shown similar to 1272, lanes marked for instance 1273 as L6, stop lines marked for instance 1274 as S1, intersections marked for instance 1275 as 13. For the vehicle in position 1261, with final destination 1262, a routing module provides the sequence of roads indicated by arrows 1263, and the sequence of turns indicated by arrows 1264. It should be noted however that the sequence of roads 1263 and the sequence of turns 1264 does not by itself specify a trajectory or a path for the vehicle. There are a number of discrete decisions to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions highly depend on the current traffic at the moment when the vehicle reaches the corresponding location, which is in general unknown to a routing module due to the uncertainty of traffic motion and uncertainty of the moment at which the vehicle will reach the location. In some embodiments of the present disclosure, a motion plan can be computed for one or multiple controlled ego vehicles 1271, possibly with communication to allow for coordination between the vehicles (V2V) and/or between a smart infrastructure system and the vehicles (V2X), by solving one or multiple connected mixed-integer nonlinear programming problems.

Figure 13A:
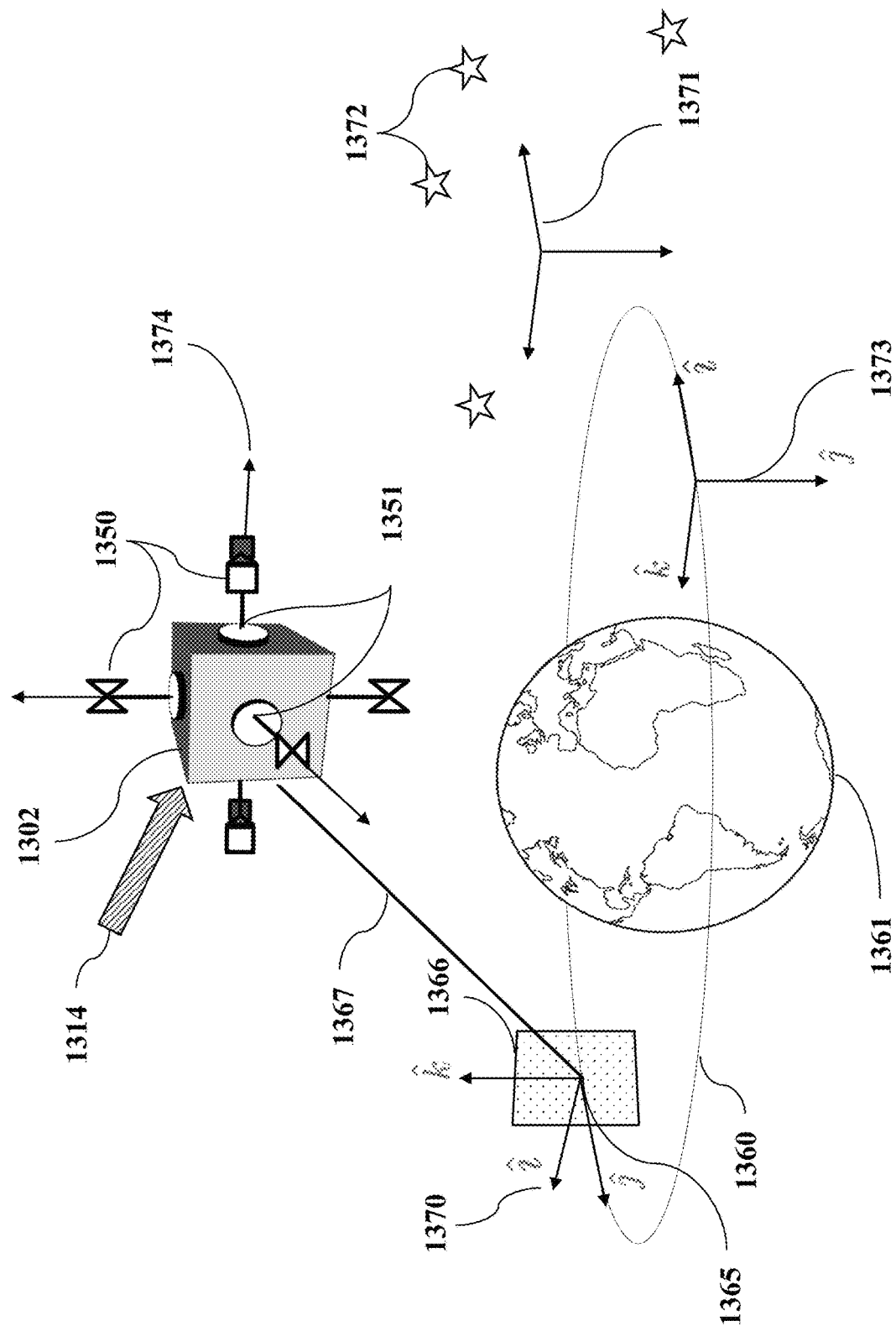
FIGS. 13A and 13B are schematics of the spacecraft mixed-integer predictive control problem formulation employing principles, according to some embodiments.
Figure 13B:
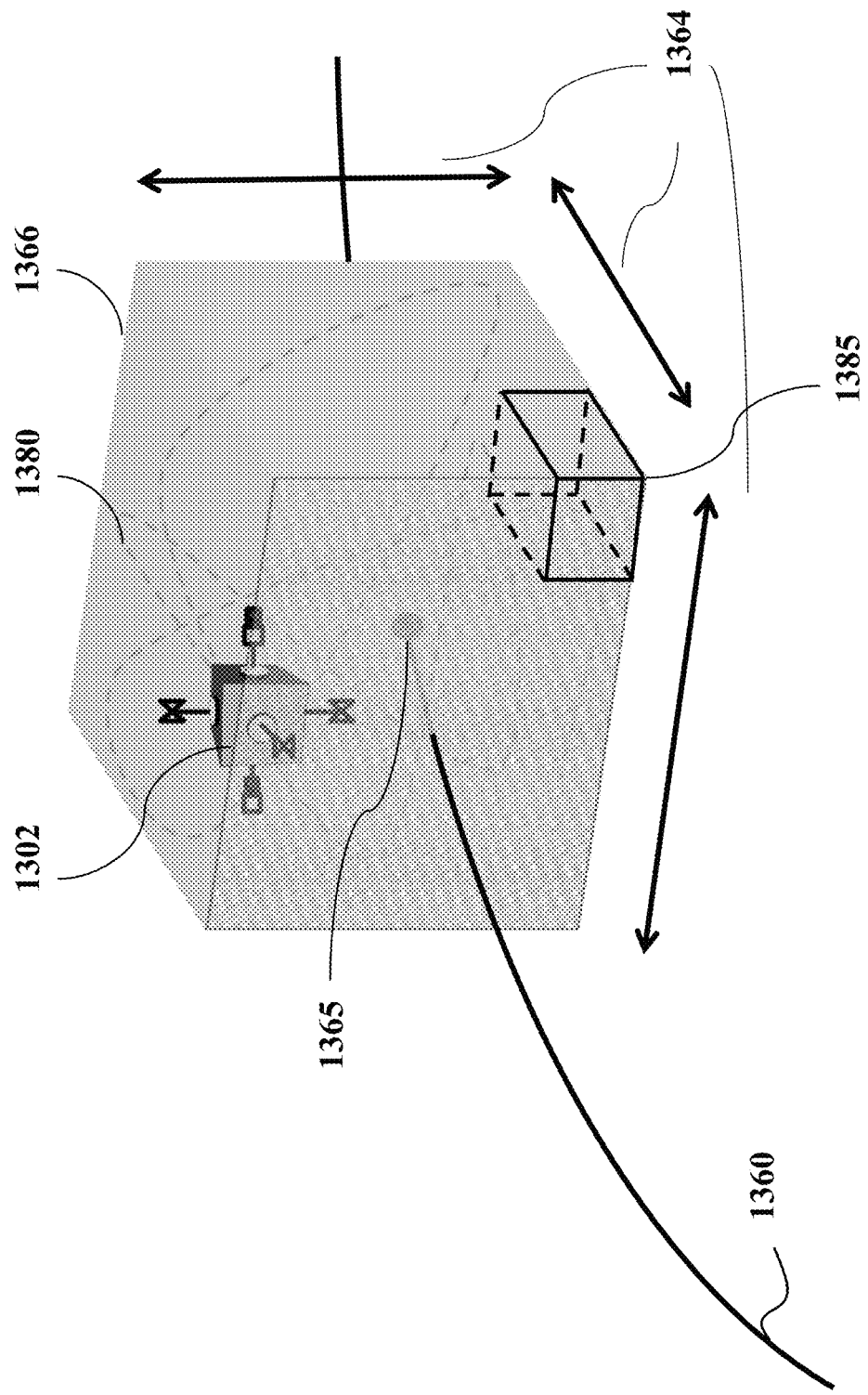

FIG. 13A and FIG. 13B are schematics of a spacecraft mixed-integer nonlinear model predictive control problem formulation employing principles of some embodiments of the disclosure. More specifically, FIG. 13A and FIG. 13B illustrate a spacecraft 1302 equipped with a plurality of actuators such as thrusters 1350 and momentum exchange devices 1351. Examples of the type of momentum exchange devices include reaction wheels (RWs) and gyroscopes. The spacecraft 1302 is a vehicle, vessel, or machine designed to fly in outer space whose operation changes quantities such as the position of the spacecraft 1302, its velocities, and its attitude or orientation, in response to commands that are sent to the actuators. When commanded, the actuators impart forces on the spacecraft 1302 that increase or decrease the velocity of the spacecraft 1302 and thus cause the spacecraft 1302 to translate its position, and, when commanded, the actuators also impart torques on the spacecraft 1302, which cause the spacecraft 1302 to rotate and thereby change its attitude or orientation. As used herein, the operation of the spacecraft 1302 is determined by the operation of the actuators that determine a motion of the spacecraft 1302 that changes such quantities.

The spacecraft 1302 flies in outer space along an open or closed orbital path 1360 around, between, or near one or more gravitational bodies such as the Earth 1361, moon, and/or other celestial planets, stars, asteroids, comets. Usually, a desired or target position 1365 along the orbital path is given. A reference frame 1370 is attached to the desired position, where the origin of the frame, i.e., the all zeros coordinates in that reference frame are the coordinates of the desired position at all times.

The spacecraft 1302 is subject to various disturbance forces 1314. These disturbance forces can include forces that were not accounted for when determining the orbital path for the spacecraft 1302. These disturbance forces act on the spacecraft 1302 to move the spacecraft 1302 away from the desired position on the orbital path. These forces can include, but are not limited to, gravitational attraction, radiation pressure, atmospheric drag, non-spherical central bodies, and leaking propellant. Thus, the spacecraft 1302 can be at a distance 1367 away from the target position.

Because of the disturbance forces, it is not always possible to keep the spacecraft 1302 at the desired position along its orbit. As such, it is desired that the spacecraft 1302 instead remains within a window 1366 with specified dimensions 1364 around the desired position. To that end, the spacecraft 1302 is controlled to move along any path 1380 that is contained within the desired target window. In this example, the window 1366 has a rectangular shape, but the shape of the window can vary for different embodiments.

The spacecraft 1302 is also often required to maintain a desired orientation. For example, a spacecraft-fixed reference frame 1374 is required to be aligned with a desired reference frame such as an inertial reference frame 1371 that is fixed relative to distant stars 1372, or a reference frame 1373 that is always oriented in a manner that points towards the Earth. However, depending on the shape of the spacecraft 1302, different disturbance forces 1314 can act non-uniformly on the spacecraft 1302, thereby generating disturbance torques, which cause the spacecraft 1302 to rotate away from its desired orientation. In order to compensate for the disturbance torques, momentum exchange devices 1351 such as reaction wheels are used to absorb the disturbance torques, thus allowing the spacecraft to maintain its desired orientation.

So that the momentum exchange devices do not saturate, and thereby lose the ability to compensate for disturbance torques, their stored momentum must be unloaded, e.g., by reducing spin rates of the reaction wheels. Unloading the momentum exchange devices imparts an undesired torque on the spacecraft 1302. Such an undesired torque is also compensated for by the thrusters.

In some embodiments of the invention, using one or multiple nonlinear equations to describe the dynamics and/or constraints of the controlled system, the MINMPC controller determines an input to the spacecraft 1302 based on the mixed-integer optimal control solution, wherein the input to the spacecraft 1302 actuates one or a combination of thrusters and momentum exchange devices, and the discrete optimization variables are used to model one or a combination of discrete control decisions, switching in the system dynamics, integer values for the thruster commands, and obstacle avoidance constraints.

In some embodiments of the invention, the spacecraft 1302 can be modeled as a hybrid nonlinear system and the commands that are sent to the actuators are computed using a predictive controller, such as the mixed-integer nonlinear model predictive controller (MINMPC). For example, in some embodiments, the commands that are sent to the thrusters 1350 can only take a discrete set of values, and therefore resulting into a set of binary or integer control input variables for each stage within the mixed-integer control horizon.

In some embodiments of the invention, the predictive controller is designed such that the spacecraft 1302 remains outside of a particular zone 1385 with specified dimensions, close to the desired position along the orbit. The latter zone can be either fixed in time or it can be time varying, and is often referred to as an exclusion zone 1385, for which the corresponding logic inequality constraints can be modeled using an additional set of binary or integer control input variables for each stage within the mixed-integer control horizon. In this example, the exclusion zone 1385 has a rectangular shape, and it is positioned in a corner of the desired window 1366, but the shape and position of the exclusion zone within the desired target window can vary for different embodiments.

Figure 14A:
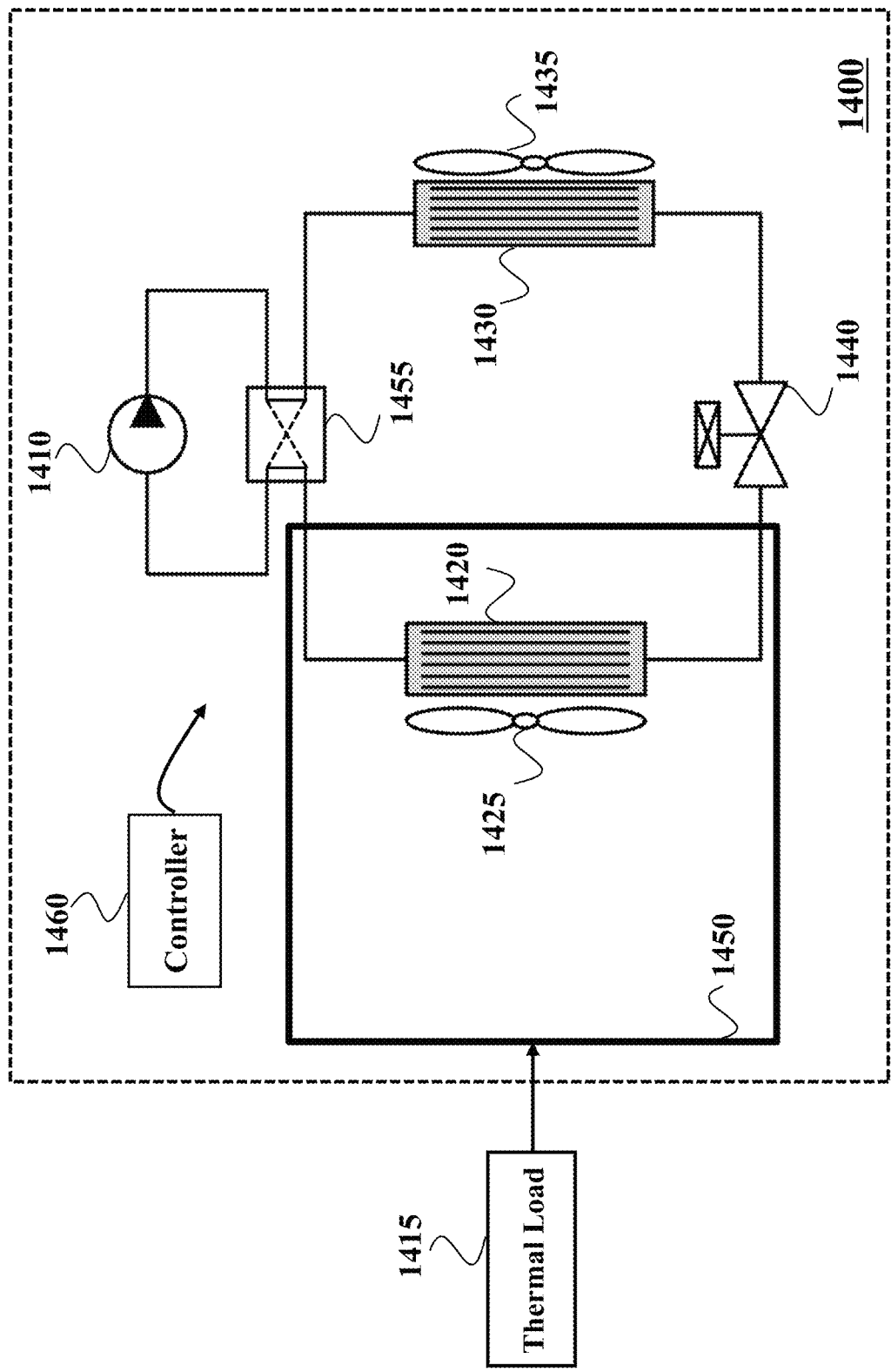
FIG. 14A illustrates a schematic of a vapor compression system controlled by a controller, according to some embodiments.

FIG. 14A illustrates a schematic of a vapor compression system 1400 controlled by a controller 1460, according to some embodiments. The controller 1460 includes a predictive controller, such as a controller implementing a mixed-integer nonlinear model predictive control (MINMPC). The components of the vapor compression system (VCS) 1400 can include an indoor heat exchanger 1420 located in an indoor space or zone 1450, an outdoor unit heat exchanger 1430 located in the ambient environment, a compressor 1410 and an expansion valve 1440. A thermal load 1415 acts on the indoor space or zone 1450.

Additionally, the VCS 1400 can include a flow reversing valve 1455 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 14B:
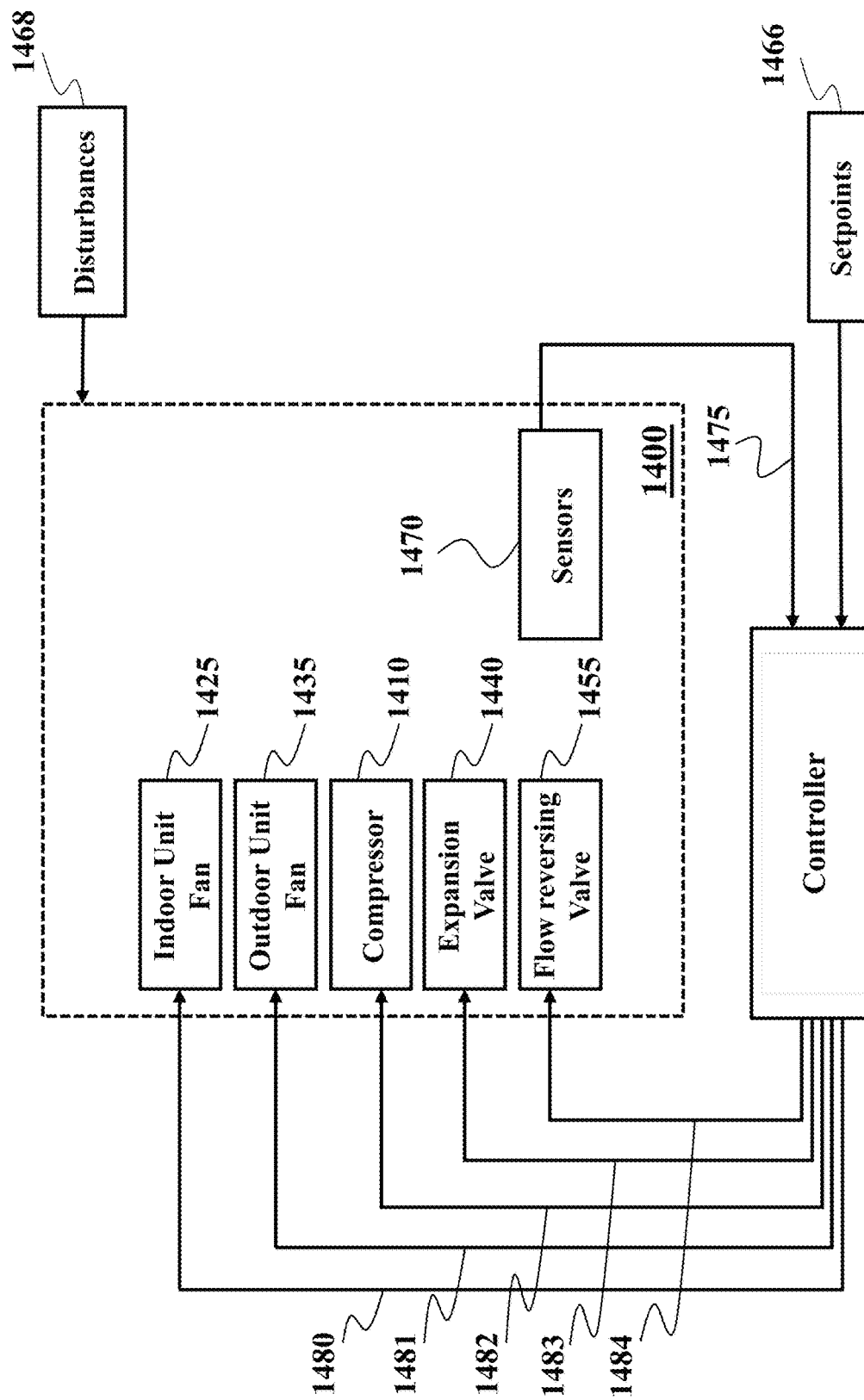
FIG. 14B illustrates an example of the configuration of signals, sensors, and controller used in the VCS, according to some embodiments.

FIG. 14B illustrates an example of the configuration of signals, sensors, and controller used in the VCS 1400, according to some embodiments. A controller 1460 reads information from sensors 1470 configured to measure various temperatures, pressures, flow rates or other information about the operation of the system, including measurable disturbances such as the ambient air temperature. The controller 1460 can be provided with setpoints 1466 that represent desired values of measured signals of the process such as a desired zone temperature. Setpoint information can come from a thermostat, wireless remote control, or internal memory or storage media. The controller then computes control inputs such that some measured outputs are driven to their setpoints. These control inputs can include an indoor unit fan speed 1480, an outdoor unit fan speed 1481, a compressor rotational speed 1482, an expansion valve position 1483, and a flow reversing valve position 1484. In this manner, the controller controls operation of the vapor compression system such that the setpoint values are achieved in the presence of disturbances 1468, such as a thermal load, acting on the system.

In some embodiments, the VCS 1400 can be modeled as a hybrid nonlinear system and the commands that are sent to the actuators are computed using a predictive controller, such as the mixed-integer nonlinear model predictive controller (MINMPC). For example, in some embodiments, the commands that are sent to the valves and/or the fans can only take a discrete set of values, and therefore resulting into a set of binary or integer control input variables for each stage within the mixed-integer control horizon.

In some embodiments, the predictive controller determines an input to the vapor compression system based on the mixed-integer optimal control solution, wherein the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

In some embodiments, the dynamic behavior of the VCS 1400 can change rapidly or even switch at certain time instances, depending on the current state of the system and the current control input values. The resulting hybrid VCS 1400 with switching dynamics can be modeled using an additional set of binary or integer control input variables for each stage within the mixed-integer control horizon.

FIG. 15 illustrates a method 1500 for controlling a system, according to an example embodiment. At step 1501, the method includes accepting feedback signal including measurements of a state of the system. At step 1503, the method includes solving a mixed-integer nonlinear optimal control problem using a mixed-integer sequential convex programming (MISCP) optimization algorithm that searches for a feasible and (locally) optimal solution of the mixed-integer nonlinear programming (MINLP) problem. At step 1505, controlling the system based on the control signal to change the state of the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A predictive feedback controller for controlling a hybrid dynamical system with nonlinear dynamics and continuous and discrete elements of operation, the predictive feedback controller comprising: at least one processor; and a memory having instructions stored thereon that, when executed by the at least one processor, cause the predictive feedback controller to:
- accept feedback signal including measurements indicative of a current state of the hybrid dynamical system including one or a combination of a current state of the predictive controller, a current state of one or multiple actuators of the hybrid dynamical system, and a current state of outputs of the hybrid dynamical system;
- formulate a mixed-integer nonlinear programming (MINLP) problem optimizing an objective function subject to one or multiple constraints with a solution indicative of a control command for changing the current state of the hybrid dynamical system according to a control objective, wherein the constraints include equality constraints, inequality constraints, or both, and wherein the constraints and the control objective of the MINLP problem include one or multiple nonlinear functions of continuous optimization variables representing the continuous elements of the operation of the hybrid dynamical system and one or multiple linear functions of integer optimization variables representing the discrete elements of the operation of the hybrid dynamical system, such that the MINLP problem is formulated into a separable format ensuring that the discrete elements of the operation are present only in the linear functions of the MINLP problem;
- solve the MINLP problem over multiple iterations of a sequential convexification-based optimization procedure until a termination condition is met, wherein, to perform an iteration, the predictive feedback controller is configured to perform a partial convexification of a portion of a space of the solution including a current solution guess, wherein the partial convexification produces a convex approximation of the nonlinear functions of the MINLP without approximating the linear functions of the MINLP to produce a partially convexified MINLP; and
- update the current solution guess by solving a mixed-integer convex programming (MICP) formulation of the partially convexified MINLP problem; and
- submit the control command generated according to the solution of the MINLP problem to the hybrid dynamical system thereby causing a change of the current state of the hybrid dynamical system.

2. The predictive feedback controller of claim 1, wherein the hybrid dynamical system includes a device controlled by manipulation input signals representing the control command, wherein the input signals specify values of the continuous elements of the operation of the hybrid dynamical system and values of the discrete elements of the operation of the hybrid dynamical system, wherein the continuous elements include one or a combination of voltages, pressures, forces, torques, steering angles, velocities, and temperatures, and wherein the discrete elements include one or a combination of energy levels, quantized valve inputs, gear shifts, on/off actuation, lane selection, and obstacle avoidance decision variables.

3. The predictive feedback controller of claim 1, wherein the processor is configured to transform the MINLP problem from an original format into the separable format by adding one or a combination of additional integer optimization variables and additional continuous optimization variables to the original format, thereby ensuring that the discrete elements of the operation are present only in the linear functions of the MINLP in separable format.

4. The predictive feedback controller of claim 1, wherein to perform the partial convexification, the processor is configured to:
- identify if a function in the objective function or the constraints of the MINLP problem is a function of the integer optimization variables or the continuous optimization variables;
- compute a convex approximation of the smooth nonlinear function in a local neighborhood of the current solution guess within the solution space of the MINLP problem if the function is a smooth nonlinear function of the continuous optimization variables; and
- avoid the convex approximation by preserving the integer variables, lying within a non-convex portion of the solution space of the MINLP, if the function is a linear function of integer optimization variables.

5. The predictive feedback controller of claim 4, wherein the convex approximation is computed by a local constraint linearization or a linear-quadratic objective approximation of the smooth nonlinear function in a local neighborhood of the current solution guess within the solution space of the MINLP problem, by evaluating one or multiple first and/or higher-order directional derivatives for the smooth nonlinear function, using symbolic differentiation, numerical differentiation or algorithmic differentiation.

6. The predictive feedback controller of claim 1, wherein to update the current solution guess of the iteration, the predictive feedback controller is configured to:
- solve the MICP problem of the partially convexified MINLP to compute a search direction for the continuous optimization variables and a search direction for the integer optimization variables;
- update current values of the integer optimization variables toward the search direction for the integer optimization variables with a step satisfying constraints on each of the integer optimization variables being an integer-valued; and
- update current values of the continuous optimization variables toward the search direction for the continuous optimization variables with a step size value governed by feasibility and optimality conditions of the MINLP problem.

7. The predictive feedback controller of claim 6, wherein the step size value is between zero and one and is selected for the iteration based on a merit function balancing optimality and feasibility for the solution of the MINLP problem, such that a value for the merit function decreases between at least two iterations of the sequential convexification-based optimization procedure.

8. The predictive feedback controller of claim 7, wherein the step size value is selected based on an iterative line search procedure, starting from an initial step size value of one, in which the predictive feedback controller performs one or multiple iterations of the iterative line search procedure to select the step size value and each iteration is configured to:
- test whether a decrease condition is satisfied for a merit function balancing optimality and feasibility for the solution of the MINLP problem;

terminate the iterative line search procedure and use the step size value to update current values of the continuous optimization variables toward the search direction for the continuous optimization variables, if the sufficient decrease condition is satisfied; and otherwise decrease the step size value and continue the iterative line search procedure is continued.

9. The predictive feedback controller of claim 7, wherein the merit function is a combination of the objective function and one or multiple penalty functions, which are applied to a violation for each of the equality constraints and a violation for each of the inequality constraints in the MINLP problem.

10. The predictive feedback controller of claim 6, wherein the MICP problem of the partially convexified MINLP includes one or multiple trust-region inequality constraints, ensuring that the search direction for the continuous optimization variables is below a trust-region radius value.

11. The predictive feedback controller of claim 10, wherein to update the current solution guess of the iteration, the processor is configured to:
  compute a ratio of an actual to a predicted reduction for a value of a merit function balancing optimality and feasibility for the MICP solution of the partially convexified MINLP problem; and
  update current values of the integer and continuous optimization variables toward the search direction for the integer and continuous optimization variables if the ratio of an actual to a predicted reduction for a value of the merit function is above a threshold.

12. The predictive feedback controller of claim 11, wherein to update the trust-region radius value based on the solution for the MICP problem of the partially convexified MINLP, the processor is configured to:
  decrease the trust-region radius value, ensuring that the search direction for the continuous optimization variables is reduced in one or multiple of the next iterations if the ratio of an actual to a predicted reduction for a value of the merit function or the search direction for the continuous optimization variables is below a threshold; and otherwise increase the trust-region radius value, ensuring that the search direction for the continuous optimization variables is increased in one or multiple of the next iterations.

13. The predictive feedback controller of claim 6, wherein the current values of the integer optimization variables are fixed after one or multiple iterations of the sequential convexification-based optimization procedure, and to update the current solution guess in one or multiple iterations of the sequential convexification-based optimization procedure, the predictive feedback controller is configured to:
  solve a convex programming (CP) problem of the partially convexified MINLP to compute a search direction for the continuous optimization variables, given the fixed current values of the integer optimization variables; and
  update current values of the continuous optimization variables toward the search direction for the continuous optimization variables with a step size value governed by feasibility and optimality conditions of the MINLP problem.

14. The predictive feedback controller of claim 13, wherein the CP problem is a convex linear programming (LP), a convex quadratic programming (QP), convex quadratically constrained quadratic programming (QCQP) or a convex second order cone programming (SOCP) subproblem.

15. The predictive feedback controller of claim 1, wherein a branch-and-bound (B&B) optimization method is used to compute a globally optimal solution for the MICP problem of the partially convexified MINLP.

16. The predictive feedback controller of claim 14, wherein the MICP problem is a mixed-integer linear programming (MILP) subproblem, a mixed-integer quadratic programming (MIQP) subproblem, a mixed-integer quadratically constrained quadratic programming (MIQCQP) subproblem or a mixed-integer second-order cone programming (MISOCP) subproblem.

17. The predictive feedback controller of claim 1, wherein a homotopy-type penalty method is used to penalize changes in a value for one or multiple of the integer optimization variables, based on a positive weight value, between at least two iterations of the sequential convexification-based optimization procedure.

18. The predictive feedback controller of claim 17, wherein the homotopy-type penalty method adds one or multiple penalty terms in the objective function of the MICP problem of the partially convexified MINLP, in order to accelerate convergence of the sequential convexification-based optimization procedure to a feasible and/or optimal solution of the MINLP problem.

19. The predictive feedback controller of claim 17, wherein the homotopy-type penalty method adds one or a combination of multiple linear and/or smooth nonlinear inequality constraints to the inequality constraints of the MICP problem of the partially convexified MINLP, in order to accelerate convergence of the sequential convexification-based optimization procedure to a feasible and/or optimal solution of the MINLP problem.

20. The predictive feedback controller of claim 1, wherein the at least one processor is at least one parallel processor and the solution to the MICP problem of the partially convexified MINLP can be found by searching for a globally optimal solution of the MICP problem in different regions of the solution space in parallel.

21. The hybrid dynamical system including the predictive feedback controller of claim 1, wherein the control command generated by the predictive feedback controller specifies a target state of the hybrid dynamical system, the hybrid dynamical system comprises:
  a tracking controller configured to generate one or multiple control inputs to the actuators of the hybrid dynamical system to reduce the error between the current state of the hybrid dynamical system and the target state of the hybrid dynamical system.

22. The hybrid dynamical system of claim 21, wherein the tracking controller is a PID controller or a model predictive controller (MPC).

23. The predictive feedback controller of claim 1, wherein the predictive feedback controller is implemented using a mixed-integer nonlinear model predictive control (MINMPC), wherein the MINMPC computes the control signal based on current state of the system and control command, and wherein the MINMPC computes a control solution that comprises a sequence of future optimal discrete and continuous control inputs over a prediction time horizon of the hybrid dynamical system, by solving a constrained mixed-integer nonlinear optimization problem at each control time step.

24. The predictive feedback controller of claim 23, wherein the solution of the constrained mixed-integer nonlinear optimization problem at a control time step is used as an initial solution guess for the sequential convexification-based optimization procedure to compute a solution to the constrained mixed-integer nonlinear optimization problem at the next control time step.

25. The predictive feedback controller of claim 1, wherein the system is a vehicle, and wherein the predictive feedback controller determines an input to the vehicle based on the MINLP solution, wherein the input to the vehicle includes one or a combination of an acceleration of the vehicle, an engine torque of the vehicle, brake torques, and a steering angle, and the discrete optimization variables are used to model one or a combination of discrete control decisions, switching in the system dynamics, gear shifting, and obstacle avoidance constraints.

26. The predictive feedback controller of claim 1, wherein the system is a spacecraft, and wherein the predictive feedback controller determines an input to the spacecraft based on the MINLP solution, wherein the input to the spacecraft actuates one or a combination of thrusters and momentum exchange devices, and the discrete optimization variables are used to model one or a combination of discrete control decisions, switching in the system dynamics, integer values for the thruster commands, and obstacle avoidance constraints.

27. The predictive feedback controller of claim 1, wherein the system is a vapor compression system, and wherein the predictive feedback controller determines an input to the vapor compression system based on the MINLP solution, wherein the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

* * * * *